US010920939B2

(12) United States Patent
Haenen et al.

(10) Patent No.: US 10,920,939 B2
(45) Date of Patent: Feb. 16, 2021

(54) LIGHT CONCENTRATOR MODULE

(71) Applicant: SIGNIFY HOLDING B.V., Eindhoven (NL)

(72) Inventors: Ludovicus Johannes Lambertus Haenen, Sint Oedenrode (NL); Christoph Gerard August Hoelen, Valkenswaard (NL); Dirk Kornelis Gerhardus De Boer, Den Bosch (NL); Simon Eme Kadijk, Veldhoven (NL); Yun Li, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/628,786

(22) PCT Filed: Jul. 4, 2018

(86) PCT No.: PCT/EP2018/068060
§ 371 (c)(1),
(2) Date: Jan. 6, 2020

(87) PCT Pub. No.: WO2019/008017
PCT Pub. Date: Jan. 10, 2019

(65) Prior Publication Data
US 2020/0326044 A1    Oct. 15, 2020

(30) Foreign Application Priority Data

Jul. 7, 2017   (WO) ................. PCT/CN2017/092253
Aug. 31, 2017  (EP) ..................................... 17188736

(51) Int. Cl.
*F21K 9/69*       (2016.01)
*F21K 9/68*       (2016.01)
(Continued)

(52) U.S. Cl.
CPC .................. *F21K 9/69* (2016.08); *F21K 9/64* (2016.08); *F21K 9/68* (2016.08); *H05B 47/155* (2020.01);
(Continued)

(58) Field of Classification Search
CPC ..... F21K 9/61; F21K 9/64; F21K 9/68; F21K 9/69; H05B 47/155; F21Y 2103/00;
(Continued)

(56) References Cited

U.S. PATENT DOCUMENTS

| 7,488,101 B2 | 2/2009 | Brukilacchio |
| 9,395,055 B2 | 7/2016 | Brukilacchio et al. |
(Continued)

FOREIGN PATENT DOCUMENTS

| WO | 2015028334 A1 | 3/2015 |
| WO | 2016134995 A1 | 9/2016 |
(Continued)

*Primary Examiner* — Rajarshi Chakraborty
*Assistant Examiner* — Michael Chiang
(74) *Attorney, Agent, or Firm* — Daniel J. Piotrowski

(57) ABSTRACT

The invention provides a lighting device (1) comprising a luminescent element (5) comprising an elongated light transmissive body (100), the elongated light transmissive body (100) comprising a side face (140), wherein the elongated light transmissive body (100) comprises a luminescent material (120) configured to convert at least part of a light source light (11) selected from one or more of the UV, visible light, and IR received by the elongated light transmissive body (100) into luminescent material radiation (8). The invention further provides such luminescent element per se.

15 Claims, 17 Drawing Sheets

(51) Int. Cl.
  *F21K 9/64*    (2016.01)
  *H05B 47/155*  (2020.01)
  *F21Y 103/00*  (2016.01)
  *F21Y 115/10*  (2016.01)
(52) U.S. Cl.
  CPC ....... *F21Y 2103/00* (2013.01); *F21Y 2115/10* (2016.08)
(58) Field of Classification Search
  CPC . F21Y 2115/10; G02B 6/0003; G02B 6/0006; G02B 6/0008; G02B 6/0096
  See application file for complete search history.

(56) References Cited

U.S. PATENT DOCUMENTS

| | | | |
|---|---|---|---|
| 2007/0279915 A1* | 12/2007 | Rutherford | H04N 9/3152 362/341 |
| 2007/0280622 A1 | 12/2007 | Rutherford | |
| 2010/0053970 A1 | 3/2010 | Sato et al. | |
| 2010/0124243 A1* | 5/2010 | Hussell | F21K 9/64 372/45.01 |
| 2014/0092620 A1* | 4/2014 | Tissot | G02B 6/001 362/553 |
| 2014/0185269 A1 | 7/2014 | Li | |
| 2015/0252978 A1* | 9/2015 | Ueda | F21V 9/08 353/31 |
| 2016/0116668 A1 | 4/2016 | Hikmet et al. | |
| 2016/0139328 A1 | 5/2016 | Hikmet et al. | |
| 2016/0218260 A1 | 7/2016 | Hikmet et al. | |
| 2017/0023730 A1 | 1/2017 | Van Bommel et al. | |
| 2017/0068034 A1 | 3/2017 | Chang et al. | |
| 2017/0139113 A1 | 5/2017 | Peeters | |
| 2019/0032886 A1* | 1/2019 | Daicho | C03C 4/12 |

FOREIGN PATENT DOCUMENTS

| | | |
|---|---|---|
| WO | 2016162233 A1 | 10/2016 |
| WO | 2016177586 A1 | 11/2016 |

* cited by examiner

LIGHT CONCENTRATOR MODULE

CROSS-REFERENCE TO PRIOR APPLICATIONS

This application is the U.S. National Phase application under 35 U.S.C. § 371 of International Application No. PCT/EP2018/068060, filed on Jul. 4, 2018, which claims the benefit of International Application No. PCT/CN2017/092253, filed on Jul. 7, 2017 and European Patent Application No. 17188736.7, filed on Aug. 31, 2017. These applications are hereby incorporated by reference herein.

FIELD OF THE INVENTION

The invention relates to a lighting device, such as for use in a projector or for use in stage lighting, comprising an elongated light transmissive body. The invention also relates to a lighting system such as a projection system or luminaire.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

US2010/124243 A1 discloses a semiconductor light emitting apparatus that includes an elongated hollow wavelength conversion tube having wavelength conversion material dispersed therein. A semiconductor light emitting device is oriented to emit light inside the elongated hollow wavelength conversion tube to impinge upon the elongated wavelength conversion tube wall.

US2014/185269 A1 discloses a photoluminescent wavelength conversion component and a lamp that incorporates such a component. The photoluminescence wavelength conversion component comprises a hollow cylindrical tube having a given bore of diameter and an axial length. The relative dimensions and shape of the component can affect the radial emission pattern of the component and are configured to give a required emission pattern (typically omnidirectional). The photoluminescence material can be homogeneously distributed throughout the volume of the component during manufacture of the component.

US2010/053970 A1 discloses a light-emitting device that includes a first laser light source, a first diffusion member provided along a light axis of a first light radiated form the first laser light source, and a first wavelength converter provided along the first diffusion member. The first diffusion member generates a second light from the first light. The second light outgoes in a direction different from the light axis direction of the first light. A ratio of generating the second light from the first light in a first part is higher than that in a second part, wherein an intensity of the first light in the first part is lower than that in a second part. The first wavelength converter absorbs the second light and emitting a third light having a different wavelength from the second light.

US2007/280622 A1 discloses a light guide that includes a material that is capable of emitting light of a second wavelength when illuminated with light of a first wavelength where the first wavelength is different from the second wavelength. The light guide further includes an exit face that has a first portion that is reflective at the second wavelength and a second portion that is transmissive at the second wavelength. When the light guide is illuminated with light of the first wavelength, the material converts at least a portion of the light of the first wavelength into light of the second wavelength. The majority of the light of the second wavelength that exits the second portion of the exit face is totally internally reflected by the light guide.

SUMMARY OF THE INVENTION

High brightness light sources are interesting for various applications including spots, stage-lighting, headlamps and digital light projection, etc. For this purpose, it is possible to make use of so-called light concentrators where shorter wavelength light is converted to longer wavelengths in a highly transparent luminescent material. A rod of such a transparent luminescent material can be illuminated by LEDs and/or laser diodes (LDs) to produce longer wavelengths within the rod. Converted light which will stay in the luminescent material, such as a (trivalent cerium) doped garnet, in the waveguide mode and can then be extracted from one of the (smaller) surfaces leading to an intensity gain.

In embodiments, the light concentrator may comprise a rectangular bar (rod) of a phosphor doped, high refractive index garnet, capable to convert blue light into green light and to collect this green light in a small étendue output beam. The rectangular bar may have six surfaces, four large surfaces over the length of the bar forming the four side walls, and two smaller surfaces at the end of the bar, with one of these smaller surfaces forming the "nose" where the desired light is extracted (e.g. with an optical element).

Under e.g. blue light radiation, the blue light excites the phosphor, after the phosphor start to emit green light in all directions, assuming some cerium comprising garnet applications. Since the phosphor is embedded in—in general—a high refractive index bar, a main part of the converted (green) light is trapped into the high refractive index bar and wave guided to the nose of the bar where the (green) light may leave the bar. The amount of (green) light generated is proportional to the amount of blue light pumped into the bar. The longer the bar, the more blue LED's (light emitting diodes) and/or laser diodes can be applied to pump phosphor material in the bar and the number of blue LED's and/or laser diodes to increase the brightness of the (green) light leaving at the nose of the bar can be used. The phosphor converted light, however, can be split into two parts.

A first part consists of first types of light rays that will hit the side walls of the bar under angles larger than the critical angle of reflection. These first light rays are trapped in the high refractive index bar and will traverse to the nose of the bar where it may leave as desired light of the system.

Hence, it is an aspect of the invention to provide an alternative lighting device comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

Therefore, in an aspect the invention provides a lighting device having a luminescent element comprising an elongated light transmissive body, the elongated light transmissive body comprising a side face, wherein: (i) the elongated light transmissive body comprises a luminescent material configured to convert at least part of a light source light selected from one or more of the UV, visible light, and IR received by the elongated light transmissive body into luminescent material radiation; (ii) the elongated light transmissive body has a length (L); and (iii) the elongated light transmissive body is hollow over at least part of the length (L) thereby defining a cavity.

It appears that hollow elongated bodies may have higher efficient outcoupling than massive elongated bodies. Especially, this may apply for elongated bodies have an essentially circular cross-section, though for non-circular cross-sections this may also apply.

Hence, in embodiments the elongated light transmissive body has a polygonal cross-section, wherein the elongated light transmissive body comprises a cavity surrounded by the elongated light transmissive body. Or, in other words, the material of the elongated light transmissive body is configured such that there is a cavity with the material of the elongated body at least partially surrounding the cavity.

In yet other embodiments, the elongated light transmissive body is tubular shaped. Therefore, in embodiments the elongated light transmissive body has a tubular shape having a cavity surrounded by the elongated light transmissive body.

Especially, the cavity has a cross-section having the same symmetry as the cross-section of the elongated light transmissive body. Hence, a tubular shaped elongated body having a circular cross-section may also have a cavity having a circular cross-section. Likewise, an elongated body having a polygonal cross-section may have a cavity also having a polygonal cross-section. Note that it is not necessarily the case that the cavity has a cross-section having the same symmetry as the cross-section of the elongated light transmissive body. Further, the edge(s) of the cavity may be configured essentially parallel to the edge(s) of the elongated light transmissive body. However, when the elongated light transmissive body tapers, in embodiments the edges of the cavity and the elongated body may not be necessarily parallel (see below). Further, the cavity may have the same length as the elongated body or may have a shorter length. In general, at least at one end face (herein in embodiments also indicated as first face and second face) the elongated body may have an opening to the cavity (like a vase).

Further improvements of the outcoupling may be achieved when the cavity comprises a light transmissive material. Therefore, in embodiments at least part of the cavity, especially the entire cavity, comprises a light transmissive material, differing in composition from the composition of the material of the elongated light transmissive body. In specific embodiments, the light transmissive material in the cavity has an index of refraction equal to or lower than the light transmissive material of the light transmissive body. An example of a suitable filling may comprise one or more of $MgF_2$ or $CaF_2$, silicone, glass or transparent ceramics like spinel, poly-crystalline alumina, sapphire, YAG, a material similar (e.g. when the light transmissive body comprises a garnet, the filling may also comprise a garnet, but based one or more other constituents), or identical (e.g. same garnet material) to the first body material, but especially without the phosphor. The materials should especially be transparent, but could be amorphous, poly-crystalline or single crystalline.

The drawback of current HLD is that one cannot make use of leakage of blue to make white light. However with the present invention it is possible by making for example yellow light (green+blue) with outer rod and with inner rod one could generate blue. Especially, with no or nearly optical contact of the rods, the efficiency may be higher.

Blue light can be either added by putting high power blue LED/Laser in front of light guide which is put in the yellow rod. Or one could use a blue HLD rod in the center with 405 nm pumping LED. At the end of the rods, if needed, mixing of light can be done. For theatre and stage lighting an etendue of 16 $mm^2$ sr such as commonly required for beamers is not necessary. An etendue of 500 $mm^2$ sr may be sufficient; may be obtained with bodies with a relatively large cross-sectional area. A larger etendue allows more (low-power) light sources to pump the body. Further, it appears that cylindrical rods can be produced easier and thus also more reliable.

By putting various diameter cylindrical rods in each other one can generate white light without the use of expensive dichroic mirrors. Even tuning of the spectrum is possible. Also it can be done in an efficient and cost effective way because the making of round rods is in principle cheaper to make. Outside can be easily polished but inside it may be more difficult for small and long rods. Still it seems that scattering of inside rod has less negative effect as scattering at outside rod.

For facilitating incoupling of light, the tube diameter can be made a bit larger and afterwards taper a bit towards the nose. First simulations show that tapering from a relative diameter 1.00 to towards a relative diameter of 0.60 is possible without essentially losing light (i.e. the diameter reduces towards the nose with 40%). Even, it may be beneficial extracting a bit more light towards the desired direction.

Use of round shapes may imply an essentially round light distribution which is advantage for lighting applications. Rectangular hollow tubes can also be put together. To mix the colored light from the different round tubes one could use an integrator element, such as especially an integrator rod. For example, one may use FlyEye optics. Optionally, the integrator element is comprised by (i.e. especially integrated in) the elongated light transmissive body. One could also attach this round combination first to a small piece of transparent (rectangular or differently shaped polygonal) tube in order to mix the light properly and then attach the collimator, such as a CPC, or other optical element, such as a dome shaped optical element.

Hence, the luminescent element may further comprise an optical element optically coupled to the elongated light transmissive body such as a CPC. However, in yet other embodiments the optical element comprises a plurality (i.e. 2 or more) of optical fibers, optically coupled to the elongated light transmissive body. In yet further embodiments, the output side of the optical fibers may be coupled to yet another optical element, such as a collimator, such as a CPC, or other optical element, such as a dome shaped optical element.

Hence, the luminescent element may comprise a plurality of elongated light transmissive bodies. In embodiments, a single light transmissive body together with the light source may provide white light. However, as indicated above, in general a single light transmissive body and one or more (radiationally coupled) light sources may especially be configured to provide colored light. Hence, when a plurality of elongated light transmissive bodies is applied, this may e.g. be used for providing white light (in a first mode of the lighting device; see further below). Therefore, also single-color systems, multi-color systems, off-BBL or non-white color point, emitting luminescent elements may be provided.

Especially, as indicated above, when hollow elongated light transmissive bodies are applied, a smaller body may be configured in a cavity of a larger body. Therefore, in specific embodiments, the invention also provides a luminescent element according to any one of the preceding claims, comprising a plurality of elongated light transmissive bodies, each elongated light transmissive body comprising a luminescent material configured to convert at least part of a light source light selected from one or more of the UV, visible light, and IR received by the elongated light transmissive body into luminescent material radiation, wherein: (i) the elongated light transmissive bodies may differ in e.g. one or more of (a) length (L) of the elongated light transmissive bodies, (b) type of luminescent material, (c) concentration of luminescent material, (d) concentration distribution over the elongated light transmissive body, and (e) host matrix for the luminescent material; (ii) each elongated light transmissive body has an axis of elongation (BA); (iii) one or more of the elongated light transmissive bodies comprise cavities; and wherein the elongated light transmissive bodies are configured in a core-shell configuration wherein a smaller elongated light transmissive body is at least partly configured in the cavity of a larger elongated light transmissive body and wherein the axes of elongations (BA) are configured parallel. Alternatively or additionally, the elongated light transmissive bodies may in embodiments also differ in one or more diameter and wall thickness.

The lengths of the elongated light transmissive bodies may essentially be the same, or may differ.

In specific embodiments, the elongated light transmissive bodies have side faces, and wherein side faces of adjacent elongated light transmissive bodies have no physical contact or only over at maximum 10% of their respective surface areas.

In specific embodiments, the elongated light transmissive body has a first face and a second face defining a length (L) of the elongated light transmissive body; wherein the side face comprises the radiation input face, wherein the second face comprises the radiation exit window.

As indicated herein, the luminescent element may comprise a plurality of light transmissive bodies. Therefore, in yet a further embodiment the invention provides a lighting device as defined herein, comprising the luminescent element with a plurality of elongated light transmissive elements, which are especially configured in a core-shell configuration, wherein the lighting device further comprising a plurality of light sources, wherein one or more light sources are configured to provide light source light to the side face of an outer elongated light transmissive body and/or wherein one or more light sources are configured to provide light source light to one or more first faces, wherein the one or more first faces are end faces, and/or wherein one or more light sources are configured in a cavity of an inner elongated light transmissive body and configured to provide light source light to the side face of the inner elongated light transmissive body. Hence, in embodiments one or more light source may be configured to provide light to an outer side face of an outer (shell) elongated light transmissive body. Alternatively or additionally, in embodiments one or more light source may be configured to provide light to an inner side face of an inner (shell) elongated light transmissive body.

In embodiments, the multiple elongated bodies may be comprised by a monolithic body where the elongated bodies may not be physically separate, but e.g. only have a different host matrix realized by e.g. 2-component extrusion or 2-component injection molding; see also elsewhere.

Especially, in a first mode of operation the lighting device is configured to provide white light. However, the lighting device may also be configured to provide (in embodiments another mode of operation) to provide colored light or infrared light. Especially when two or more elongated bodies are applied, in embodiments the spectral distribution of the lighting device light (i.e. the light emanating from the lighting device) may be controllable.

Hence, in embodiments at least two elongated light transmissive bodies provide luminescent material light with different spectral distributions. This may be used to provide e.g. colored light with e.g. a broad spectral distribution. Especially, the lighting device may further comprise a control system, configured to control the spectral distribution of the lighting device light. The phrase "with different spectral distributions" may in embodiments refer to spectral distributions having intensity averaged emission maxima at wavelengths that are position at least 10 nm, such as at least 20 nm from each other.

A luminescent element with a plurality of elongated light transmissive bodies may comprise a plurality of optical elements. These may be configured downstream of the radiation exit faces. However, also an integrated optical element may be used, that is configured downstream of more than one of the light transmissive bodies. This may be useful for a core-shell configuration, but also for a configuration wherein a plurality of elongated light transmissive bodies are configured in a bundle kind of configuration.

Therefore, in embodiments the lighting device may further comprise an optical element, wherein the optical element comprises a first wall and a second wall surrounding the first wall thereby defining an optical element having a ring-like cross-section, wherein the optical element comprises a radiation entrance window and a radiation exit window, wherein the radiation entrance window is optically coupled with the plurality of elongated light transmissive bodies. Such optical element may have a shape like a fluted tube or Bundt pan. However, other options may also be possible (see below), wherein e.g. a tapering in a direction away of the light transmissive body may be possible.

Light concentrators (herein also indicated as "elongated light transmissive body", "transmissive body", "luminescent concentrator", "luminescent body", or as "rod") that may be used in e.g. HLD (high lumen density) light sources may have a rectangular cross section, and (blue LED and/or laser diodes) light from external can coupled-in in the rod and converted by a phosphor to light of longer wavelength. The emission of light by the phosphor is omnidirectional in a random way. That means that a part of the light leaves the rod immediately, by transmission through one of the four long sides of the rod. This light, as a fraction of the total emitted light, is given by the solid angle of the four light cones in which the light has an angle with the rod surface smaller than the critical TIR angle, as compared to the total solid angle of $4\pi$.

For light concentrators based on YAG or analogous garnet material (see below) the refractive index is close to 1.84, and the solid angle of the 4 cones together occupies 32% (disregarding reabsorption) of the whole space. Assuming no reabsorption, this light can (to a large part) be considered as lost light, as even reflectors around the rod cannot help to get light into total internal reflection (TIR) in the rod. It is important to note that the position of the light generation in the rod has no implication for the relative light fractions.

Light concentrators can especially be used in combination with optical element for improving outcoupling of the light from the concentrator and/or for beam shaping. A choice for such optical element is an optical concentrator element, such as a compound parabolic concentrator (CPC) (see also below).

When using a high-index CPCs (n_CPC>1.55 in case of n_rod=1.84), some of the light that is generated very close to the CPC could either be non-TIR or could be coupled out via the CPC, dependent on the exact position.

Hence, for a light concentrator with a n=1.52 CPC, three light fractions can be discerned, namely Non-TIR light in the cones that are directly transmitted through one of the four long sides.

Light in the cones that are aligned with the long axis (z-axis) of the rod, this light sometimes is called TIR-to-Nose light, as this light is in TIR in the rod until it hits the CPC, and is transmitted through the CPC. The rays that go into the CPC have an angle with the z-axis that is smaller than the critical TIR angle that holds for the n_rod-n_CPC combination. The light in the cone that is directed towards the tail may at least partly reflect at the tail via TIR or via Fresnel, or via an external mirror (see also below), and also leaves the rod at the CPC.

The remaining light fraction is in TIR and—in theory, in a perfect rod—these rays cannot escape from the rod. This fraction is sometimes called locked-in TIR light (after the Locked-in syndrome).

In case n_CPC=n_rod, this locked-in light fraction III does not exist, all the light that is in TIR is leaving the rod via the CPC.

In case n_CPC<n_rod, there is locked-in light, but in practice the light is not contained in the rod forever, but is scattered after some length, or re-absorbed and re-emitted again, and if this happens in a random way, eventually the light is redistributed over the fractions I and II. Under full randomization of the light by scattering, the fractions I and II are also the weighing factors for the redistribution of the locked-in light. This is below also indicated in a table.

| Light fractions in rectangular rod | n_rod = 1.84, n_CPC = 1.84 | n_rod = 1.84, n_CPC = 1.52 | n_rod = 1.84, n_CPC = 1.52 redistributed Locked-In |
|---|---|---|---|
| I non-TIR | 32% | 32% | 32% + 11% = 43% |
| II TIR-to-Nose | 68% | 43% | 43% + 14% = 57% |
| III Locked-in TIR | — | 25% | redistributed |

Rods (up to now with rectangular cross section) are expected to have a maximum optical efficiency depending on the refractive index of the rod. If the optical efficiency is defined as the ratio of luminescent material light that goes into the CPC over the total luminescent material light generated in the elongated light transmissive body, the believed maximum is 68% in case of n_rod=n_CPC=1.84, and is lower, about 57%, in case of a rod with n_rod=1.84 and n_CPC=1.52 (glass). In the latter case, part of the locked-in fraction (III) is converted into the TIR-to-Nose fraction (II) via scattering or via re-absorption and re-emission.

Hence, it is an aspect of the invention to provide an alternative lighting device comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

It appears that in a round rod the three light fractions have different values. If the light is generated somewhere in the heart of the rod, the light fraction I (non-TIR) is high. The light fraction II is still the same as for a rectangular rod, and Locked-in Light is virtually not present. Further, it surprisingly appears that with n_rod=1.84, the light fraction that is escaping from the rod directly (non-TIR) is only 16% if it is generated in the skin of the rod (skin thickness=0). If light is generated on the skin, the non-TIR cone angles to both sides perpendicular to the skin are identical for the round rod and rectangular rods, which can be proven by simple goniometry. For that reason, the non-TIR fraction for skin generated light is exactly half of the non-TIR fraction in a rectangular rod. The non-TIR loss has been modelled analytically for round and rectangular rods. Assuming the light to be generated at a distance x from the wall, the non-TIR fraction increases with the relative distance to the wall, as expressed in the ratio x/r, which is the case for round rods only. Further, it surprisingly appears that up to about x/r=0.4 there is lower non-TIR losses for round rounds as compared to rectangular rods. For a round rod of 2 mm diameter this is up to a depth of 0.4 mm.

The afore-mentioned consideration may not only apply to essentially massive CPCs as optical element downstream of the luminescent concentrator, but may also apply for other optical elements, such as a dome, a wedge-shaped structure, a hollow CPC, et cetera.

Hence, the invention provides in an aspect a luminescent element comprising an elongated light transmissive body, the elongated light transmissive body comprising a side face, wherein (i) the elongated light transmissive body comprises a luminescent material configured to convert at least part of a light source light selected from one or more of the UV, visible light, and IR received by the elongated light transmissive body into luminescent material radiation; (ii) the side face comprises a curvature with a radius (r); and (iii) the concentration of the luminescent material is chosen such that at least 50%, such as at least 60%, like at least 70% of the light, especially at least 80% of light, at one or more radiation wavelengths is absorbed within a first length (x) from the side face, wherein in specific embodiments especially $x/r \leq 0.4$ applies.

In the case of hollow light transmissive bodies or in the case of light transmissive bodies with a high luminescent material concentration in an outer region of the body and a lower concentration (including zero) at a more inner part of the body, such as a core, the concentration of the luminescent material may be lower, as radiation that is not absorbed may escape from the body but be absorbed again. Hence, assuming perpendicular irradiation of the side face from external of the light transmissive body, thus not from inside in the cavity, the concentration of the luminescent material may also be chosen such that at least 50% of the radiation, such as at least 60% of the radiation of the light source, like at least 70%, especially at least 80%, is absorbed. Here, the perpendicular radiation may thus especially include propagating through a first region with relatively high concentration and before emanating from another part of the body also propagation through a second region with relatively high concentration. Hence, in specific embodiments also for this configuration the concentration of luminescent material may be chosen such that in total at least 50%, such as at least 60%, like at least 70%, such as especially at least 80%, is absorbed within a first length (x) from the (outer) side face, wherein in specific embodiments especially $x/r \leq 0.4$ applies, where r refers to the radius of the outer surface of the hollow light transmissive body.

With such element it may be possible to provide in a more efficient way light, escaping from the transmissive body, when the transmissive body is illumination with light source light that is at least partially converted by the luminescent material comprised by the transmissive body. The outcoupling may be higher than in luminescent bodies having a rectangular cross-section.

Especially, the concentration of the luminescent material is chosen such that at least 50%, such as at least 60%, like at least 70% of the light, especially at least 80% of light, at one or more radiation wavelengths is absorbed within a first length (x) from the side face, wherein especially $x/r \leq 0.4$ applies.

In embodiments, the radius (r) is selected from the range of 0.1-200 mm, such as 0.2-200 mm, like especially 0.25-50 mm, such as 0.5-50 mm. When a blue light source is applied, especially the luminescent material absorbs in the blue. Or, the other way around, when the luminescent material absorbs in the blue, especially a light source may be applied that emits in the blue. In specific embodiments, the concentration of the luminescent material is chosen such that at least 90% of light in the blue is absorbed within the first length (x) from the side face, wherein $x/r \leq 0.4$ applies, and wherein the first length (x) is equal to or less than 5 mm. In specific embodiments, $x/r \leq 0.3$, such as $x/r \leq 0.2$. However, especially, $x/r \geq 0.01$, such as $x/r \geq 0.02$.

Here, especially at least the side face may be irradiated by the light source.

As indicated above, the side face comprises a curvature with a radius (r). When the body comprises a plurality of side faces, such as in the case of a body having a rectangular with one face being curved, at least the curved side face may be irradiated with the light source. One or more side faces may comprise a radius, which may be different or which may be alike; especially they may be the same. The radius is especially defined in relation to a body axis. Further, a side face may comprise a plurality of curvature. In general, however, the number of different curvatures for a single side face are limited, or the radii are found within a limited range (such as differing from each other within about 5% from a mean value), or there is only a single radius value.

In specific embodiments, the side face has a convex shape. Further, especially a plurality of convex shaped side face may be available. In yet other embodiments, however, there is essentially a single side face that has a curvature. This is especially the case when a rod is applied having a circular cross-section.

In embodiments the elongated body of the luminescent element especially comprises a first side face and a second side face, one of these being convex and one of these being concave, with the latter defining a cavity. For instance, this may be the case when a concave shaped or convex shape body is applied, by which one a convex and a concave side face may in embodiments be available. Especially, in embodiments the elongated light transmissive body may have a tubular shape having a cavity surrounded by the elongated light transmissive body. For yet even higher outcoupling efficiencies, the cavity may be filled with (another material). Therefore, in embodiments at least part of the cavity, especially the entire cavity, comprises a light transmissive material, differing in composition from the composition of the material of the elongated light transmissive body. In specific embodiments, the light transmissive material in the cavity has an index of refraction equal to or lower than the light transmissive material of the light transmissive body (but higher than air). An example of a suitable filling may comprise one or more of $MgF_2$ or $CaF_2$, silicone, glass or transparent ceramics like spinel, poly crystalline alumina or sapphire, YAG or a material similar to the first body material, but without the phosphor. The materials should be transparent, but could be amorphous, poly-crystalline or single crystalline.

In this way, a body may be obtained with a (virtual) outer shell with a high concentration of the luminescent material, and a core with a lower concentration of the luminescent material (including essentially no luminescent material). For instance, a cerium containing garnet may be provided as tube, with a filling of essentially the same garnet, without cerium. Such body with a core-shell configuration of the luminescent material, with a higher concentration luminescent material in the shell and a lower concentration (including zero) at the core may in embodiments have a distribution which is essentially defined by one or more specific regions with a high concentration, but all regions essentially having the same concentration, and one or more specific regions with a low concentration (including zero), but also all these regions essentially having the same concentration. This might in embodiments be a kind of binary distribution. In other embodiments, the distribution may have a gradation, with a gradual decrease from a relatively highly concentrated region to a relatively low concentration (including in embodiments zero).

In specific embodiments, the light transmissive material in the cavity has a substantially equal index of refraction to the material of the light transmissive body. This may allow a substantial absence of scattering of light at the interface. Such system can be realized by e.g. co-extrusion of starting materials (such as green masses) with and without cerium, respectively that are co-sintered into a monolithic component.

Hence, in embodiments the refractive index throughout the elongated light transmissive body may be essentially constant, but the activator (such as trivalent cerium) may essentially be present only in a shell, which is configured as radiation input face (which may also be indicated as light entrance window or light entrance face).

The elongated body may be, as indicated above, tubular. However, the elongated body may also be massive, and may e.g. have an essentially circular cross-section. Therefore, in embodiments the elongated light transmissive body has an axis of elongation (BA) and a circular cross-section perpendicular to the axis of elongation (BA).

Here, especially the elongated light transmissive body has a first face (or "first end face") and a second face (or "second end face") defining a length (L) of the elongated light transmissive body; wherein the side face comprises the radiation input face, wherein the second face comprises the radiation exit window.

Assuming e.g. solid round elongated light transmissive bodies, light that is generated in the "skin" of the rod may be carried by the elongated light transmissive body acting as a kind of light guide. The light that is aligned with the main axis ("body axis" or "axis of elongation") or under small angles with the main axis is coupled out via the CPC. There is also a large portion of the light that moves along the circumference of the rod with only a small component along the main axis, so these rays follow a kind of a screw pattern. When these rays are coupled out by the CPC the rays are under a very large angle with the axial (z-)direction and add a lot to the value of the etendue. However, low values of the etendue are essential for a good performance of the module. In case of an n_CPC_<n_rod, a lot of the light in the rod cannot escape from the rod via the side (non-TIR) or via the outer ends (TIR-to-Nose), but this light is "locked-in". Reflections on the side or on the flat surface at the tail or the CPC do not change this property of the locked-in rays. Scattering (volume scattering or surface scattering) can change the direction in such a way that locked-in rays can either escape to the sides or to the CPC. In principle the re-distribution of Locked-in light over these two routes by random scattering is with weighing factors according to the solid angles of non-TIR light and TIR-to-Nose light. Therefore part of the locked-in light is lost towards the side.

Hence, it is an aspect of the invention to provide an alternative lighting device comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

It surprisingly appears that if one end or both ends of the rod are faceted, the "screwing" rays are aligned better with the main axis after reflection on one of the facets. By that the locked-in light re-distribution is no longer 'randomly' over non-TIR and TIR-to-Nose, but the TIR-to-Nose fraction is increased and by that the efficiency of the module improves. Also the etendue of the output light is improved. However, at the same time the light that was heading axially towards the mirror is affected. If the tilts of the facets are too big the faceting may have a net negative effect on the total performance, so small angles are required leading to top angles of at least about 100°, such as at least about 120°, for example 170° top angles on the kink between the facets. Further, it surprisingly appears that for placement of a mirror at one outer end of the rod it can be useful to make the count as low as possible, which could be just four facets. If reducing the facet count even more, the effect of the facets is changed and the gain in performance is less. A single facet on the rod end is an extreme case, which means the rod end is non-perpendicular to the side, it is tilted. This enables easy fixation of a mirror, but appears to be less effective. At the nose end (end with exit window) of the rod, a faceted structure on the rod is also useful if the CPC has a lower refractive index than the rod. In embodiments, the CPC can be shaped with the same facets to have a thin adhesive layer in between. Locked-in light can bounce up and down the rod and with each reflection at one of the outer ends the light direction is aligned more with the z-axis. For a hollow or solid, round or elliptical rod similar facets are possible, in general it makes sense to have the facets more at the edges and less in the center of the rod ends. The same solution can be applied for a rectangular rod, facets that merge/vanish in the rod center. It also appears to apply to solid rectangular rods and hollow rectangular rods. Therefore, in embodiments the CPC is especially shaped with the same facets to match with the shape of the elongated light transmissive body. The CPC may thus be directly attached to the light transmissive body or may be bonded to it by a thin adhesive layer in between. Alternatively, the CPC has a circumferential shape that differs from the elongated light transmissive body, which may be advantageous in specific applications. Hence, using—in embodiments—facets at one or more ends of an elongated light transmissive body having a circular cross-section or non-circular cross-section (or non-tubular cross-section) appears to be advantageous.

Hence, in an aspect the invention provides luminescent element comprising an elongated light transmissive body, the elongated light transmissive body comprising a side face, wherein: (i) the elongated light transmissive body comprises a luminescent material configured to convert at least part of a light source light selected from one or more of the UV, visible light, and IR received by the elongated light transmissive body into luminescent material radiation; (ii) the elongated light transmissive body has a first face and a second face defining a length (L) of the elongated light transmissive body; and (iii) one or more of the first face and the second face comprise a plane comprising surface modulations thereby creating different modulation angles (β) relative to the respective plane.

As indicated above, such luminescent element may allow an increased outcoupling of the light from the elongated light transmissive body. Especially, the plane has at least two surface modulations, e.g. a wedge-shaped first face or second face. Even more especially, the plane has at least four surface modulations, such as a tetragonal pyramid shaped first face or second face. However, with e.g. four surface modulations, also a kind of checker board structure or saddle shape structure can be provided, with two faces forming a top and two faces forming a cavity. However, many more shapes are possible, including multi-faceted shapes and curved shapes. Further, the first face or the second face may have a cross-sectional shape selected from e.g. square, rectangular, round, oval, ring-like, etc. etc., which further adds to the different options for creating modulations (see further also below).

In specific embodiments, the plane comprises n/cm$^2$ facets as modulations, wherein n is selected from the range of 1-10,000, such as 1-1000. Especially, at least two facets have different modulation angles (β). Hence, there may be two or more subsets having mutually differing modulation angles but wherein within the subsets the modulation angles may be identical.

However, it appears that in some embodiments at least four facets may already improve the outcoupling and/or beam shape; a substantial increase in gain was found. For round rods, one facet might work, but in simulations it appeared that at least four facets may have a desirable impact on the outcoupling and/or beam shape. For round rods, i.e. for cylindrical shaped bodies, the facets are especially radially orientated. For rectangular, rods even a single facet may provide a positive effect on the gain, especially at least two, such as at least four.

In specific embodiments, especially when curved modulations are applied, the plane may comprise at least four different modulation angles (β).

Further, it appears that when the elongated light transmissive body has a cross-section that include curves, such as having a round cross-section (circular rod), the modulations are especially parallel to the radii and are not configured with angles relative to the radii. In other words, the modulations may be radially oriented and have—in specific embodiments—essentially no radial deviations; especially this may be realized when a substantial number of facets is applied, like at least 10. When a limited number of facets is applied, such as four (or more) facets, there may be some radial deviation of the facets. Therefore, in specific embodiments the elongated light transmissive body has an axis of elongation (BA), the side face comprises a curvature with a radius (r); and the modulations have angles (γ) relative to perpendiculars (r1) to the axis of elongation (BA) selected from the range of 0-90°, such as 0-80°, such as 0-45°, like especially 0-35°, like in embodiments 0-20°, such as e.g. 0-10°, such as about 0°±5°, like 0°±2°. Especially, the angles (γ) are >0°. Angles in the order of 25-35° seem beneficial for facets at the first face, optionally combined with a reflector downstream thereof. Facets at the second face may have even larger mutual angles.

Especially, the term "facet" refers to a flat facet. In specific embodiments, the facets may be curved. For instance, when applying a limited number of facets, such as about four, at the first or second surface a body having a circular cross-sectional shape, in embodiments such facets may be curved.

Here, especially the elongated light transmissive body has a first face and a second face defining a length (L) of the elongated light transmissive body; wherein the side face comprises the radiation input face, wherein the second face comprises the radiation exit window.

For LED based projection, the first generation of High Lumen Density modules has been developed based on a luminescent concentrating rod that has a rectangular cross section. This shape was chosen as it is convenient to couple light into the rod and to cool the rod, while it also can be chosen to match with the aspect ratio of panels that are used for projection. There is however a strong desire for lower cost solutions, for other dimensions, for other shapes, for spectral tuning options, and for more robust module architectures.

Traditionally single crystal boules are drawn from a melt (Czochralsky method) from which individual rods, e.g. for light conversion, are created by wire sawing, grinding and polishing. Typically square or rectangular rods are produced in this way, as also used in the first generations of the High Lumen Density (HLD) light sources for projection engines. New production technologies enable new cross-sectional shapes: via the micro pull down technology, almost any cross-section shape of a single crystal linear structure can be created. For poly crystal material via extrusion various shapes may be created, but then most likely additional polishing steps are required for light concentrator structures. It appeared possible to manufacture diverse cross-sectional shapes of single crystal material.

A suitable luminescent concentrator may be based on an elongated body with a plurality of light sources pumping the rod from the side, with the rod having a rectangular cross-section.

With such configurations there may be some issues that may not be always desirable:

1. The luminescent rods can e.g. be manufactured from a large single crystal by sawing with subsequent grinding and polishing, resulting in very high process cost;
2. Light losses are relatively high due to the four escape cones associated with the four sides of the rods;
3. Other applications do require other shapes of the light emitting surface area of the light source, as there are e.g. the preferences for circular beams in case of spot lamps, for efficient coupling into (round) optical fibers (e.g. for microscope illumination), or for content addition to illumination (by additional projection of images);
4. Positioning of the rectangular rod is difficult as it needs to be mounted at a very small distance from the pump LEDs to achieve reasonably high coupling efficiencies;
5. As the highest pump LED brightness can be achieved by an array of multiple chip-scale-package LEDs, and these dies all show side emission next to top emission, there is an intrinsic penalty in coupling efficiency due to relative high losses in the sidewards emitted light;
6. Application of spectrally different converters to tune the overall light source spectrum is very elaborate due to practical issues concerning placement of the converters.

This alternative single crystal manufacturing approach as described before may offer a production technology where surface grinding and polishing would not be needed anymore, enabling completely new shapes for luminescent concentrating bodies that are out of reach for polycrystalline converters.

Hence, it is an aspect of the invention to provide an alternative lighting device comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

With the new converter shapes and module architectures as now presented, most or all of these disadvantages may be overcome or may be significantly reduced, resulting in high brightness light sources with highly reduced cost or with highly improved performance characteristics. Amongst others, a luminescent concentrating body with a specific cross-sectional shape that enables improved coupling efficiency, improved light extraction, improved cooling, improved converter mounting, improved module assembly, and/or improved light source robustness by features related to that specific cross-sectional shape is herein proposed. Amongst others, one or more of the following features of an elongated light transmissive body and/or lighting device with such body may be included:

embedding of the pump LEDs and/or laser diodes within linear cavity in the converter (and thereby improving the coupling efficiency of pump light to the luminescent converter);

positioning/alignment of the converter body in the high brightness module;

defining the distance from pump LEDs and/or laser diodes to the converter (such as for an optimized coupling efficiency of pump light into the luminescent converter and/or for optimizing thermal transfer from the luminescent converter via the LEDs of LDs to a heat sink;

reducing the light extraction cones from 4 down to 2 resulting in reduced light losses and therefore an increase module performance;

mounting of multiple converters next to each other or within each other, enabling spectral tuning of the light source output;

alignment of the pump LEDs or pump LDs relative to the luminescent converter;

(control of) transfer of heat from the luminescent converter to the substrates of the pump LEDs or pump LDs;

(control of) transfer of heat from the luminescent converter via the pump LEDs or pump LDs to the heat sink by ensuring thermal contact between these components.

Specific converter cross sectional profiles that enable one or more distinct advantages are I shapes, O shapes, T shapes, U shapes, and more complex versions can be provided with this solution.

Specific configurations combining LED and/or laser pumped converter emission with laser emission are enabled by some architectures with a hollow converter and covered by the scope of this invention.

In an aspect, the invention provides a luminescent element comprising an elongated light transmissive body, the elongated light transmissive body comprising a side face, wherein: (i) the elongated light transmissive body comprises a luminescent material configured to convert at least part of a light source light selected from one or more of the UV, visible light, and IR received by the elongated light transmissive body into luminescent material radiation; and (ii) the side face comprise a cavity or a protrusion.

Such elongated element allows arrangement of other elements in the cavity and/or allows a functional coupling with yet other elements.

Therefore, in embodiments the elongated light transmissive body (of a lighting device) comprises a cavity, and one or more light sources are at least partly configured in the cavity.

In yet other embodiments, the elongated light transmissive body (of a lighting device) comprises a protrusion, wherein the lighting device further comprises receptor element configured to host at least part of the protrusion. The receptor element can be a holder. In other embodiments, the receptor element may be a heat sink (which may thus in embodiments also be configured as holder) of may be (thermally) coupled to a heat sink. Therefore, the receptor element can host at least part of the protrusion for alignment of the elongated light transmissive body and/or thermal energy transfer from the elongated light transmissive body to the receptor element.

Likewise, the elongated light transmissive body (of a lighting device) comprises a cavity, wherein the lighting device further comprises protruding element configured to enter at least part of the cavity. The protruding element can be a holder. The protruding element can be a holder. In other embodiments, the protruding element may be a heat sink (which may thus in embodiments also be configured as holder) of may be (thermally) coupled to a heat sink. Therefore, the protruding element can at least partly be hosted in the cavity for alignment of the elongated light transmissive body and/or thermal energy transfer from the elongated light transmissive body to the protruding element.

Therefore, in embodiments the light sources may be configured at one or more substrates, wherein the one or more substrates are configured as heat sinks or are thermally coupled with heat sinks. Alternatively or additionally, in embodiments one or more reflectors may be configured at one or more substrates, wherein the one or more substrates are configured as heat sinks or are thermally coupled with heat sinks. The use of cavities and protrusions allow a combination of features, which reduces space and which may also reduce undesired optical contact with the body.

In embodiments, the elongated light transmissive body has a cross-sectional shape selected from the group consisting of an oval shape (or O-shape), a U-shape, a T-shape, an I-shape and an H-shape, such as in embodiments a T-shape, an I-shape and an H-shape. In yet other embodiments, the elongated light transmissive body has an axis of elongation (BA), and the elongated light transmissive body has a cross-sectional shape perpendicular to the axis of elongation (BA) selected from the group consisting an oval shape and a U-shape. The oval shape may thus be hollow. The term "shape" especially refers to a cross-sectional shape. For irradiation an oval body with radiation, especially those part(s) of the side face(s) may be applied with the larger radii.

In embodiments, the cavity may have a width of at least 0.2 mm, such as at least 0.5 mm, and a depth of at least 0.02 mm, such as at least 0.1 mm, and a length of at least 1 mm, such as at least 5 mm. The cavity dimensions may have a volume selected from the range of about 0.1-10 mm$^3$. Such cavities can e.g. host a LED, or a plurality of LEDs.

The cavity can e.g. be configured as a trench, for hosting a plurality of light sources. Hence, in embodiments the elongated light transmissive body comprises one or more of a (i) a plurality of cavities, (ii) one or more elongated cavities, (iii) a plurality of protrusions, and (iv) one or more elongated protrusions.

The cavity may be used for one or more of (1) aligning the pump light sources during mounting (on their substrate), (2) for having the pump light sources in thermal contact (via their top surface) with the body to have the body cooled via the light sources, such as LEDs or LDs, and (3) enabling direct thermal contact between the elongated light transmissive body and the substrate or heat sink carrying the LEDs (or LDs) to enable heat transfer from the elongated light transmissive body to a heat sink.

In embodiments, the elongated light transmissive body may taper over at least part of its length. Especially, the radiation exit window is at a part that tapers. In specific embodiments, a side face is slanted relative to an end face. Note that a fully tapering may lead to a variant wherein a side face and an end face are essentially identical, such as in the case of a cone or in the case of a pyramid.

In specific embodiments, it appears beneficial when the tapering is such that the cross-sectional plane through which light may propagate essentially stays constant over the tapering. Such situation may be achieved when using a hollow body, wherein the tapering of an outer plane may be less than the tapering of an internal plane (of the cavity). Hence, in embodiments, the elongated light transmissive bodies has a tubular cross-section perpendicular to an axis of elongation (BA), wherein the tubular elongated light transmissive body tapers along at least part of the length of the axis of elongation (BA) while maintaining a cross-sectional area perpendicular to the axes of elongation (BA) constant. In yet other embodiments, however, the cross-sectional area may reduce with (increasing) tapering, for instance with a reduction of up to 20% (i.e. 80% of the cross-sectional area at the broadest or untampered part), as recycling may further improve the gain. In yet further embodiments, the cross-section area may even further reduce with (increasing) tapering.

In further specific embodiments, it may be beneficial when the tapering is such that the product of (i) the area of cross-sectional plane through which the light is propagating and (b) the divergence of the propagating light stays essentially constant over the tapering. Such situation may in embodiments be achieved when a CPC-like or other curved wall shapes are applied in the tapering section. The divergence may e.g. be described as the solid angle (expressed in steradian) comprising the light rays in the material.

When a body is used wherein the absorption is essentially in the skin, at an end face of the body light may escape in a way that reflects the absorption. For instance, assuming a rod wherein light is essentially absorbed in an outer ring, at an end face a ring like intensity distribution will be generated. Hence, one may reflect the light at the radiation exit window with low intensity by arranging a reflector at the radiation exit window such that only part of the light can escape. For instance, in this way one can discriminate between areas that have less than 5%, or even less than 10% of the high intensity areas.

Therefore, in embodiments the luminescent element further comprising a first reflector and a second reflector wherein:

the elongated light transmissive body has a first face and a second face defining a length (L) of the elongated light transmissive body; wherein the second face comprises a first radiation exit window;

the first reflector is configured at the first face and is configured to reflect radiation back into the elongated light transmissive body; and the second reflector has a cross-section smaller than the radiation exit window, wherein the second reflector is configured to reflect radiation back into the light transmissive body.

As indicated above, the elongated light transmissive body may have e.g. a round cross-section, may be tubular, may have a rectangular cross-section, etc. In specific embodiments, the elongated light transmissive body may have a polygonal cross-section perpendicular to the axes of elongation (BA). Especially, polygons with at least eight faces, such as at least 10 faces, may also provide good efficiencies (when pumped with light source light). When more than one elongated light transmissive body is applied, one or more of the elongated light transmissive bodies may have polygonal cross-sections perpendicular to the axes of elongation (BA). Hence, in alternative embodiments, the elongated light transmissive body, or the one or more of the elongated light transmissive bodies have circular cross-sections perpendicular to the axes of elongation (BA). In further embodiments, the elongated light transmissive body, or the one or more of the elongated light transmissive bodies have tubular cross-sections perpendicular to the axes of elongation (BA).

Further, in variants, the elongated light transmissive body, or the one or more of the elongated light transmissive bodies taper along at least part of the length of the axes of elongation (BA). As indicated above, in such variants the elongated light transmissive body, or the one or more of the elongated light transmissive bodies may have tubular cross-sections perpendicular to the axes of elongation (BA), wherein the one or more tubular elongated light transmissive bodies taper along at least part of the length of the axes of elongation (BA) while maintaining a cross-sectional area perpendicular to the axes of elongation (BA) constant.

If a solid cylinder is tapered, the cross-sectional area is changing (e.g., it reduces along the body axis over at least part of its length). As a consequence, the solid angle of the light rays changes as well (i.e.: it increases when the cross-sectional area decreases). For a narrowing tapering tube, if the wall thickness stays constant, the solid angle of the light rays increases, because the surface area through which the rays propagate decreases. This is a consequence of the fact that surface area times the solid angle is at best constant, or increases. If that surface area is kept constant, this may thus imply that the wall thickness increases. In such instance, the solid angle may stay constant. If solid angle times the surface area is constant, then the étendue may essentially be preserved(=constant), which is in many embodiments desired. Therefore, in embodiment the invention also provides configurations wherein the surface area times the solid angle is essentially constant. This may also refer to configurations in which the surface area increases during the tapering.

The term "tubular" may especially refer to an element having a curved cross-section, especially round. However, the term "tubular" may also be used for tubes having a rectangular or polygonal cross-section. Unless indicated otherwise, it is assumed that the cross-section of the cavity (of the tube) has essentially the same symmetry as the cross-section of the walls of the tube.

In embodiments, the body and the optical element may comprise identical materials and only slightly differ in composition. For instance, in embodiments the body comprises a cerium doped garnet and the optical element comprises the same garnet essentially without cerium. Therefore, in embodiments the elongated light transmissive body comprises a first material having a first composition, and the optical element comprises a second material having a second composition, and wherein the first composition and the second composition comprise identical materials. Note that in embodiments the optical element may also comprise luminescent material.

In specific embodiments, the elongated light transmissive body and the optical element are a single crystalline or a poly crystalline ceramic body. Such single body may be produced with the process as described herein.

In such embodiments, one may desire to have a higher concentration of luminescent material in the body than in the optical element; the latter e.g. having no luminescent material. Therefore, in embodiments the elongated light transmissive body comprises the luminescent material with a first concentration c1, and the optical element optionally comprises the luminescent material with a second concentration c2, wherein $0 \le c2/c \le 1$, such as $0 \le c2/c \le 0.1$, like $0 \le c2/c1 \le 0.01$. In embodiments, wherein the host material stays the same, and only the activator concentration changes, the terms "first concentration" and "second concentration", and where applicable similar terms, may refer to a concentration of the activator.

As indicated above, in specific embodiments the optical element comprises a compound parabolic concentrator or an adapted compound parabolic concentrator.

In yet further embodiments, the optical element comprises a hollow optical element. In yet further embodiments, the optical element comprises a massive body. The former may especially be for at least beam shaping, the latter may especially be for at least (further) facilitating light extraction from the elongated light transmissive body.

Hence, in specific embodiments the optical element comprises a solid body for facilitating outcoupling of light from the elongated light transmissive body, and the optical element and the elongated light transmissive body are configured in optical contact with each other.

The lighting device as described herein may thus further comprise an optical element. The optical element may optically be coupled with the first radiation exit window (of the elongated light transmissive body). The optical element may comprise a radiation entrance window configured to receive at least part of the converter radiation and a radiation exit window for escape from beam shaped converter radiation from the optical element. Further, the optical element may in embodiments also allow escape from the optical element with a higher efficiency than from the elongated light transmissive body in absence of the optical element, as the optical element may facilitate light extraction from the elongated light transmissive body. Light extraction may amongst others be facilitated with matching refractive indices. The closer to the refractive indices are, the better the extraction. Further, the smaller the deviation from the normal to that emission surface, the lower the Fresnel reflections and therefor the higher the extraction. The presence of an AR (anti-reflex) coating, such as on the light emission window, may also be beneficial.

Assuming the optical element also to be a body, such body is thus light transmissive, and may comprises materials as indicated elsewhere herein, especially in embodiments a material that is similar to the material of the elongated body. The refractive index thereof may be indicated as second refractive index n2; the refractive index of the material of the elongated light transmissive body may be indicated as first refractive index. At one or more (relevant) wavelengths, e.g. in the visible, such as at e.g. 550 nm, the second refractive index is in the range of 60-140%, such as especially in the range of 70-130% of the refractive index of the first material. When primarily (N)UV or (N)IR is to be coupled out, this may apply to a (N)UV or (N)IR wavelength, respectively.

Hence, in embodiments the lighting device may further comprise an optical element, wherein the optical element is configured to one or more of (i) collimating the luminescent radiation and (ii) extracting luminescent radiation from the elongated light transmissive body. Further, the optical element may be (a) optically coupled to the elongated light transmissive body, or the optical element and the elongated light transmissive body may be comprised by a single body (optionally also including an intermediate mixing element).

The term "luminescent element" is applied, as under irradiation with one or more of UV and visible light, the luminescent material will luminesce, whereby the transmissive body provides luminescent material radiation or converter radiation. Hence, the luminescent material is configured to convert at least part of a light source light selected from one or more of the UV, visible light, and IR received by the elongated light transmissive body into luminescent material radiation.

The luminescent element may have different shapes, which will be elucidated below, but in general has at least a side face and another face (in embodiments also indicated as "first face"). The side face, or yet another face may especially be configured as radiation exit window or may comprise such radiation exit window. The first face may especially be configured as back face, e.g. with a mirror configured downstream thereof. Hence, especially, the light source will irradiate one or more of the first face and the side face. Especially, in embodiments the radiation exit face and the side face are configured relative to each other under an angle being larger than 0° and being smaller than 180°, such as 90°. Further, especially, the first face and the side face are configured relative to each other under an angle being larger than 0° and being smaller than 180°, such as 90°. The first face and the radiation exit face may be configured parallel, though in specific embodiment the radiation exit face may be configured slanted relative to the first face. The first face and the second face may define a (largest) length of the elongated body. The elongated light transmissive body comprises a body axis, which may also be indicated as axis of elongation. Embodiments like these, and further embodiments, are defined in more detail below. The second face may comprise the radiation exit window. The radiation exit window may also be indicated as "light extraction window".

Note that the light transmissive body is transmissive for light but may be absorbing for other light. Especially, the light transmissive body absorbs at least part of one or more of excitation radiation, such as UV and blue radiation (or other radiation). However, especially the light transmissive body has a low absorption (and a low scattering), and thus high transmission, for emission radiation, such as in the green and/or yellow (or other emission wavelengths larger than excitation radiation.

For instance, when a UV light source is applied, the light transmissive body may be transmissive for blue light. Hence, especially the light transmissive body has a relatively high absorption for one or more wavelengths in the range where the luminescent material absorbs light and a substantially lower absorption, such as at least 10 times less, for one or more wavelengths where the luminescent material emits light (in the visible).

For elongated light transmissive bodies that have a curved side face, it may be desirable that the light of the light source is essentially absorbed in the "skin" of the light transmissive body. However, not only for curved faces it may be desirable to absorb essentially all light close to the surface. Also, for elongated light transmissive bodies that have a polygonal cross-section this may be advantageous, such as for bodies with non-rectangular cross-sections, such as a hexagonal or octagonal cross-section. Such light transmissive bodies may have a thickness d, and may have a concentration of the luminescent material chosen such that at least 80% of light at one or more radiation wavelengths is absorbed within a first length x from the side face, wherein $2*x/d \leq 0.4$ applies, especially $2*x/d \leq 0.3$, such as $2*x/d \leq 0.2$. However, especially $2*x/d \geq 0.02$.

Further, for instance to (further) influence the etendue (associated with the (minimum) total area comprising the elongated light transmissive body in a cross-sectional plane of the elongated light transmissive body), the elongated light transmissive body may taper along at least part of the length of an axis of elongation (BA). Further, it also appears that applying a surface modulation to an end face and/or a light outcoupling face may increase the light outcoupling. For instance, the first face (an end face) may comprise surface modulations. Therefore, in specific embodiments one or more of the first face and the second face may comprise a plane comprising surface modulations thereby creating different modulation angles ($\beta$) relative to the respective plane.

Further, an optical element may be used to beam shape and/or facilitate light extraction from the elongated light transmissive body. Therefore, in embodiments the luminescent element may further comprise an optical element optically coupled to the elongated light transmissive body. In yet further specific embodiments, the elongated light transmissive body and the optical element are a single body. In such embodiments, the radiation exit window may effectively be configured at the optical element. The optical element may in embodiments be selected from the group consisting of a compound parabolic concentrator, an adapted compound parabolic concentrator, a dome, a wedge-shaped structure, a conical structure, etc.

Examples of the material(s) of the elongated light transmissive body are elucidated further below. In specific embodiments, the elongated light transmissive body is obtainable by a process comprising (a) one or more of extrusion, injection molding, pressing, and casting, and (b) sintering.

Therefore, in yet a further aspect the invention provides a method for producing an elongated light transmissive body, the method comprising (a) one or more of extruding, injection molding, pressing, and casting, a starting composition (b) sintering the thus obtained product. Especially, the product after sintering is further hot isostatically pressed. In embodiments, this may include pre-forming of individual components, followed by co-sintering of the components while being in physical contact. In other embodiments, this may include forming the complete body in a single process step, e.g. by co-injection molding or co-extrusion, followed by a sintering process.

Such methods also allow tuning the concentration of the luminescent material, such as an outer shell of the elongated body comprising luminescent material (e.g. YAG with cerium), and a core comprising essentially no luminescent material (e.g. YAG essentially without cerium). Such methods also allow integration of the optical element and the elongated light transmissive body. In such methods, it may also be possible to create the elongated light transmissive body with luminescent material, and the optical element without luminescent material. After sintering or before sintering, especially after sintering, isostatic pressure may be applied. Therefore, in embodiments the process may further comprises (c) isostatic pressing.

Assuming cerium as dopant, the average concentration of the dopant in the elongated light transmissive body may be selected from the range of 0.01-2 mole %, such as 0.01-1.5 mole %, such as 0.03-0.9 mole %.

As indicated above, the body may have a skin with luminescent material and a core with no or a lower concentration of luminescent material. Therefore, in embodiments a first composition comprising the luminescent material with a first concentration c1, and a second composition optionally comprises the luminescent material with a second concentration c2, wherein $0 \leq c2/c \leq 1$, are applied, to provide the elongated light transmissive body having a higher concentration of the luminescent material at the side face than further away from the side face.

In yet a further aspect, the invention also provides a lighting device comprising:

a light source configured to provide light source light;

the luminescent element as defined herein, wherein the elongated light transmissive body comprises a radiation input face and a first radiation exit window; wherein the luminescent material is configured to convert at least part of light source light received at the radiation input face into luminescent material radiation, and the luminescent element configured to couple at least part of the luminescent material radiation out at the first radiation exit window as converter radiation.

In embodiments of the lighting device, the lighting device may comprise a plurality of bodies. In embodiments, different light sources are configured to irradiate different bodies. In this way, intensity of the lighting device light may be controlled. Would the bodies include different luminescent materials (or optionally different concentrations of the same luminescent material) then also the spectral distribution of the lighting device light may be controlled. Hence, the lighting device may further comprise a control system configured to control the light sources (and thereby one or more optical properties of the lighting device light). The plurality of bodies may include a monolithic configuration, wherein the bodies are essentially inseparable, such as obtained with e.g. co-extrusion. The plurality of bodies may also include a core-shell configuration wherein the core and shell have essentially no physical contact, like a (smaller) cylinder in a tube. The plurality of bodies may also include essentially separated bodies, which are e.g. configured parallel to each other, or are configured in an array, with distances, e.g. at least larger than the wavelength(s) of interest between adjacent bodies.

In embodiment, the light of the different bodies may be bundled via a single collimator or other optical element to provide the lighting device light.

A system may execute an action in a mode. The term "mode" may also be indicated as "controlling mode". This does not exclude that the system may also be adapted for providing another controlling mode, or a plurality of other controlling modes. However, the control system is adapted to provide at least a controlling mode. Would other modes be available, the choice of such modes may especially be executed via a user interface, though other options, like executing a mode in dependence of a sensor signal or a (time) scheme may also be possible.

Hence, the lighting device may further comprise or may be functionally coupled to a control system, configured to control the one or more light sources of the lighting device.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. In embodiments, one or more of the light sources may be controlled by controlling the forward current and/or the duty cycle. Further, two or more (subsets of) light sources may be controlled at different operation conditions (including different operation schemes).

As indicated above, the lighting device may comprise a plurality of light sources to provide light source light that is at least partly converted by the light transmissive body, more especially the luminescent material of the light transmissive body, into converter radiation. The converted light can at least partially escape form the first radiation exit window, which is especially in optical contact with the optical element, more especially the radiation entrance window thereof.

The optical element may especially comprise a collimator used to convert (to "collimate") the light beam into a beam having a desired angular distribution. Further, the optical element especially comprises a light transmissive body comprising the radiation entrance window. Hence, the optical element may be a body of light transmissive material that is configured to collimate the converter radiation from the luminescent body.

In specific embodiments, the optical element comprises a compound parabolic like collimator, such as a CPC (compound parabolic concentrator).

A massive collimator, such as a massive CPC, may especially be used as extractor of light and to collimate the (emission) radiation. Alternatively, one may also configure a dome with optical contact (n>1.00) on the nose of the rod or a hollow collimator, such as a CPC, to concentrate the (emission) radiation.

The optical element may have cross section (perpendicular to an optical axis) with a shape that is the same as the cross-section of the luminescent body (perpendicular to the longest body axis (which body axis is especially parallel to a radiation input face). For instance, would the latter have a rectangular cross section, the former may also have such rectangular cross section, though the dimension may be different. Further, the dimension of the optical element may vary over its length (as it may have a beam shaping function).

Further, the shape of the cross-section of the optical element may vary with position along the optical axis. In a specific configuration, the aspect ratio of a rectangular cross-section may change, preferably monotonically, with position along the optical axis. In another preferred configuration, the shape of the cross-section of the optical element may change from round to rectangular, or vice versa, with position along the optical axis.

As indicated above, first radiation exit window (of the elongated light transmissive body) is in optical contact with the radiation entrance window of the optical element. The term "optical contact" and similar terms, such as "optically coupled" especially mean that the light escaping the first radiation exit window surface area (A1) may enter the optical element radiation entrance window with minimal losses (such as Fresnel reflection losses or TIR (total internal reflection) losses) due to refractive index differences of these elements. The losses may be minimized by one or more of the following elements: a direct optical contact between the two optical elements, providing an optical glue between the two optical elements, preferably the optical glue having a refractive index higher that the lowest refractive index of the two individual optical elements, providing the two optical elements in close vicinity (e.g. at a distance much smaller than the wavelength of the light), such that the light will tunnel through the material present between the two optical elements, providing an optically transparent interface material between the two optical elements, preferably the optically transparent interface material having a refractive index higher that the lowest refractive index of the two individual optical elements, the optically transparent interface material might be a liquid or a gel or providing optical Anti Reflection coatings on the surfaces of (one or both of) the two individual optical elements. In embodiments, the optically transparent interface material may also be a solid material. Further, the optical interface material or glue especially may have a refractive index not higher than the highest refractive index of the two individual optical elements.

Instead of the term "in optical contact" also the terms "radiationally coupled" or "radiatively coupled" may be used. The term "radiationally coupled" especially means that the luminescent body (i.e. the elongated light transmissive body) and the optical element are associated with each other so that at least part of the radiation emitted by the luminescent body is received by the luminescent material. The luminescent body and the optical element, especially the indicated "windows" may in embodiments be in physical contact with each other or may in other embodiments be separated from each other with a (thin) layer of optical glue, e.g. having a thickness of less than about 1 mm, preferably less than 100 µm. When no optically transparent interface material is applied, the distance between two elements being in optical contact may especially be about at maximum the wavelength of relevance, such as the wavelength of an emission maximum. For visible wavelengths, this may be less than 1 µm, such as less than 0.7 µm, and for blue even smaller.

Likewise, the light sources are radiationally coupled with the luminescent body, though in general the light sources are not in physical contact with the luminescent body (see also below). As the luminescent body is a body and as in general also the optical element is a body, the term "window" herein may especially refer to side or a part of a side. Hence, the luminescent body comprises one or more side faces, wherein the optical element is configured to receive at the radiation entrance window at least part of the converter radiation that escapes from the one or more side faces.

This radiation may reach the entrance window via a gas, such as air directly. Additionally or alternatively, this radiation may reach the entrance window after one or more reflections, such as reflections at a mirror positioned nearby the luminescent body. Hence, in embodiments the lighting device may further comprise a first reflective surface, especially configured parallel to one or more side faces, and configured at a first distance from the luminescent body, wherein the first reflective surface is configured to reflect at least part of the converter radiation that escapes from the one or more side faces back into the luminescent body or to the optical element. The space between the reflective surface and the one or more side faces comprises a gas, wherein the gas comprises air. The first distance may e.g. be in the range of 0.1 µm-20 mm, such as in the range of 1 µm-10 mm, like 2 µm-10 mm.

Especially, the distance is at least wavelength of interest, more especially at least twice the wavelength of interest. Further, as there may be some contact, e.g. for holding purposes or for distance holder purposes, especially an average distance is at least $\lambda_i$, such as at least $1.5*\lambda_i$, like at least $2*\lambda_i$, such as especially about $5*\lambda_i$, wherein $\lambda_i$ is the wavelength of interest. Especially, however, the average distance is in embodiments not larger than 50 µm, such as not larger than 25 µm, like not larger than 20 µm, like not larger than 10 µm, for purposes of good thermal contact. Likewise, such average minimum distance may apply to a reflector and/or optical filter configured at e.g. an end face, or other optical components as well. Optionally, in embodiments an element may comprise both heat sinking function a reflection function, such as a heat sink with a reflective surface, or a reflector functionally coupled to a heat sink.

The lighting device may be configured to provide blue, green, yellow, orange, or red light, etc. Alternatively or additionally, in embodiments, the lighting device may (also) be configured to provide one or more of UV, such as near UV (especially in the range of 320-400 nm), and IR, such as near IR (especially in the range of 750-3000 nm). Further, in specific embodiment, the lighting device may be configured to provide white light. If desired, monochromaticity may be improved using optical filter(s). The definitions of near UV and near infrared may partly overlap with the generally used definition for visible light, which is 380-780 nm.

The term "light concentrator" or "luminescent concentrator" is herein used, as one or more light sources irradiate a relative large surface (area) of the light converter, and a lot of converter radiation may escape from a relatively small area (exit window) of the light converter. Thereby, the specific configuration of the light converter provides its light concentrator properties. Especially, the light concentrator may provide Stokes-shifted light, which is Stokes shifted relative to the pump radiation. Hence, the term "luminescent concentrator" or "luminescent element" may refer to the same element, especially an elongated light transmissive body (comprising a luminescent material), wherein the term "concentrator" and similar terms may refer to the use in combination with one or more light sources and the term "element" may be used in combination with one or more, including a plurality, of light sources. When using a single light source, such light source may e.g. be a laser, especially a solid state laser (like a LED laser). The elongated light transmissive body comprises a luminescent material and can herein especially be used as luminescent concentrator. The elongated light transmissive body is herein also indicated as "luminescent body". Especially, a plurality of light sources may be applied.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The light concentrator comprises a light transmissive body. The light concentrator is especially described in relation to an elongated light transmissive body, such as a ceramic rod or a crystal, such as a single crystal. However, these aspects may also be relevant for other shaped ceramic bodies or single crystals. In specific embodiments, the luminescent body comprises a ceramic body or single crystal.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of one or more of (N)UV, visible and (N)IR radiation, such as in embodiments at least visible light, in a direction perpendicular to the length of the light transmissive body. Without the activator (dopant) such as trivalent cerium, the internal transmission in the visible might be close to 100%.

The transmission of the light transmissive body for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive body, under perpendicular irradiation of radiation having a selected luminescence wavelength (such as a wavelength corresponding to an emission maximum of the luminescence of the luminescent material of the light transmissive body), will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam (or bar) like or rod like, however especially beam like (cuboid like). However, the light transmissive body may also be disk like, etc. The light transmissive body, such as the luminescent concentrator, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window.

In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one (or more) of the longer faces (side edge), herein indicated as radiation input face, and radiation escapes from a face at a front (front edge), herein indicated as radiation exit window. The light source(s) may provide radiation to one or more side faces, and optionally an end face. Hence, there may be more than one radiation input face.

Especially, in embodiments the solid state light source, or other light source, is not in (direct) physical contact with the light transmissive body.

Physical contact (between the light exit window(s) of the light source(s) and the light entrance window(s) of the light transmissive body/bodies) may lead to undesired outcoupling (from the light transmissive body) and thus a reduction in concentrator efficiency. Hence, especially there is substantially no physical contact. If the actual contact area is kept small enough, the optical impact may be negligible or at least acceptable. Therefore, it may be perfectly acceptable to have some physical contact, e.g. by some small points as resulting from a certain surface roughness, or non-perfectly flat surface, or by some intentionally created "highest spots" on a surface that will define a certain average distance between the two surfaces that don't extract substantial amounts of light while enabling a short average distance.

Further, in general the light transmissive body comprises two substantially parallel faces, a radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window face area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spot light applications, a small but high radiant flux or luminous flux emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high radiance or luminance may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm, such as 0.5-10 mm. The light transmissive body is thus especially an integral body, having the herein indicated faces.

The generally rod shaped or bar shaped light transmissive body can have any cross-sectional shape, but in embodiments has a cross section the shape of a square, rectangle, round, oval, triangle, pentagon, or hexagon. Generally the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, like 3-20 cm, such as 4-20 cm, such as at maximum 15 cm. Other dimensions may, however, also be possible, such as e.g. 0.5-2 cm.

Especially, the light transmissive body has a width (W) selected to absorb more than 95% of the light source light. In embodiments, the light transmissive body has a width (W) selected from the range of 0.03-4 cm, especially 0.05-2 cm, such as 0.1-1.5 cm, like 0.1-1 cm. With the herein indicated cerium concentration, such width is enough to absorb substantially all light (especially at the excitation wavelength with maximum excitation intensity) generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heatsinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The side face is especially such flattened surface(s). The flattened surface especially has a relatively low surface roughness, such as an Ra of at maximum 100 nm, such as in the range of 5-100 nm, like up to 50 nm.

The light transmissive body may also be a fiber or a multitude of fibers, for instance a fiber bundle, either closely spaced or optically connected in a transparent material. The fiber may be referred to as a luminescent fiber. The individual fiber may be very thin in diameter, for instance, 0.1 to 0.5 mm. The light transmissive body may also comprise a tube or a plurality of tubes. In embodiments, the tube (or tubes) may be filled with a gas, like air or another gas having higher heat conductivity, such as helium or hydrogen, or a gas comprising two or more of helium, hydrogen, nitrogen, oxygen and carbon dioxide. In embodiments, the tube (or tubes) may be filled with a liquid, such as water or (another) cooling liquid.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example, luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting device further comprises a reflector configured to reflect luminescent material radiation back into the light transmissive body. Therefore, the lighting device may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting device further comprises an optical reflector (at least) configured downstream of the first face and configured to reflect light back into the elongated light transmissive body. Alternatively or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or saw tooth structures, designed to reflect the light rays towards a desired direction.

Preferably, such reflectors are also present in the plane where the light sources are positioned, such that that plane consist of a mirror having openings, each opening having the same size as a corresponding light source allowing the light of that corresponding light source to pass the mirror layer and enter the elongated (first) light transmissive body while light that traverses from the (first) light transmissive body in the direction of that plane receives a high probability to hit the mirror layer and will be reflected by that mirror layer back towards the (first) light transmissive body.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc.

In specific embodiments, the lighting device may have a mirror configured at the first face configured to reflect light back into the elongated light transmissive body, and/or may have one or more of an optical filter, a (wavelength selective) mirror, a reflective polarizer, light extraction structures, and a collimator configured at the second face. At the second face the mirror may e.g. be a wavelength selective mirror or a mirror including a hole. In the latter embodiment, light may be reflected back into the body but part of the light may escape via the hole. Especially, in embodiments the optical element may be configured at a distance of about 0.01-1 mm, such as 0.1-1 mm from the body. This may especially apply for e.g. mirrors, wherein optical coupling is not desired.

When optical coupling is desired, such as with an optical element, like a CPC or a mixing element, downstream of the (part of the) body where the luminescent material is located, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. Even in such embodiments, there may be a non-zero average distance, but then equal to or lower than the wavelength of interest.

In specific embodiments, especially when no optical contact is desired, the average distance may be as indicated above but at a few places, for instance for configuration purposes, there may be physical contact. For instance, there may be contact with the edge faces over less than 10%, such as over less than 5% of the total area of the side faces. Hence, the minimum average distance may be as defined e.g. above and if there is physical contact, this physical contact may be with at maximum 10% of the surface area of the surface with which the element (mirror and/or heat sink) is in physical contact, such as at maximum 5%, like at maximum 2%, even more especially at maximum 1%. For instance, for the side faces an average distance may e.g. be between ca 2 and 10 μm (the lower limit basically determined as being a few times the wavelength of interest; here, assuming e.g. visible light). This may be achieved by having physical contact (to secure that distance) over less than 1% of the total area of that respective side face.

For instance, a heat sink or a reflector, or the relevant surface may have some protrusions, like a surface roughness, by which there may be contact between the surface and the element, but in average the distance is at least $\lambda_i$ (or more, see also above) (in order to essentially prevent optical contact), but there is physical contact with equal to or less than 10% of the surface of the body (to which the element may be thermally coupled and/or optically not coupled), especially substantially less.

In embodiments, optical elements may be included at one or more of the side faces. In particular, anti-reflection coatings may be applied to enhance coupling efficiency of the (excitation) light source light and/or (wavelength selective) reflection coatings for the converted light.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of undesired light in the converter radiation (downstream of the radiation exit window). For filtering out light source light, optionally an interference filter may be applied.

In yet a further embodiment, the lighting device further comprises a collimator configured downstream of the radiation exit window (of the highest order luminescent concentrator) and configured to collimate the converter radiation. Such collimator, like e.g. a CPC (compound parabolic concentrator), may be used to collimate the light escaping from the radiation exit window and to provide a collimated or pre-collimated beam of light. Herein, the terms "collimated", "precollimated" and similar terms may especially refer to a light beam having a solid angle (substantially) smaller than $2\pi$.

As indicated above, the lighting device may comprise a plurality of light sources. This plurality of light sources may be configured to provide light source light to a single side or face or to a plurality of faces; see further also below. When providing light to a plurality of faces, in general each face will receive light of a plurality of light sources (a subset of the plurality of light sources). Hence, in embodiments a plurality of light sources will be configured to provide light source light to a radiation input face. Also, this plurality of light sources will in general be configured in a row or a plurality of rows. Hence, the light transmissive body is elongated, the plurality of light sources may be configured in a row, which may be substantially parallel to the axis of elongated of the light transmissive body. The row of light sources may have substantially the same length as the elongated light transmissive body. Hence, in the light transmissive body has a length (L) in the range of about 80-120% of the second length (L2) of the row of light sources; or the row of light sources has a length in the range of about 80-120% of the length of the light transmissive body.

The light sources may be configured to provide light with a wavelength selected from the range of UV (including near UV), visible, and infrared (including near IR). Especially, the light sources are light sources that during operation emit (light source light) at least light at a wavelength selected from the range of 200-490 nm, especially light sources that during operation emit at least light at wavelength selected from the range of 360-490 nm, such as 400-490 nm, even more especially in the range of 430-490 nm, such as 440-490 nm, such as at maximum 480 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, e.g. at least 4 light sources, such as in embodiments especially 4-80 (solid state) light sources, though many more light sources may be applied. Hence, in embodiments 4-500 light sources may be applied, like e.g. 8-200 light sources, such as at least 10 light sources, or even at least 50 light sources. The term "light source" may also relate to one or more light sources that are tailored to be applied for such light concentrating luminescent concentrators, e.g. one or more LED's having a long elongated radiating surface matching the long elongated light input surfaces of the elongated luminescent concentrator. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB ("printed circuit board") or comparable. Hence, a plurality of semiconductor light sources may be configured on the same substrate. In embodiments, a COB is a multi LED chip configured together as a single lighting module.

The lighting device comprises a plurality of light sources. Especially, the light source light of the plurality (m) of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (e.g. obtained by binning) However, in yet other embodiments, the lighting device may comprise a single light source, especially a solid state light source having a relatively large die. Hence, herein also the phrase "one or more light sources" may be applied.

In embodiments, there may be two or more different luminescent materials, such as e.g. when applying two or more different light transmissive bodies. In such embodiments, the light sources may comprise light sources with two or more different emission spectra enabling excitation of two different luminescent materials. Such two or more different light sources may belong to different bins.

The light sources are especially configured to provide a blue optical power ($W_{opt}$) of at least 0.2 Watt/mm$^2$ to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for (DLP (digital light processing)) projector applications, the plurality of light sources are operated in pulsed operation with a duty cycle selected from the range of 10-80%, such as 25-70%.

In yet a further embodiment, especially for (LCD or DLP) projector applications using dynamic contrast technologies, such as e.g. described in WO0119092 or USRE42428 (E1), the plurality of light sources are operated in video signal content controlled PWM pulsed operation with a duty cycle selected from the range of 0.01-80%, such as 0.1-70%.

In yet a further embodiment, especially for (LCD or DLP) projector applications using dynamic contrast technologies, such as e.g. described in US patent WO0119092 or U.S. Pat. No. 6,631,995 (B2), the plurality of light sources are operated in video signal content controlled intensity modulated operation with intensity variations selected from the range of 0.1-100%, such as 2-100%.

The lighting device may comprise a plurality of luminescent concentrators, such as in the range of 2-50, like 2-20 light concentrators (which may e.g. be stacked).

The light concentrator may radiationally be coupled with one or more light sources, especially a plurality of light sources, such as 2-1000, like 2-50 light sources. The term "radiationally coupled" especially means that the light source and the light concentrator are associated with each other so that at least part of the radiation emitted by the light source is received by the light concentrator (and at least partly converted into luminescence). Instead of the term "luminescence" also the terms "emission" or "emission radiation" may be applied.

Hence, the luminescent concentrator receives at one or more radiation input faces radiation (pump radiation) from an upstream configured light concentrator or from upstream configured light sources. Further, the light concentrator comprises a luminescent material configured to convert at least part of a pump radiation received at one or more radiation input faces into luminescent material radiation, and the luminescent concentrator configured to couple at least part of the luminescent material radiation out at the radiation exit window as converter radiation. This converter radiation is especially used as component of the lighting device light.

The phrase "configured to provide luminescent material radiation at the radiation exit window" and similar phrases especially refers to embodiments wherein the luminescent material radiation is generated within the luminescent concentrator (i.e. within the light transmissive body), and part of the luminescent material radiation will reach the radiation exit window and escape from the luminescent concentrator. Hence, downstream of the radiation exit window the luminescent material radiation is provided. The converter radiation, downstream of the radiation exit window comprises at least the luminescent material radiation escaped via the radiation exit window from the light converter. Instead of the term "converter radiation" also the term "light concentrator light" may be used. Pump radiation can be applied to a single radiation input face or a plurality of radiation input faces.

In embodiments, the length (L) is selected from the range of 1-100 cm, such as especially 2-50 cm, like at least 3 cm, such as 5-50 cm, like at maximum 30 cm. This may thus apply to all luminescent concentrators. However, the range indicates that the different luminescent concentrators may have different lengths within this range.

In yet further embodiments, the elongated light transmissive body (of the luminescent concentrator) comprises an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm, or even in the cyan. To obtain sufficient absorption and light output in desired directions, it is advantageous to use transparent rods (especially substantially shaped as beams). Such rod can be used as light concentrator, converting light source light into converter radiation and providing at an exit surface (a substantial amount of) (concentrated) converter radiation. Lighting devices based on light concentrators may e.g. be of interest for projector applications. For projectors, red, yellow, green and blue luminescent concentrators are of interest. Green and/or yellow luminescent rods, based on garnets, can be relatively efficient. Such concentrators are especially based on YAG:Ce (i.e. $Y_3Al_5O_{12}:Ce^{3+}$) or LuAG, which can be indicated as $(Y_{1-x}Lu_x)_3Al_5O_{12}:Ce^{3+}$, where $0 \leq x \leq 1$, such as in embodiments $Lu_3Al_5O_{12}:Ce^{3+}$. 'Red' garnets can be made by doping a YAG-garnet with Gd ("YGdAG"). Cyan emitters can be made by e.g. replacing (part of the) Al (in e.g. LuAG) by Ga (to provide "LuGaAG"). Blue luminescent concentrators can be based on YSO ($Y_2SiO_5:Ce^{3+}$) or similar compounds or BAM ($BaMgAl_{10}O_{17}:Eu^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N.

Hence, especially the elongated light transmissive body comprises a ceramic material configured to wavelength convert at least part of the (blue) light source light into converter radiation in e.g. one or more of the green, yellow and red, which converter radiation at least partly escapes from the radiation exit window.

In embodiments, the ceramic material especially comprises an $A_3B_5O_{12}:Ce^{3+}$ ceramic material ("ceramic garnet"), wherein A comprises yttrium (Y) and/or lutetium (Lu) and/or gadolinium (Gd), and wherein B comprises aluminum (Al) and/or gallium (Ga), especially at least Al. As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises the radiation exit window, wherein the elongated light transmissive body comprises a ceramic material configured to wavelength convert at least part of (blue) light source light into converter radiation, such as (at least) one or more of green, yellow, and red converter radiation (which at least partly escapes from the radiation exit window when the elongated light transmissive body is irradiated with blue light source light), wherein the ceramic material comprises an $A_3B_5O_{12}:Ce^{3+}$ ceramic material as defined herein. Such light transmissive body can thus be used as light converter. Especially, such light transmissive body has the shape of a cuboid.

As indicated above, in embodiments the ceramic material comprises a garnet material. However, also other (crystallographic) cubic systems may be applied. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and/or Lu, and optionally Gd), wherein B is especially selected from the group consisting of Al and Ga (especially at least Al). More especially, A (essentially) comprises (i) lutetium (Lu), (ii) yttrium, (iii) yttrium (Y) and lutetium (Lu), (iv) gadolinium (Gd), optionally in combination with one of the aforementioned, and B comprises aluminum (Al) or gallium (Ga) or a combination of both. Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}$:$Ce^{3+}$ may also be defined as $(A_{1-n}Ce_n)_3B_5O_{12}$, with n being in the range of 0.001-0.035, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

The luminescent concentrator may also be a crystal, such as a single crystal. Such crystals can be grown/drawn from the melt in a higher temperature process. The large crystal, typically referred to as boule, can be cut into pieces to form the light transmissive bodies. The polycrystalline garnets mentioned above are examples of materials that can alternatively also be grown in single crystalline form.

After obtaining the light transmissive body, the body may be polished. Before or after polishing an annealing process (in an oxidative atmosphere) may be executed, especially before polishing. In a further specific embodiment, the annealing process lasts for at least 2 hours, such as at least 2 hours at least 1200° C. Further, especially the oxidizing atmosphere comprises for example $O_2$.

Instead of cerium doped garnets, or in addition to such garnets, also other luminescent materials may be applied, e.g. embedded in organic or inorganic light transmissive matrices, as luminescent concentrator. For instance, quantum dots and/or organic dyes may be applied and may be embedded in transmissive matrices like e.g. polymers, like PMMA, or polysiloxanes, etc. etc. Other light transmissive material as host matrix may be used as well, see also below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphode (InP), and copper indium sulfide ($CuInS_2$) and/or silver indium sulfide ($AgInS_2$) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, or nano-wires.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Several color conversion schemes may be possible. Especially, however, the Stokes shift is relatively small. Especially, the Stokes shift, defined as the difference (in wavelength) between positions of the band maxima of the light source used for pumping and the light which is emitted, is not larger than 100 nm; especially however, the Stokes shift is at least about 10 nm, such as at least about 20 nm. This may especially apply to the light source light to first luminescent material radiation conversion, but also apply to the second pump radiation to second luminescent material radiation conversion, etc.

In embodiments, the plurality of light sources are configured to provide UV radiation as first pump radiation, and the luminescent concentrators are configured to provide one or more of blue and green first converter radiation. In yet other embodiments, the plurality of light sources are configured to provide blue radiation as first pump radiation, and the luminescent concentrators are configured to provide one or more of green and yellow first converter radiation. Note, as also indicated below, such embodiments may also be combined.

The lighting device may further comprise a cooling element in thermal contact with the luminescent concentrator. The cooling element can be a heatsink or an actively cooled element, such as a Peltier element. Further, the cooling element can be in thermal contact with the light transmissive body via other means, including heat transfer via air or with an intermediate element that can transfer heat, such as a thermal grease. Especially, however, the cooling element is in physical contact with the light transmissive body. The term "cooling element" may also refer to a plurality of (different) cooling elements.

Hence, the lighting device may include a heatsink configured to facilitate cooling of the solid state light source and/or luminescent concentrator. The heatsink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Alternatively or additionally, the heatsink may comprise or consist of aluminum oxide. The term "heatsink" may also refer to a plurality of (different) heatsink. The lighting device may further include one or more cooling elements configured to cool the light transmissive body. With the present invention, cooling elements or heatsinks may be used to cool the light transmissive body and the same or different cooling elements or heatsinks may be used to cool the light sources. The cooling elements or heatsinks may also provide interfaces to further cooling means or allow cooling transport to dissipate the heat to the ambient. For instance, the cooling elements or heatsinks may be connected to heat pipes or a water cooling systems that are connect to more remotely placed heatsinks or may be directly cooled by air flows such as generated by fans. Both passive and active cooling may be applied.

In specific embodiments, there is no physical contact between the heat sink (or cooling elements) and the light transmissive body. Especially, the average is at least the intensity averaged wavelength of light that is transmitted by luminescence of luminescent material. In embodiments, the average between the light transmissive body and the heatsink or cooling element is at least 1 µm, such as at least 2 µm, like at least 5 µm. Further, for a good heat transfer the average distance between the light transmissive body and the heatsink or cooling elements is not larger than 50 µm, such as not larger than 25 µm, like not larger than 20 µm, such as equal to or smaller than 15 µm, like at maximum 10 µm.

Therefore, in embodiments the lighting device may further comprise a heat sink having an average distance to the elongated light transmissive body of at least 1 µm, such as at least 2 µm, like especially at least 5 µm, or wherein the heat dissipating element is in physical contact with at maximum 10%, such as at maximum 5% of a total area of the side face(s) of the elongated light transmissive body. The average is thus especially not larger than 50 µm. Instead of the term "heat sink" also the term cooling element may be applied.

In particular embodiments, the elongated luminescent concentrator is clamped between 2 metal plates or clamped within a housing consisting of a highly thermal conductive material such way that a sufficient air gap between the elongated luminescent concentrator remains present to provide TIR (total internal reflection) of the light trapped within the elongated luminescent concentrator while a sufficient amount of heat may traverse from the elongated luminescent concentrator through the air gap towards the highly thermal conductive housing. The thickness of the air gap is higher than the wavelength of the light, e.g. higher than 0.1 µm, e.g. higher 0.5 µm. The elongated luminescent concentrator is secured in the housing by providing small particles between the elongated luminescent concentrator and the housing, such as small spheres or rods having a diameter higher than 0.1 µm, e.g. higher 0.5 µm, like at least 1 µm, such as at least 5 µm, especially equal to or smaller than 20 µm, such as equal to or smaller than 10 µm (see also above defined average).

Alternatively, the elongated luminescent concentrator may be secured in the housing by providing some surface roughness on the surfaces of the highly thermal conductive housing touching the elongated luminescent concentrator, the surface roughness varying over a depth higher than 0.1 µm, e.g. higher 0.5 µm, preferably equal to or smaller than about 10 µm.

The density of such spheres, rods or touch points of a rough surface of the highly thermal conductive housing is relatively very small, such that most of the surface area of the elongated light transmissive body remains untouched securing a high level of TIR reflections within of the light trapped within the elongated light transmissive body.

The lighting device may thus essentially consist of the elongated light transmissive body comprising a luminescent material and one or more, especially a plurality of light sources, which pump the luminescent material to provide luminescent material light, that escapes from a radiation exit window (of an end face (second face)).

Further, the lighting device may comprise an optical element, such as a CPC or (other) extraction optical element, which may be configured downstream of the light transmissive body, but which in embodiments may be integrated with the light transmissive body.

Optionally, between this optical element and the light transmissive body, a radiation mixing element may be configured. Hence, a section of the light transmissive body of an additional element may be configured that acts as an optical mixing rod (preferably not round, but e.g. hexagonal) between the converters and the CPC (or extraction optical element). Alternatively or additionally, the extraction optical element is designed such that it also mixes the light.

Further, the lighting device may comprise one or more holding elements for holding the light transmissive body. Especially, these holding elements have contact with the edge faces, but only with a small part thereof to minimize losses of light. For instance, the holding element(s), like clamping device (s) have contact with the edge faces over less than 10%, such as over less than 5% of the total area of the side faces. Further, the lighting device may comprise a heat sink and/or a cooling element. The holding element(s) may be comprised by the heat sink and/or cooling element.

The lighting device may be part of or may be applied in e.g. office lighting systems, household application systems, shop lighting systems, home lighting systems, accent lighting systems, spot lighting systems, theater lighting systems, architectural lighting, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc. The lighting device may also be part of or may be applied in e.g. material curing systems, additive manufacturing systems, metrology systems, UV sterilization system, (IR) imaging systems, fiber illumination systems, etc. In an aspect, the invention also provides a projection system or a luminaire comprising the lighting device as described herein, or a plurality of such lighting devices.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein. Here, the term "lighting system" may also be used for a (digital) projector. Further, the lighting device may be used for e.g. stage lighting (see further also below), or architectural lighting. Therefore, in embodiments the invention also provides a lighting system as defined herein, wherein the lighting system comprises a digital projector, a stage lighting system or an architectural lighting system. The lighting system may comprise one or more lighting devices as defined herein and optionally one or more second lighting devices configured to provide second lighting device light, wherein the lighting system light comprises (a) one or more of (i) the converter radiation as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, lens elements, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein.

Alternatively, the lighting device may be designed to provide high intensity UV radiation, e.g. for 3D printing technologies or UV sterilization applications. Alternatively, the lighting device may be designed to provide a high intensity IR light beam, e.g., to project IR images for (military) training purposes.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600 nm. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of 380-780 nm. The term UV light may be UV-A (315-400 nm); UV-B (280-315 nm) or UV-C (200-280 nm). The term IR light may be light in the range above 780 nm. The term "white light" may in embodiments refer to light consisting of particular spectral compositions of wavelengths in the range between 380-780 nm, perceived nearby Planck's black body radiators having temperatures of about 1000 K and above.

The elongated light transmissive body, and optionally also the optical element, may comprise light transmissive host material (thus not taking into account the luminescent material, or more especially in embodiments a luminescent species such as trivalent cerium), especially light transparent material for one or more wavelengths in the visible, such as in the green and red, and in general also in the blue. Suitable host materials may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material.

However, in another embodiment the light transmissive material may comprise an inorganic material. Especially, the inorganic light transmissive material may be selected from the group consisting of glasses, (fused) quartz, transmissive ceramic materials (such as garnets), and silicones. Glass ceramic materials may also be applied. Also hybrid materials, comprising both inorganic and organic parts may be applied. Especially, the light transmissive material comprises one or more of PMMA, transparent PC, or glass.

When a luminescent material, like an inorganic luminescent material, quantum dots, organic molecules, etc., are embedded in a host matrix, the concentration of the luminescent material may in embodiments be selected from the range of 0.01-5 wt % (weight %), such as 0.01-2 wt %.

Hence, it is a further aspect of the invention to provide a lighting system comprising one or more lighting devices according to the invention and a controller for controlling the one or more lighting devices. Such lighting systems, for example high brightness light sources, may be used in e.g. front projectors, rear projectors, studio lighting, stage lighting, entertainment lighting, automotive front lighting, architectural lighting, augmented illumination (incl. data/content), microscopy, metrology, medical applications, e.g. digital pathology, etc.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the (converted) light to an exit surface.

Figure 1A:
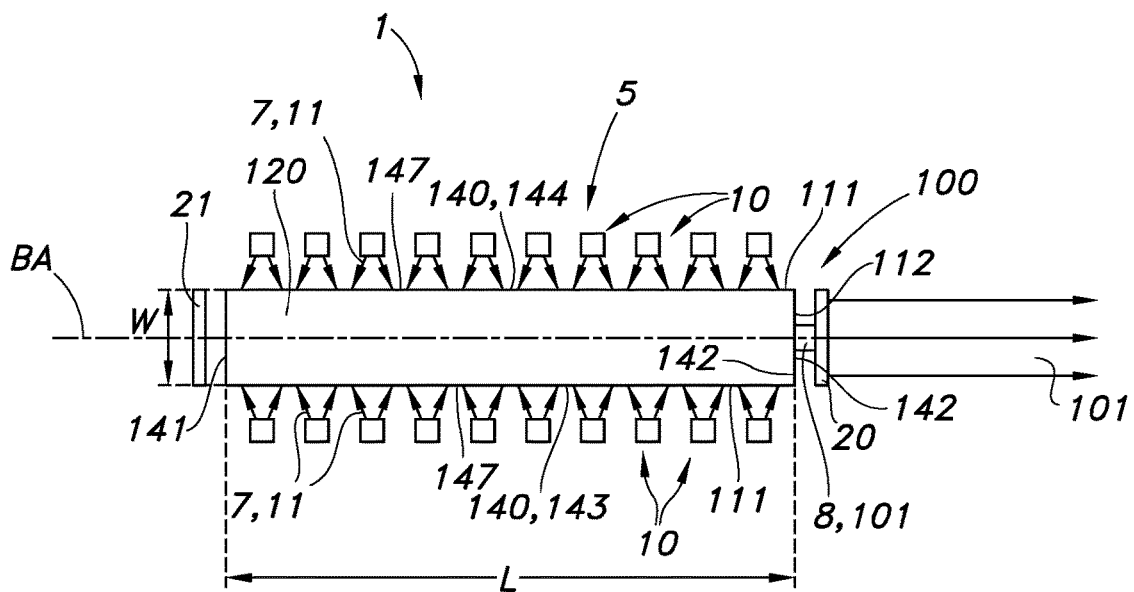
FIGS. 1a-1e schematically depict some aspects of the invention.

An embodiment of the lighting device as defined herein is schematically depicted in FIG. 1a. FIG. 1a schematically depicts a lighting device 1 comprising a plurality of solid state light sources 10 and a luminescent concentrator 5 comprising an elongated light transmissive body 100 having a first face 141 and a second face 142 defining a length L of the elongated light transmissive body 100. The elongated light transmissive body 100 comprising one or more radiation input faces 111, here by way of example two oppositely arranged faces, indicated with references 143 and 144 (which define e.g. the width W), which are herein also indicated as edge faces or edge sides 147. Further the light transmissive body 100 comprises a radiation exit window 112, wherein the second face 142 comprises the radiation exit window 112. The entire second face 142 may be used or configured as radiation exit window. The plurality of solid state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm². Reference BA indicates a body axis, which will in cuboid embodiments be substantially parallel to the edge sides 147. Reference 140 refers to side faces or edge faces in general.

The elongated light transmissive body 100 may comprise a ceramic material 120 configured to wavelength convert at least part of the (blue) light source light 11 into converter radiation 101, such as at least one or more of green and red converter radiation 101. As indicated above the ceramic material 120 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. In addition, the former may be used as well to reflect light back into the transmissive body or waveguide that is not desired as output light from the elongated light transmissive body that subsequently may get re-absorbed in the ceramic material. For instance, a dichroic filter may be applied. The latter may be used to reflect light back into the light transmissive body or waveguide, thereby improving the efficiency. Note that more reflectors than the schematically depicted reflector may be used. Note that the light transmissive body may also essentially consist of a single crystal, which may in embodiments also be $A_3B_5O_{12}:Ce^{3+}$.

The light sources may in principle be any type of light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. The luminescent material 120 converts the light source light into luminescent material radiation 8 (see also FIG. 1e). Light escaping at the light exit window is indicated as converter radiation 101, and will include luminescent material radiation 8. Note that due to reabsorption part of the luminescent material radiation 8 within the luminescent concentrator 5 may be reabsorbed. Hence, the spectral distribution may be redshifted relative e.g. a low doped system and/or a powder of the same material. The lighting device 1 may be used as luminescent concentrator to pump another luminescent concentrator.

As indicated above, the element may include dichroic optical element. Further, the element may include other elements such as e.g. an anti-reflex (AR) coating on one or more surfaces of the elongated light transmissive body and of the optical element (at the second face side). It may be advantageous to have an AR coating for the pump light at the optical entrance window(s), and/or to have an AR coating for the converted light at the light emission window(s). In addition, reflective coatings for the converted light may be applied to the surface areas other than the light extraction window.

Figure 1B:
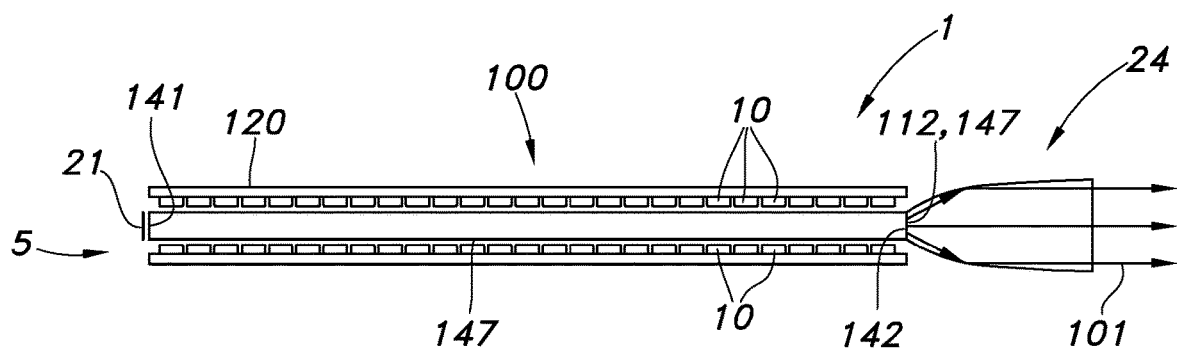

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 24, such as a CPC.

As shown in FIGS. 1a-1b and other Figures, the light guide has at least two ends, and extends in an axial direction between a first base surface (also indicated as first face 141) at one of the ends of the light guide and a second base surface (also indicated as second face 142 or "nose") at another end of the light guide.

Figure 1C:
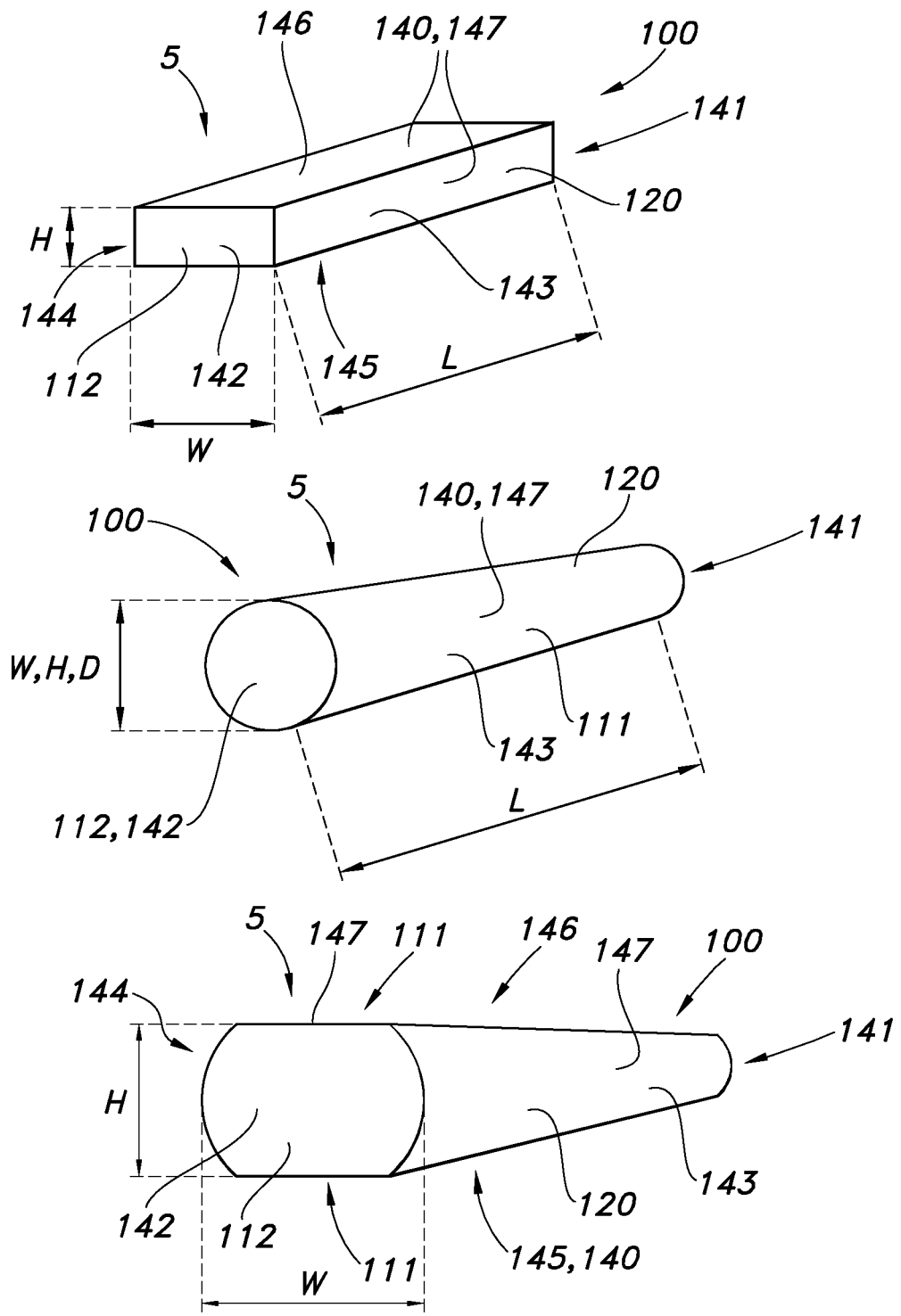

FIG. 1c schematically depicts some embodiments of possible ceramic bodies or crystals as waveguides or luminescent concentrators. The faces are indicated with references 141-146.

The first variant, a plate-like or beam-like light transmissive body has the faces 141-146. Light sources, which are not shown, may be arranged at one or more of the faces 143-146 (general indication of the edge faces is reference 147). Light sources, not shown, may be configured to provide radiation to one or more edge faces or side faces selected from faces 143-146. Alternatively or additionally, Light sources, not shown, may be configured to provide radiation to the first face 141 (one of the end faces).

The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces.

In the context of the present application, a lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1c are not limitative. More shapes are possible; i.e. for instance referred to WO2006/054203, which is incorporated herein by reference. The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-300, such as 10-100, like 10-60, like 10-20. Unless indicated otherwise, the term "aspect ratio" refers to the ratio length/width. FIG. 1c schematically depicts an embodiment with four long side faces, of which e.g. two or four may be irradiated with light source light.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

FIG. 1c schematically depict some basic embodiments. Especially however, the herein described specific embodiments are applied, such as wherein the bodies 100 have circular cross-section, but have a shell-like distribution of the luminescent material and/or are hollow, and/or wherein the bodies have facets at one or more end faces and/or wherein the bodies taper over at least part of their length.

Note that, in particular for embodiments using a laser light source to provide light source light, the radiation exit window might be configured opposite to the radiation input face(s), while the mirror 21 may consist of a mirror having a hole to allow the laser light to pass the mirror while converted light has a high probability to reflect at mirror 21. Alternatively or additionally, a mirror may comprise a dichroic mirror.

Figure 1D:
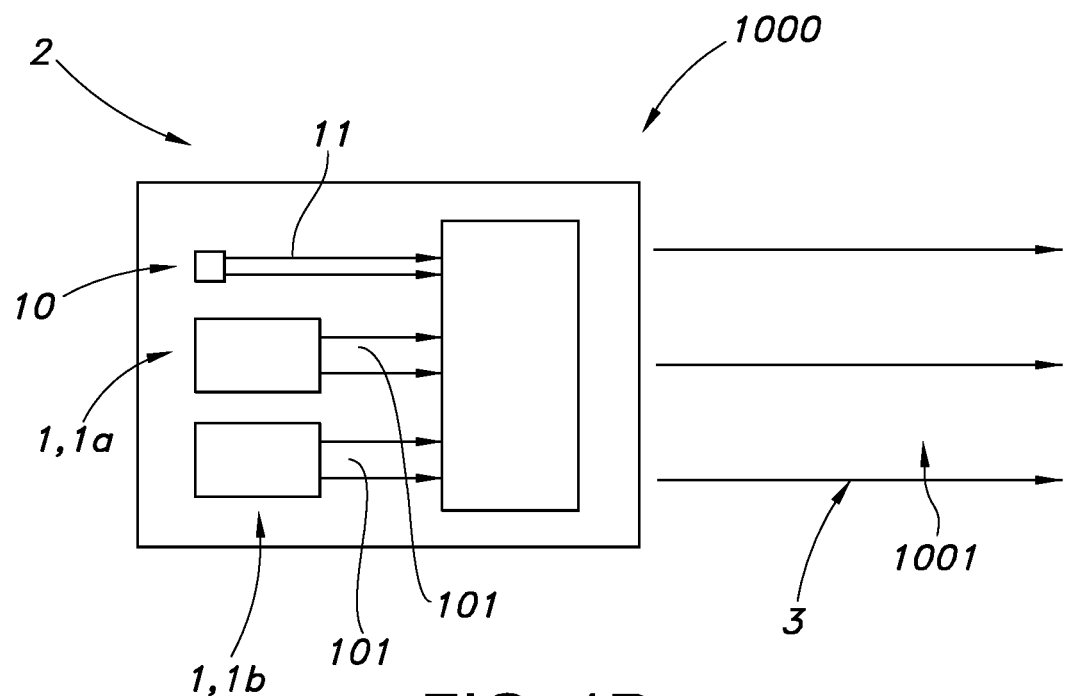

FIG. 1d very schematically depicts a projector or projector device 2 comprising the lighting device 1 as defined herein. By way of example, here the projector 2 comprises at least two lighting devices 1, wherein a first lighting device (1a) is configured to provide e.g. green light 101 and wherein a second lighting device (1b) is configured to provide e.g. red light 101. Light source 10 is e.g. configured to provide blue light. These light sources may be used to provide the projection (light) 3. Note that the additional light source 10, configured to provide light source light 11, is not necessarily the same light source as used for pumping the luminescent concentrator(s). Further, here the term "light source" may also refer to a plurality of different light sources. The projector device 2 is an example of a lighting system 1000, which lighting system is especially configured to provide lighting system light 1001, which will especially include lighting device light 101. Such a lighting system may further comprise a controller for controlling the light source(s).

High brightness light sources are interesting for various applications including spots, stage-lighting, headlamps and digital light projection.

Figure 1E:
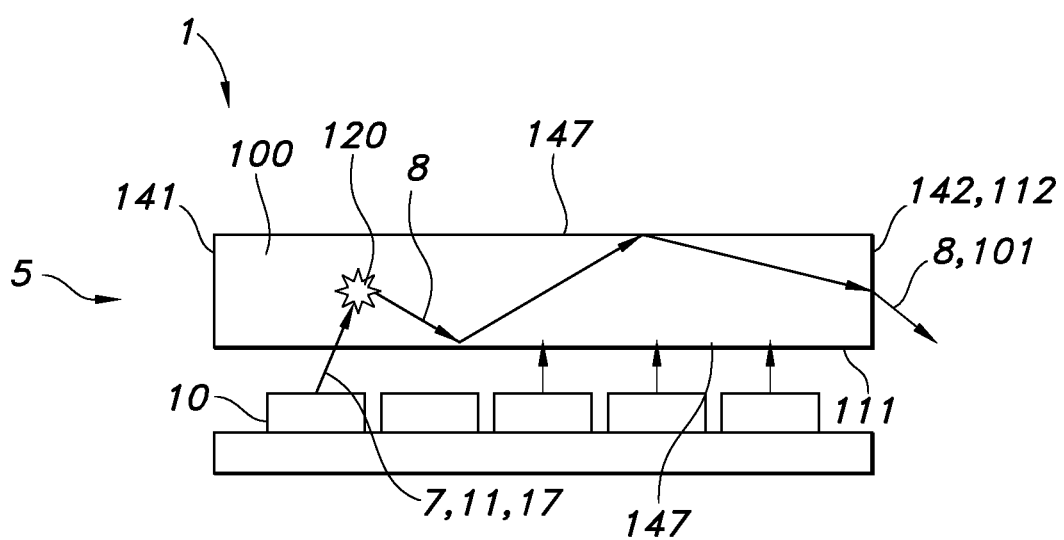

For this purpose, it is possible to make use of so-called luminescent concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to a luminance and/or radiance gain (FIG. 1e).

High-brightness LED-based light source for beamer applications appear to be of relevance. For instance, the high brightness may be achieved by pumping a luminescent concentrator rod by a discrete set of external blue LEDs, whereupon the phosphor that is contained in the luminescent rod subsequently converts the blue photons into green or red photons. Due to the high refractive index of the luminescent rod host material (typically~1.8) the converted green or red photons are almost completely trapped inside the rod due to total internal reflection. At the exit facet of the rod the photons are extracted from the rod by means of some extraction optics, e.g. a compound parabolic concentrator (CPC), or a micro-refractive structure (micro-spheres or pyramidal structures). As a result the high luminescent power that is generated inside the rod can be extracted at a relatively small exit facet, giving rise to a high source brightness, enabling (1) smaller optical projection architectures and (2) lower cost of the various components because these can be made smaller (in particular the, relatively expensive, projection display panel).

When luminescent light is generated in an elongated light transmissive body, three light fractions can be discerned, namely I. Non-TIR light in the cones that are directly transmitted through one of the four long sides.
II. Light in the cones that are aligned with the long axis (z-axis) of the rod, this light sometimes is called TIR-to-Nose light, as this light is in TIR in the rod until it hits the CPC, and is transmitted through the CPC. The rays that go into the CPC have an angle with the z-axis that is smaller than the critical TIR angle that holds for the n_rod-n_CPC combination. The light in the cone that is directed towards the tail reflects at the tail via TIR or via the mirror, and also leaves the rod at the CPC.
III. The remaining light fraction is in TIR and—in theory, in a perfect rod—these rays cannot escape from the rod. This fraction is sometimes called Locked-in TIR light (after the Locked-in syndrome).

Figure 2A:
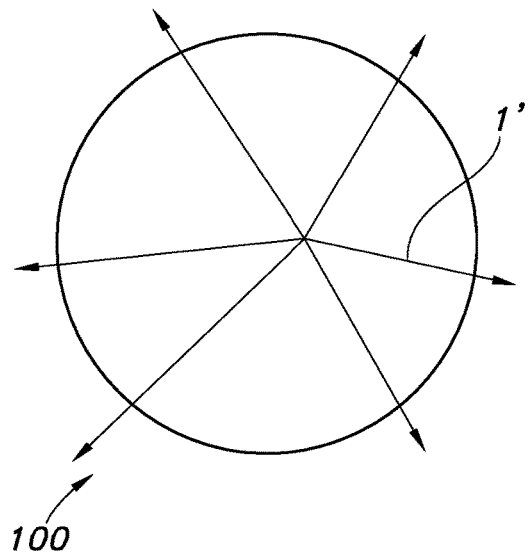
FIGS. 2a-2e schematically depict some embodiments.
Figure 2B:
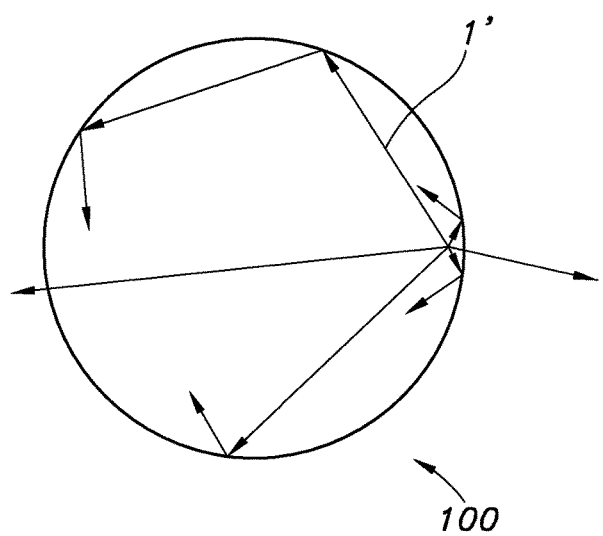
Figure 2C:
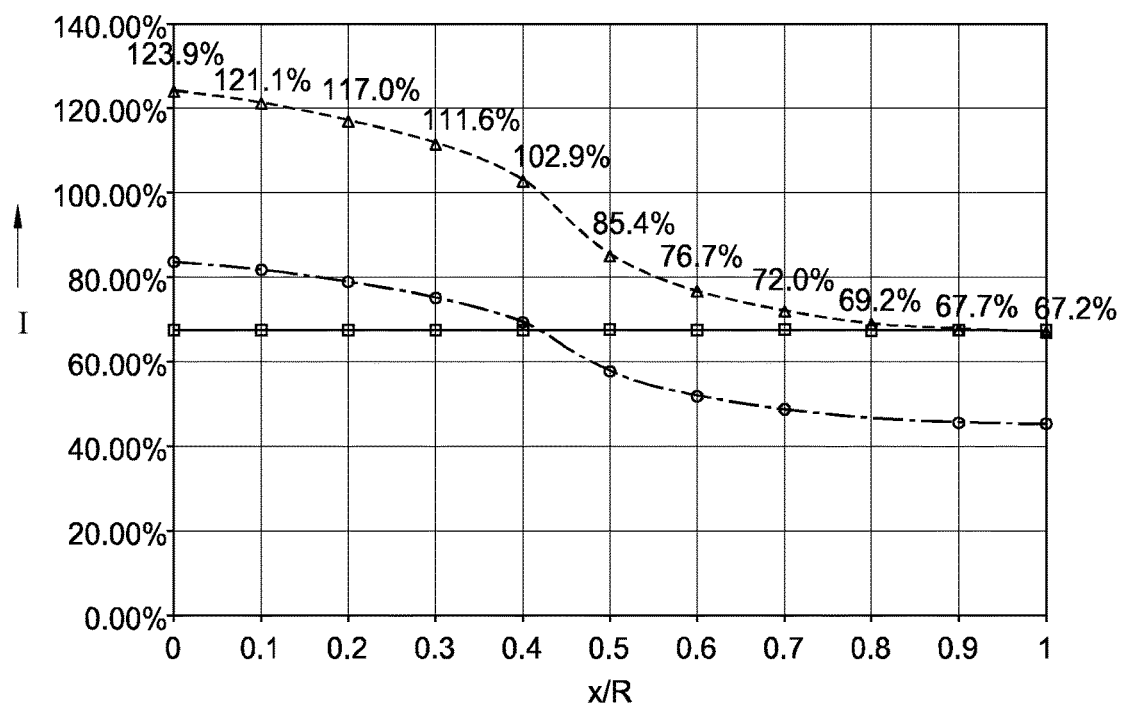

If in the round rod the light is generated in the skin, the light fraction II (TIR-to-Nose) remains unchanged, but fractions I and III change dramatically. FIG. 2a schematically shows the situation that light is generated in the center and FIG. 2b schematically shows the situation that light is generated close to the wall. In both cases, the refractive index of the body material of the elongated light transmissive body was chosen to be 1.84 and of the optical element (CPC like optical element) was chosen to be 1.52. With n_rod=1.84, the light fraction that is escaping from the rod directly (non-TIR) is only 16% if it is generated in the skin of the rod (skin thickness=0). If light is generated on the skin, the non-TIR cone angles to both sides perpendicular to the skin are identical for the round rod and rectangular rods, which can be proven by simple goniometry. For that reason, the non-TIR fraction for skin generated light is exactly half of the non-TIR fraction in a rectangular rod. The non-TIR loss has been modelled analytically for round and rectangular rods. Assuming the light to be generated at a distance x from the wall, the non-TIR fraction increases with the relative distance to the wall, as expressed in the ratio x/r, wherein r is the radius, which is the case for round rods only. Up to x/r=0.4 there is lower non-TIR losses for round rods as compared to rectangular rods. For a round rod of 2 mm diameter this is up to a depth of 0.4 mm; see FIG. 2c. The radius is indicated with reference y.

With increasing depth of light generation, the non-TIR fraction increases up to the 57% non-TIR level of the case with light generated in the center. But with low skin thickness, there is a substantial increase of the optical efficiency of the rod as compared to the rectangular rod. For rectangular rods, the light fractions are essentially independent of the position of light generation. Hence, in an ideal case with light generation on the surface of the round rod, compared to a rectangular rod the efficiency may increase substantially, such as from 68% (rectangular) to 84% (round) (with n_rod=n_CPC=1.84), or such as from 57% (rectangular) to 72% (round) (with n_rod=1.84, n_CPC=1.52). This can be indicated in the following table:

| Light fractions in round rod | n_rod = 1.84, n_CPC = 1.84 | n_rod = 1.84, n_CPC = 1.52 | n_rod = 1.84, n_CPC = 1.52 redistributed Locked-In |
|---|---|---|---|
| I non-TIR | 16% | 16% | 16% + 12% = 28% |
| II TIR-to-Nose | 84% | 43% | 43% + 29% = 72% |
| III Locked-in TIR | — | 41% | Redistributed |

A small absorption length for blue light is the key to having light generated in the skin only. For that reason, an aspect of the invention is that the phosphor content is sufficiently high. For single crystal LuAG a phosphor concentration of Ce %=0.16-0.25% may lead to an absorption length of about 0.3 mm-0.2 mm. In order to get an absorption length of 0.1 mm, about 0.5% Ce may thus be needed.

Figure 2D:
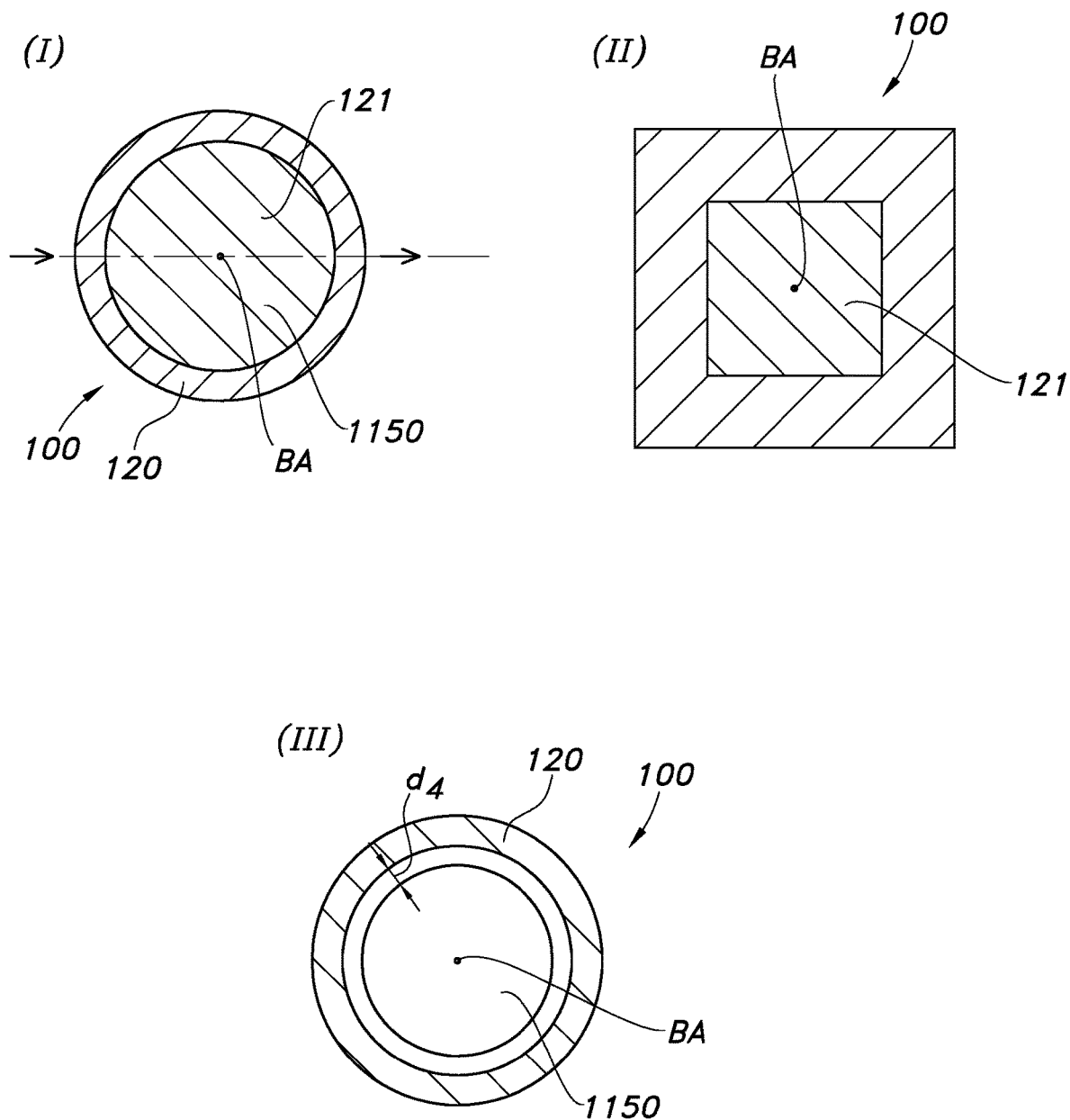

Another way of enabling light generation in the skin is by making a tubular rod, see FIG. 2d. In this case the light guiding effect is effective over the full thickness of the 'ring'. The phosphor content is allowed to be lower as there cannot be phosphor-emitted light from the core. In an application one should set a limitation to the minimum phosphor content as e.g. substantial blue light transmission through the full rod should be avoided. FIG. 2d schematically depicts a non-limiting number of embodiments in cross-sectional views (see also FIG. 6f), with a tubular body 100 having a circular cross-section, a tubular body with a rectangular (square) cross-section, and a tubular body with a round cross-section, wherein by way of example the cavities, indicated with reference 1150, in the former two variants may be filled with a material 121, which especially may have in embodiments a refractive index lower than the refractive index of the material of the elongated (tubular) body (but higher than air). The distance between the bodies, indicated with reference d4 in variant III, may differ along the body axis BA (see also FIG. 5b). In embodiments, especially where the cavity 1150 is filled with a material having essentially the same index of refraction as the material of the adjacent outer body 100, then there may be physical contact (i.e. d4=0 μm). The cavity may in embodiments also at least partly be filled with another body 100; in such embodiment a core-shell configuration may be obtained (see also FIGS. 4a-4b). When the cavity comprises a solid element, such as a body (see also FIG. 4a), the cross-sectional symmetry of the internal body may be different from the external body, though especially they may be the same. In the former variant, d4 may vary over the cross-section. Referring to FIG. 2d, but e.g. also 2e, 5b, transmission perpendicular to the body 100 of light leads to a double pass. The total transmission through the body under perpendicular radiation with light having a wavelength of interest, such as e.g. the wavelength at maximum emission of the luminescent material, is at maximum 50%.

Figure 5A:
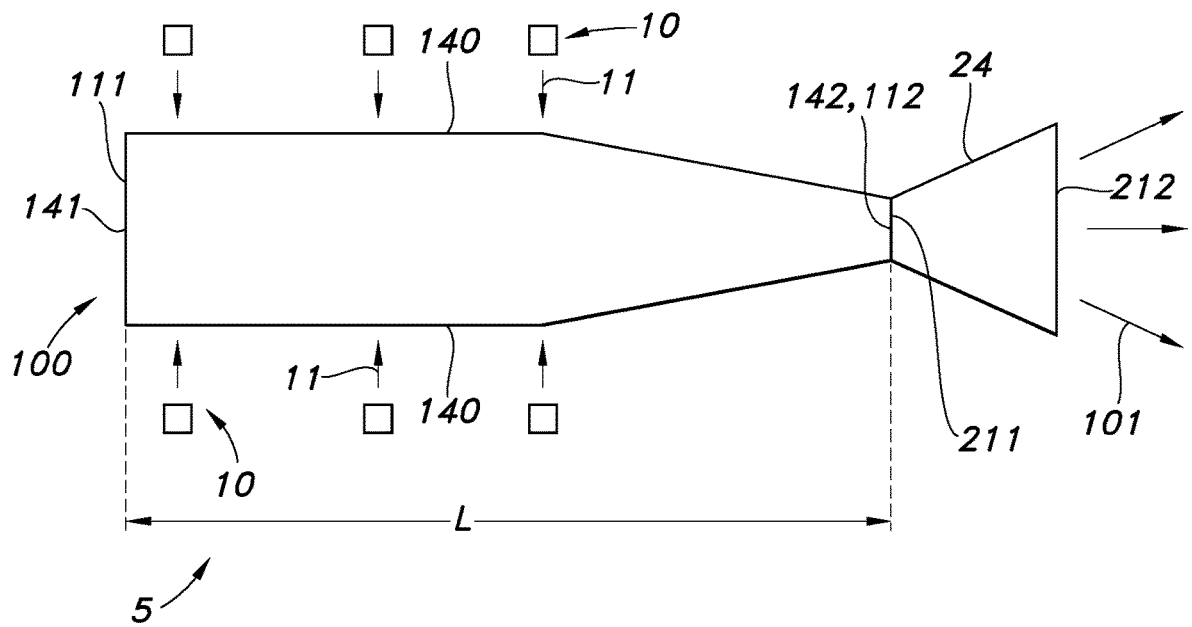
FIGS. 5a-5b schematically depict some tapered embodiments.
Figure 5B:
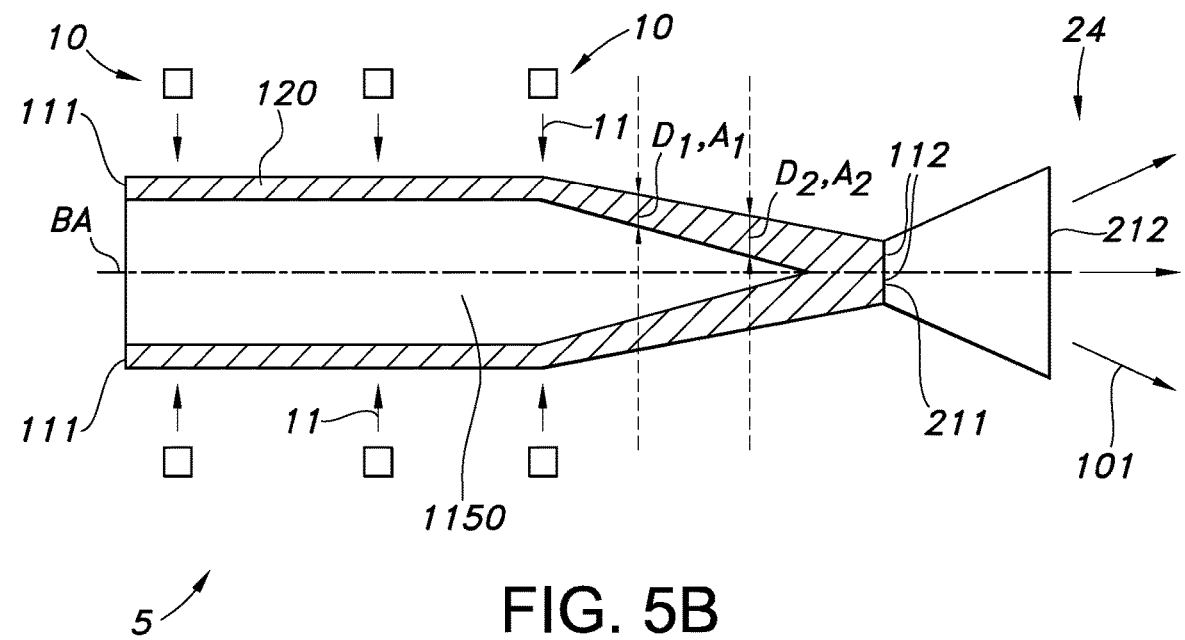

With the embodiment of FIG. 5b, the advantages of a hollow (with circular cross-section) variant, or a variant wherein a concentration of the luminescent material (or activator) is variable over the distance to the surface, is combined with the variant of tapering, wherein light is concentrated in a small area. Thereby, the ring shape distribution of the light may essentially be reduced. With the downstream optical element, e.g. the beam may be shaped.

Figure 3A:
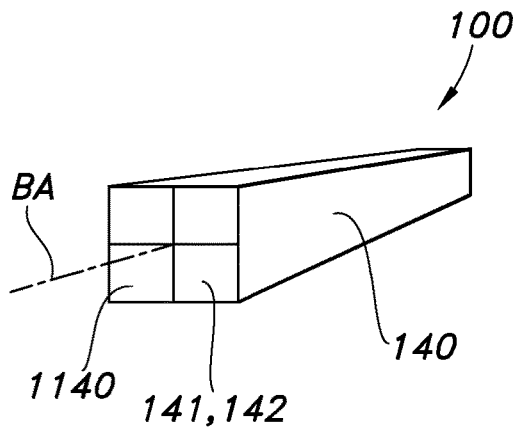
FIGS. 3a-3g schematically depict some embodiments of facets.
Figure 3B:
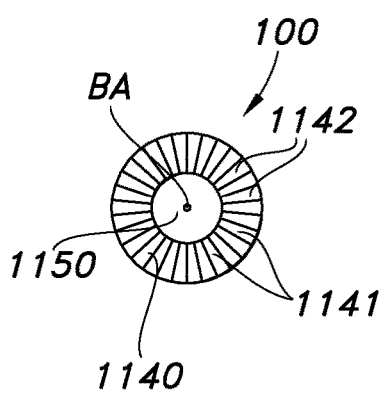
Figure 3C:
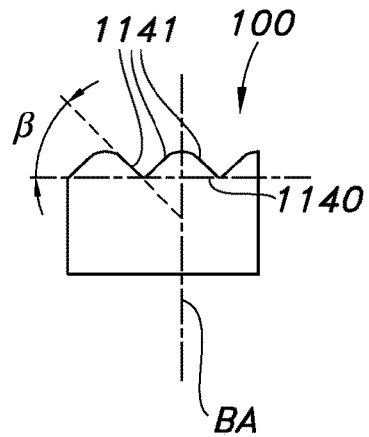
Figures 3D, 3E:
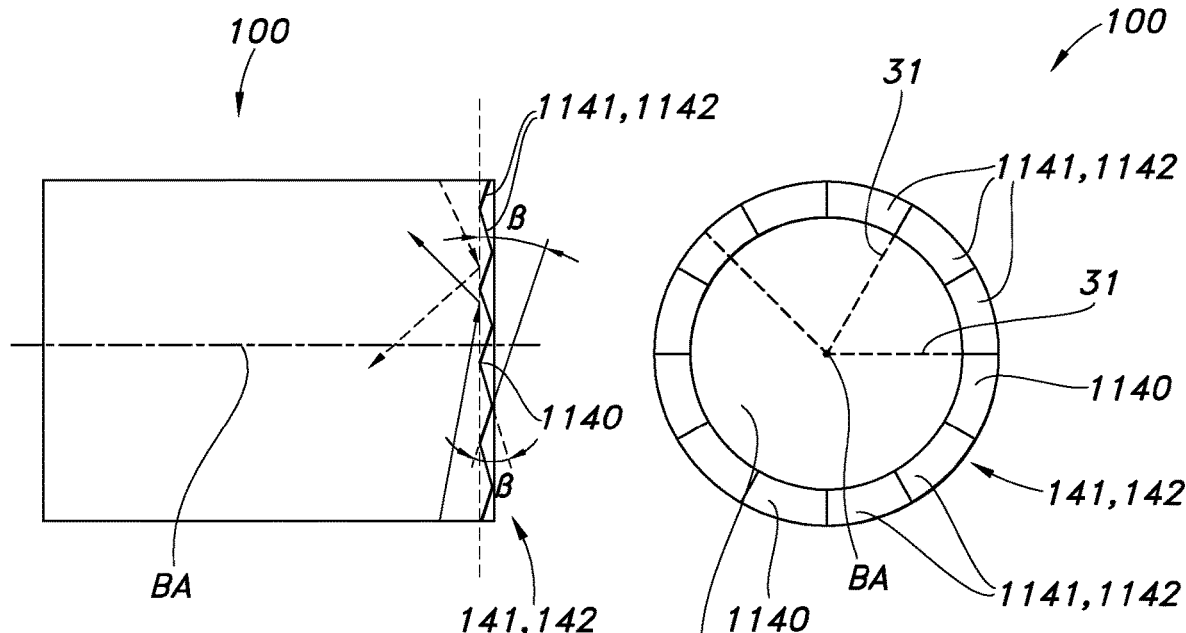
Figure 3F:
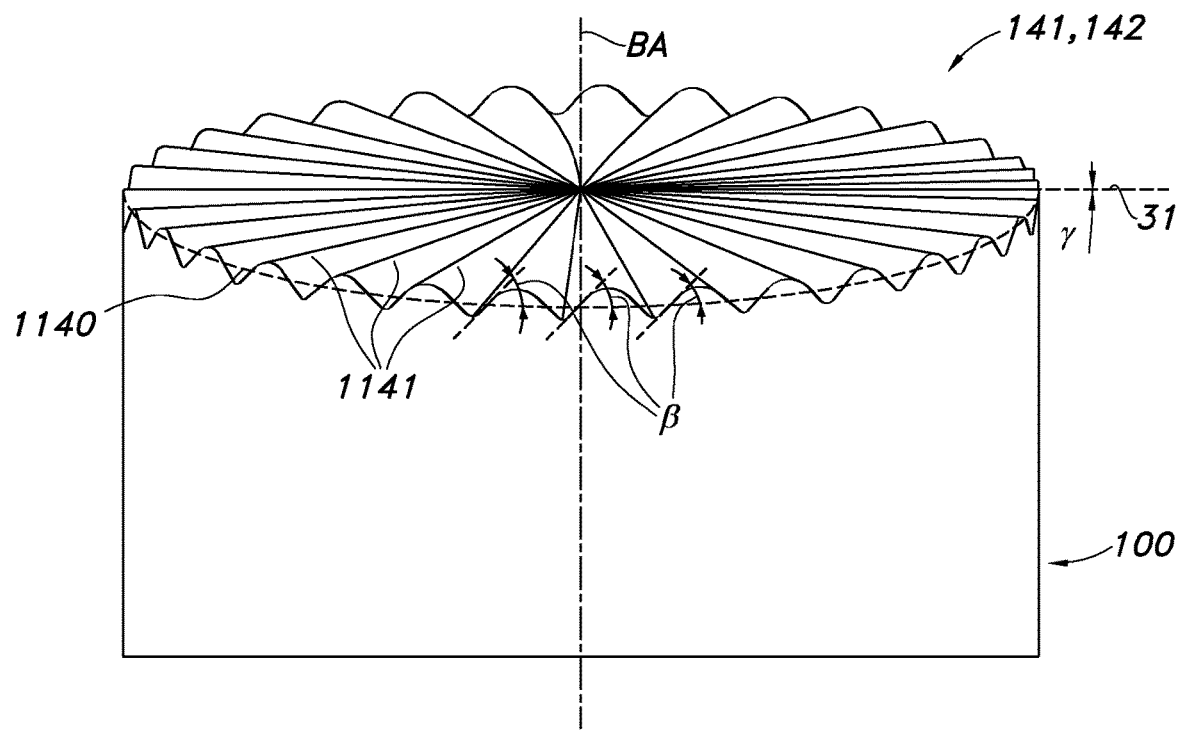
Figure 3G:
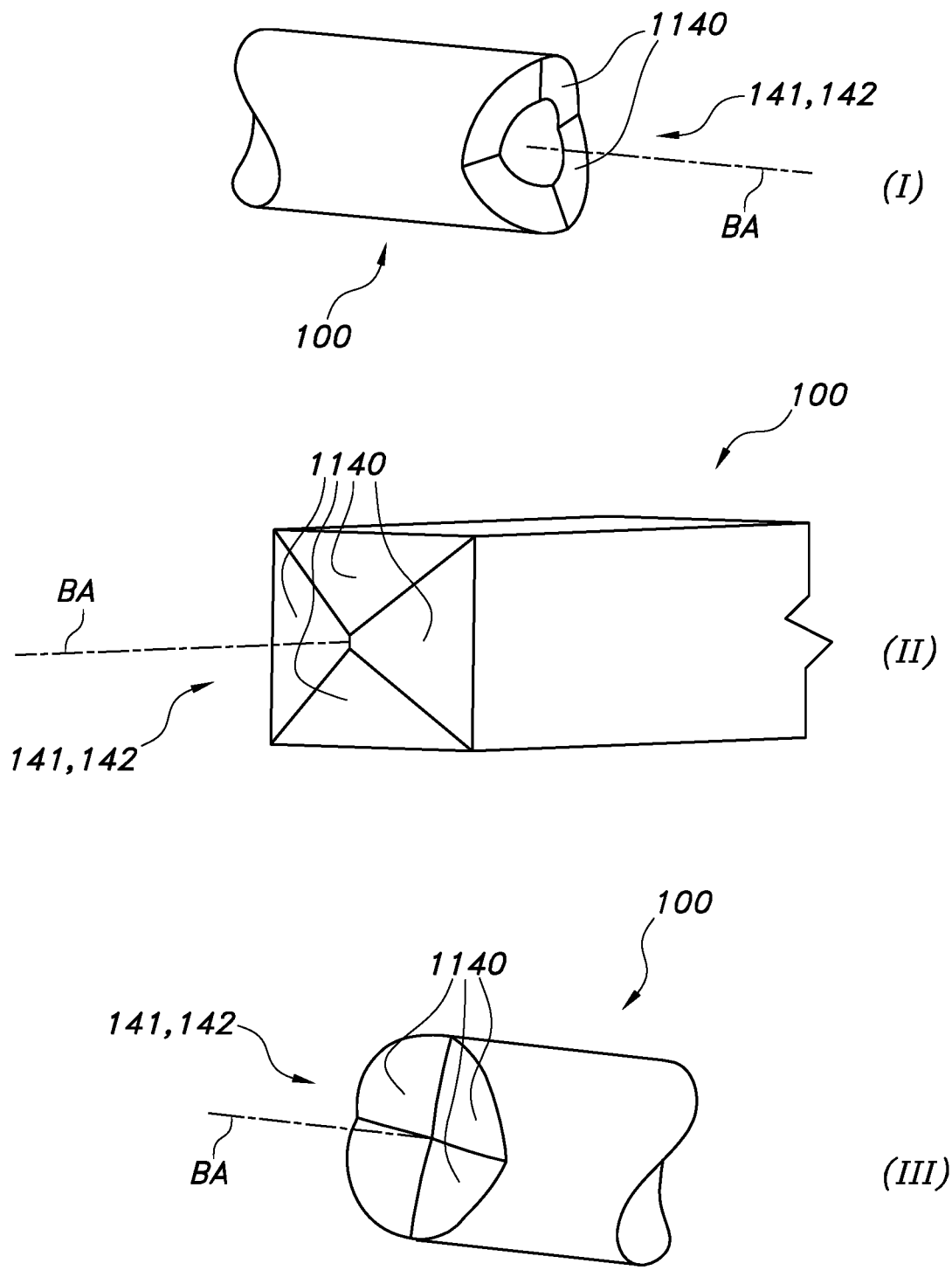

In specific embodiments, including the embodiment schematically depicted in FIGS. 3b, 3e, 3g (top) and 5b, wherein hallow bodies 100 are applied: when the hollow body does not contain another body or material in the cavity, at the inside a reflector may be arranged.

Hence, especially the following conditions may be applied:

a solid rod: round, oval or elliptical in cross section externally; with sufficient phosphor content to have an absorption length ≤0.4 rod radius; or a tubular rod, round, oval or elliptical in cross section, with limited wall thickness, such that inner radius ≥0.6 outer radius; with sufficient phosphor content to have absorption length≤wall thickness.

Another way of enabling light generation in the skin is by realization of a body 100 in which the luminescent material (or activator) concentration is localized near the outer surface. In this case, the refractive index is essentially constant throughout the complete body. Such embodiments is schematically depicted in FIG. 2e.

Figure 2E:
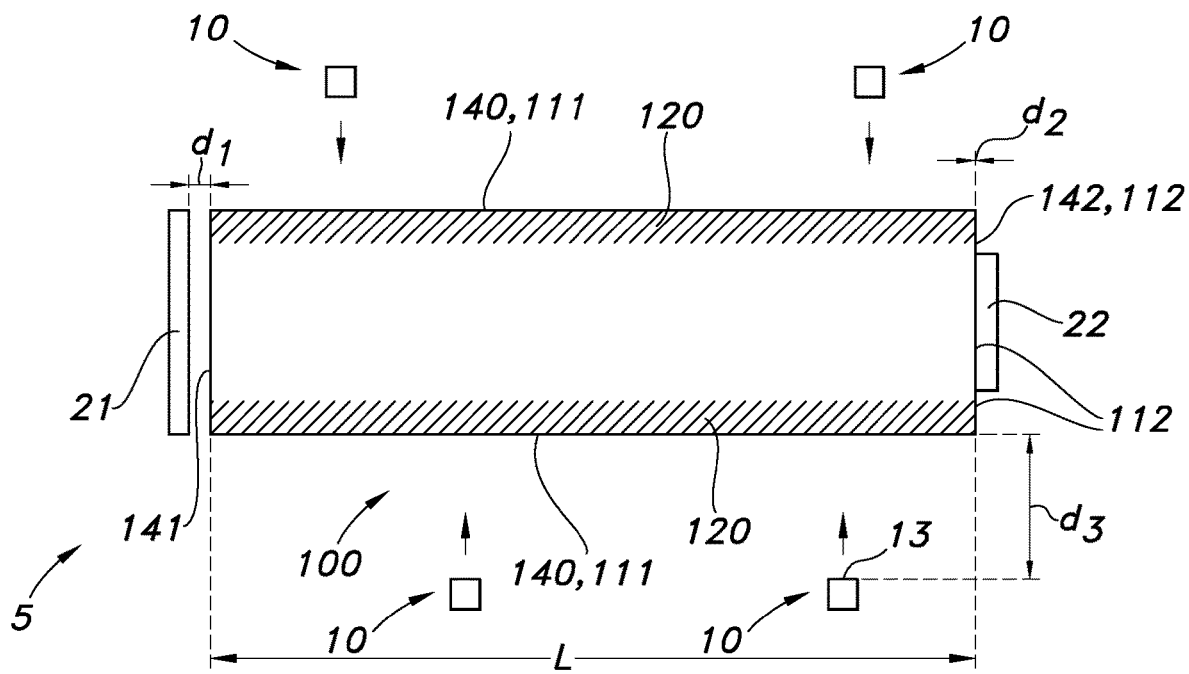

FIG. 2e schematically depicts a variant wherein the luminescent element 5 further comprises a first reflector 21 and/or a second reflector 22. The elongated light transmissive body 100 has a first face 141 and a second face 142 defining a length L of the elongated light transmissive body 100; wherein the second face 142 comprises a first radiation exit window 112. The first reflector 21 is configured at the first face 141 and is configured to reflect radiation back into the elongated light transmissive body 100. The second reflector 22 has a cross-section smaller than the radiation exit window 112, wherein the first reflector 22 is configured to reflect radiation back into the light transmissive body 100.

Here, the distances between the optical elements 21 and 22 with the light transmissive body are indicated with references d1 and d2, respectively. Preferably, they have no physical (or optical) contact to allow TIR for rays with high angle of incidence and only reflect low angle of incidence rays via the mirror. Distances d1 and d2 may e.g. be in the order of 1-50 µm for visible radiation. As indicated above, values of these distances may be indicated as average values.

In other embodiments, however, there may be physical contact between the body and the optical element 21 (if available) and/or the optical element 22 (if available). For instance, upon pressing the mirror to the rod, a bare minimum of real material-material contact area is inevitable from contact force and material hardness. In case of optical contact, more rays hit the mirror, but the additional loss is still limited if the reflectivity of the mirror is high. Further, the distance between a light emitting surface 13 of the light source 10 and the light transmissive element is indicated with reference d3. Hence, these distances d1, d2, and d3 may each independently be chosen of a range of at least 1 µm, such as at least 2 µm.

One or more of the end faces may be facetted or may have other modulations, or may have one or more oblique sides, see FIGS. 3a-3f. For instance, one or more of the first face 141 and the second face 142 comprise a plane 1140 comprising surface modulations 1141 thereby creating different modulation angles β relative to the respective plane 1140; these angles may be equal to or smaller than e.g. about 45°, such as at maximum 40°, like in embodiments at maximum 30°, such as equal to or smaller than about 25° (see e.g. FIG. 3d). Further, in embodiments β is especially at least 15°, such as at least 20°. Especially, the plane 1140 comprises n/cm² facets 1142 as modulations 1141, wherein n is selected from the range of 2-2000, such as 4-500. Further, in embodiments, as schematically depicted, there are at least 2 facets 1142 having different modulation angles β, such as at least four. There may also be a continuous modulation, see FIG. 3c, wherein a kind of sinusoidal modulation is available.

The body 100 may have a square cross-section or a rounded cross-section. In the latter variant, the modulations are especially modulations parallel to the radius radii, and not deviations from the radius radii. Thus, the modulations 1141 may have angles γ relative to perpendiculars r1 to the axis of elongation BA selected from the range of 0-90°, such as in embodiments up to 35°, like in the range of 15-35°, more like in the range of 25-35° see also FIGS. 3f and 3g. The outcoupling of the luminescence in variants I-II can be increased with 1-5 percent points using facets, such as four facets. The outcoupling of the luminescence in variant III can be increased with 5-10 percent points using facets, such as four facets. Note that in variant I (and III) there is some radial distortion. FIGS. 3b and 3e, and optionally FIG. 3d, schematically depict facets provided to an end face of a hollow (tubular) body 100. FIG. 3f, and optionally FIG. 3d, schematically depicts facets to an end face of a cylindrical body.

FIG. 3g schematically depict three variants of bodies wherein the first face 141 and/or the second face 142 (here, a single face is depicted) comprises a plurality of facets 1140, here each having four facets 1140. Variant I shows a hollow body 100 having a round cross-section, variant 2 schematically depicts a body 100 having a rectangular cross-section, and variant III schematically depicts a body 100 having a round cross-section. Best results may be obtained with β in the range of 15-45°, such as 20-40°, even more such as 25-35°. In a preferred embodiment, the bodies (variant I, II and III) of FIG. 3a-g further comprise a reflective surface (not shown in FIG. 3a-g) facing the first face (141). The reflective surface is conformal with the shape of the first face (141) and is not in direct contact with the first face (141). The gap between the reflective surface and the first face (141) may be filled with air or with a material that has a relative low refractive index compared to the material of the elongated light transmissive body (100).

Hence, when especially referring to bodies 100 having a circular cross-section, A primary function of the modulations, such as facets, would be a β modulation (tangential direction), but for a limited number of modulations, such as especially facets, there may also be (significant) γ modulation. The embodiments of FIG. 3g all have an efficiency increase of about 5-10% relative to bodies 100 without the modulations (here four facets).

Especially, for one or more modulations, such as for one or more facets, especially for essentially all modulations, such as essentially all facets, the ratio of β/γ≥0.8, such as especially β/γ≥1.0, like β/γ≥1.2.

An advantage of a hollow elongated body is that no scattering can take place in the center of the rod. It appears that light scattering in the center of a round rod leads to relatively high light losses and should be avoided. However, with a hollow elongated light transmissive body the inside wall introduces a new source of light scattering which can lower the performance of the elongated light transmissive body if the scattering is significant. But it is hard and expensive to polish the inside rod wall to a surface smoothness with only low scattering.

With a transparent filling material the light scattering at the inside wall is reduced, as more rays that hit the inside wall are transmitted through the interface. The closer the refractive indices of rod and filling material are, the smaller the change in light direction upon transmission through the interface. Further, with a given (high index) rod material, the critical TIR angle depends on the refractive index of the filling material, the more close n_filler is to n_rod, the larger the critical TIR angle and the more transmission takes place, while transmitted light is scattered less than reflected light. Also, the Fresnel reflections depend on the refractive indices of both materials, the more close n_filler is to n_rod, the lower the Fresnel reflections are (which are subjected to scattering). Scattering at the inside wall is completely vanished if n_filler=n_rod. But also the light guiding of the inside wall in no longer there.

In view of the light guiding effect of the inside wall it may be advantageous to have a filling material with a refractive index that is lower than that of the rod.

Hence, the following features may be of relevance: a hollow elongated light transmissive body, a filling material that is essentially fully transparent, with a very low scatter level, essentially no air bubbles or other inclusions in the filling material, and a refractive index of the filling material that is in between the refractive indices of air and the elongated light transmissive body.

Figure 4A:
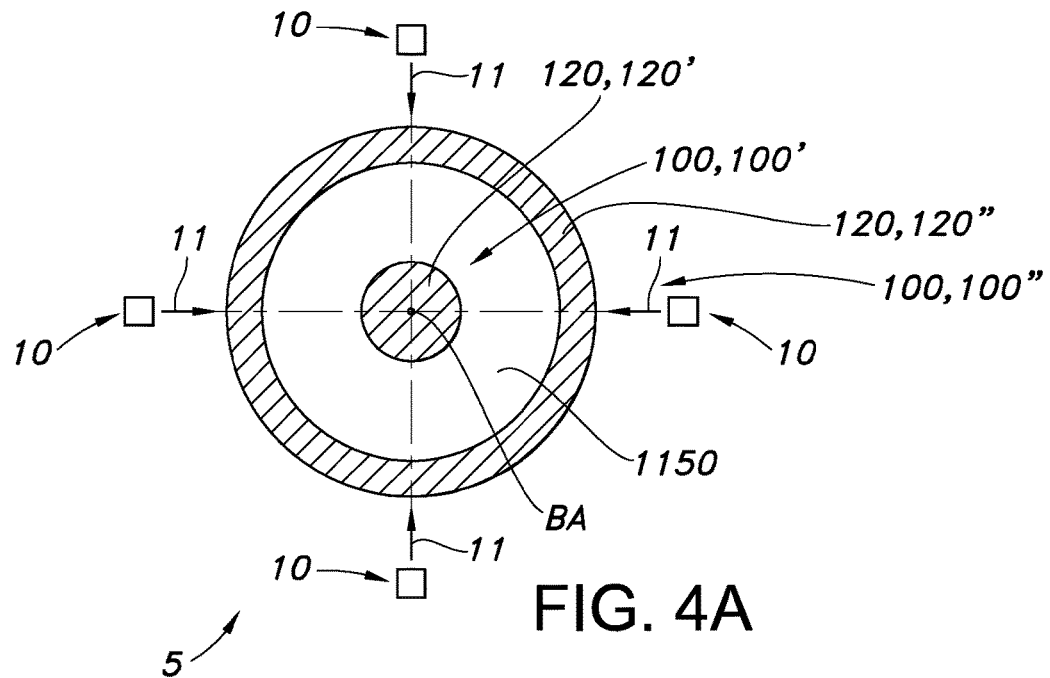
FIGS. 4a-4b schematically depict a core-shell embodiment.
Figure 4B:
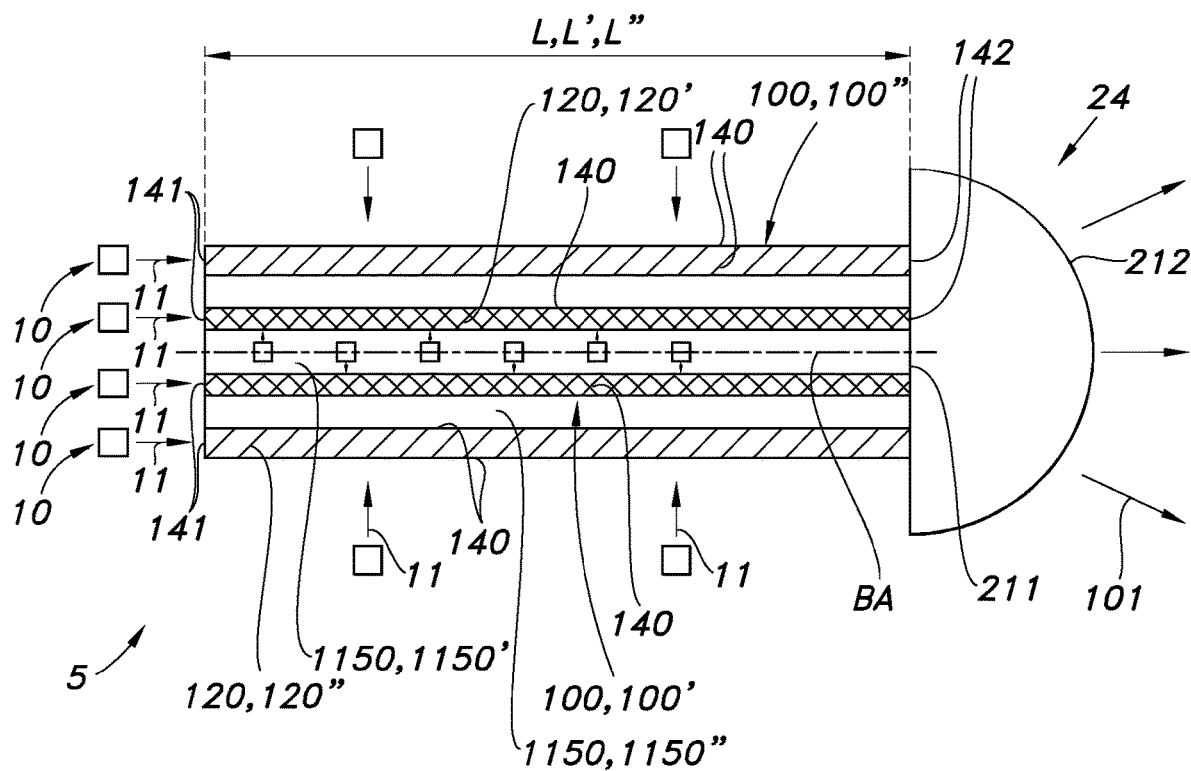

Further, a rod-in-rod concept may be applied, see FIGS. 4a-4b.

For instance, rods having the same length and concentration of phosphor fixed along the rod can be applied. Then, the spectral distribution may not be tunable when irradiation is via the outer rod. Especially, in such embodiments where the light sources are configured external of the rod assembly, the phosphor concentration of outer rod should be low enough that part of the light source light, such as blue LED light can hit the inner rod.

In embodiments, for blue light one can use high power LED at beginning of the rod which can be just a light guide. Alternatively or additionally, a LED with e.g. 405 nm can be used that pass the green and red rod and hit the center rod which absorbs 405 nm and exits ~470 nm blue.

In embodiments, the concentration of the phosphor varies along the rod. If phosphor concentration varies along the rod; more or less blue light can hit the red rod, when irradiation is via the outer rod. Adapting current depending on location of the blue LED, spectrum can be changed.

For extraction of light from the light transmissive body, a CPC (Compound Parabolic concentrator) can be used. For best extraction, the refractive index of the CPC should match with refractive index of the rod. The attachment of this CPC to the HLD rod is quite a challenge regarding matching refractive indices rod, glue, CPC and mechanical strength. By making the rod from one piece the last part of the rod can be made completely tapered, in embodiments with increasing diameter for increasing distance from the cylindrical luminescent converter component to extract the light from the end side, or in other embodiments with decreasing diameter for increasing distance from the cylindrical luminescent converter to extract the light from the tapered side surface, by which light can be extracted as also collimated by which no CPC is needed which is a big advantage. Another possibility is partly tapering of the rod and adding a CPC after the tapered part. An advantage may be that extracted light has much lower etendue or a higher brightness may be achieved (than with a tapered light transmissive body), and still the controlled collimation of light with CPC may be obtained.

Both options worked best with hollow cylindrical or elliptical shaped rods in which light is generated close to the outer wall of the rod and with additional structures on mirror opposite to the light extraction.

Both figures shows embodiments of a luminescent element 5 comprising an elongated light transmissive body 100, the elongated light transmissive body 100 comprising a side face 140, wherein the elongated light transmissive body 100 comprises a luminescent material 120 configured to convert at least part of a light source light 11 selected from one or more of the UV, visible light, and IR received by the elongated light transmissive body 100 into luminescent material radiation; wherein the elongated light transmissive body 100 has a length L; the elongated light transmissive body 100 is hollow over at least part of the length L thereby defining a cavity 1150.

In FIG. 4a, the elongated light transmissive body 100 is tubular shaped. Further, the elongated light transmissive body 100 has a tubular shape having a cavity 1150 surrounded by the elongated light transmissive body.

Also, by way of example in FIG. 4b, the luminescent element 5 further comprising an optical element 24 optically coupled to the elongated light transmissive body 100, here a dome. In an alternative embodiment, a conical structure may be applied. Such conical structure may taper in the direction of a radiation entrance window 211 of the optical element (i.e. in the direction of the second face 142 of the light transmissive body 100 (bodies 100). In alternative embodiments, such conical structure may taper in the direction of a radiation exit window 211 of the optical element (i.e. in a direction away of the second face 142 of the light transmissive body 100 (bodies 100). Note that only by way of example the optical element 24 is drawn in combination with the element comprising the core-shell(s) configuration. The optical element may especially be used in combination with essentially any of the herein described elements 5.

In FIG. 4b, the light transmissive body 100' is solid.

FIGS. 4a and 4b especially show embodiments of the luminescent element 5 comprising a plurality of elongated light transmissive bodies 100, each elongated light transmissive body 100 comprising a luminescent material 120 configured to convert at least part of a light source light 11 selected from one or more of the UV, visible light, and IR received by the elongated light transmissive body 100 into luminescent material radiation 8. Further, the elongated light transmissive bodies 100 differ in one or more of a length L of the elongated light transmissive bodies 100, b type of luminescent material 120, c concentration of luminescent material 120, d concentration distribution over the elongated light transmissive body 100, and e host matrix for the luminescent material 120. As shown, each elongated light transmissive body 100 has an axis of elongation BA, which are here coinciding. Further, one or more of the elongated light transmissive bodies 100 comprise cavities 1150. In FIG. 4a, the smallest elongated body 100, indicated with reference 100' is massive, whereas in FIG. 4b the smallest elongated body 100' also includes a cavity 1150, indicated with reference 1150'. The notations'refer to the inner elongated body 100' and the notations" refer to the outer elongated body 100". Note that in principle more than two elongated bodies 100 may be applied. As shown, the elongated light transmissive bodies 100 are configured in a core-shell configuration wherein a smaller elongated light transmissive body 100 is at least partly configured in the cavity 1150 of a larger elongated light transmissive body 100 and wherein the axes of elongations BA are configured parallel. The side faces 140 of adjacent elongated light transmissive bodies 100 have no physical contact or only over at maximum 10% of their respective surface areas.

FIGS. 4a-4b also show embodiments of the lighting device 1 comprising:

a light source 10 configured to provide light source light 11;

the luminescent element 5 according to any one of the preceding claims, wherein the elongated light transmissive body 100 comprises a radiation input face 111 and a first radiation exit window 112; wherein the luminescent material 120 is configured to convert at least part of light source light 11 received at the radiation input face 111 into luminescent material radiation 8, and the luminescent element 5 configured to couple at least part of the luminescent material radiation 8 out at the first radiation exit window 112 as converter radiation 101.

Each elongated light transmissive body 100 has a first face 141 and a second face 142 defining a length L of the elongated light transmissive body 100; wherein the side face 140 comprises the radiation input face 111, wherein the second face 142 comprises the radiation exit window 112. The different lengths are indicated with L' and L", respectively, though here the lengths are essentially identical.

One or more light sources 10 are configured to provide light source light to the side face 140 of an outer elongated light transmissive body 100 and/or wherein one or more light sources 10 are configured to provide light source light 11 to one or more first faces 141, wherein the one or more first faces 141 are end faces, and/or wherein one or more light sources 10 are configured in a cavity 1150 of an inner elongated light transmissive body 100 and configured to provide light source light 11 to the side face of the inner elongated light transmissive body 100. In specific embodiments, in a first mode of operation the lighting device 1 is configured to provide white light. In other specific embodiments, the lighting device comprises a first mode of operation wherein colored light is provided. In yet further embodiments, the lighting device 1 may further comprise a control system, configured to control the light sources, where the different light transmissive bodies 100 are configured to provide luminescent material light with different spectral distributions. In such embodiments, the spectral distribution of the lighting device light 101 may be tunable.

The optical element 24 comprises in the schematically depicted embodiment a radiation entrance window 211 and a radiation exit window 212, and essentially consists of light transmissive material.

Embodiments of tapered rods are shown in FIG. 5a-5b. In FIG. 5b, the cross-sectional area may essentially stay constant. Hence, these figures schematically depict embodiments wherein the elongated light transmissive body (100) tapers along at least part of the length of the axis of elongation (BA). Or, the elongated light transmissive body (100) tapers along at least part of its length L. FIG. 5b schematically depicts an embodiment wherein the tubular elongated light transmissive body (100) tapers along at least part of the length of the axes of elongation (BA) while maintaining a cross-sectional area perpendicular to the axes of elongation (BA) constant, see the dashed lines in the tapered section. Normally, if the area is becoming smaller, light could be extracted or the light is reversed back to the nose.

Because we can make use of recycling of the light, it appeared possible to make area of the entrance of the optical component, such as a CPC, even smaller than area of cross section of the hollow rod. Part of the light may thus be recycled at the second face. This embodiment is not depicted.

A luminescent concentrating body with a specific cross-sectional shape that enables improved coupling efficiency, improved light extraction, improved cooling, improved converter mounting, improved module assembly, and/or improved light source robustness by features related to that specific cross-sectional shape, is herein—amongst others—proposed.

In embodiments, one or more features may include: embedding of the pump LEDs within linear cavity in the converter; positioning/alignment of the converter body in the high brightness module; defining the distance from pump LEDs to the converter; reducing the light extraction cones from 4 down to 2 resulting in reduced light losses and therefore an increase module performance; mounting of multiple converters next to each other or within each other, enabling spectral tuning of the light source output; specific converter cross sectional profiles that enable one or more distinct advantages are I shapes, O shapes, T shapes, U shapes, and more complex versions.

In embodiments (I) a highest linear optical flux density for irradiation with LEDs of a luminescent light concentrator, which is needed to keep the light source dimensions limited and the cost lowest, can be generated by applying chip scale package LEDs (CSP-LEDs). However, contrary to the thin film flip chip LEDs that are used in for example the first generation HLD product, and which are top-emitters (i.e., only emitting from the top surface), all currently available CSP LEDs are 5-side emitters, resulting in higher light losses as it is difficult to couple the light that is emitted sidewards from the chips into the conversion rod. Modeling shows a light loss of ca 10% even with a rectangular luminescent converter that has a width that is significantly larger than the width of a CSP LED. By shaping the luminescent converters such that they surround the pump LEDs, the coupling efficiency can be significantly improved, as in this way almost all light can be captured by the conversion rod.

Figure 6A:
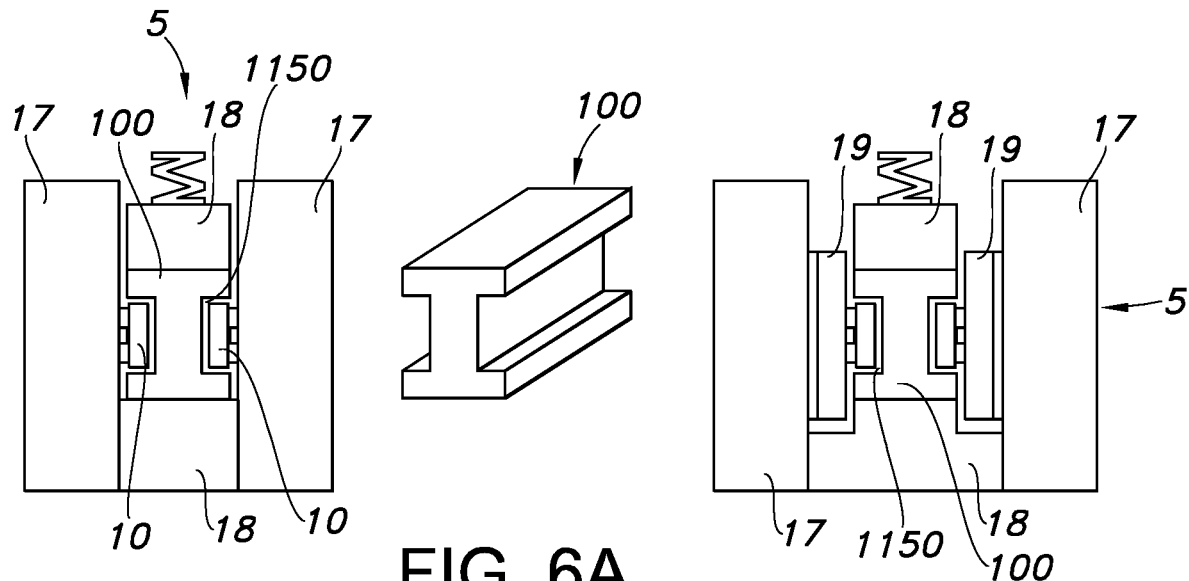
FIGS. 6a-6e schematically depict some specifically shaped light transmissive bodies.

FIG. 6a schematically shows an embodiment of an I-shaped luminescent conversion rod for maximum coupling efficiency of pump light. Left, a cross sectional view of I-shaped conversion rod clamped between two rod holders, sandwiched between two PCB's each having a linear array of 5-side emitting CSP-LEDs is shown. In the middle a 3D perspective view of the conversion rod is shown, and at the right, a variant of light source with ceramic substrates on heat spreaders is shown.

Reference 17 refers to and PCB, such as an MCPCB, which is a metal-core PCB (printed circuit board. Reference 18 refers to rod holder or elongated light transmissive body hold, of which e.g. a top rod holder and a bottom rod holder may be available. However, other configurations may also be possible. Reference 1150 indicates a cavity.

In embodiments (II), the distance from pump LEDs to the rod is controlled by the depth of the groove in the rod that comprises the stack of dies and solder; currently this is handled by a separate mechanical provision in the rod holders making these components complex and expensive. In this embodiment, the rod is simply placed directly between the two opposing PCB's, ideally having substantially the same width as the rod holder that is rigidly mounted to at least one of the PCBs. In other embodiments both rod holders have the same thickness and are just mounted and fixated in place, enabled by the easy placement of the rod; in this case no movable top rod holder is needed anymore that in the first generation product still needs to be clamped to the rod. Alternative board configurations including ceramic boards are possible as well.

Figure 6B:
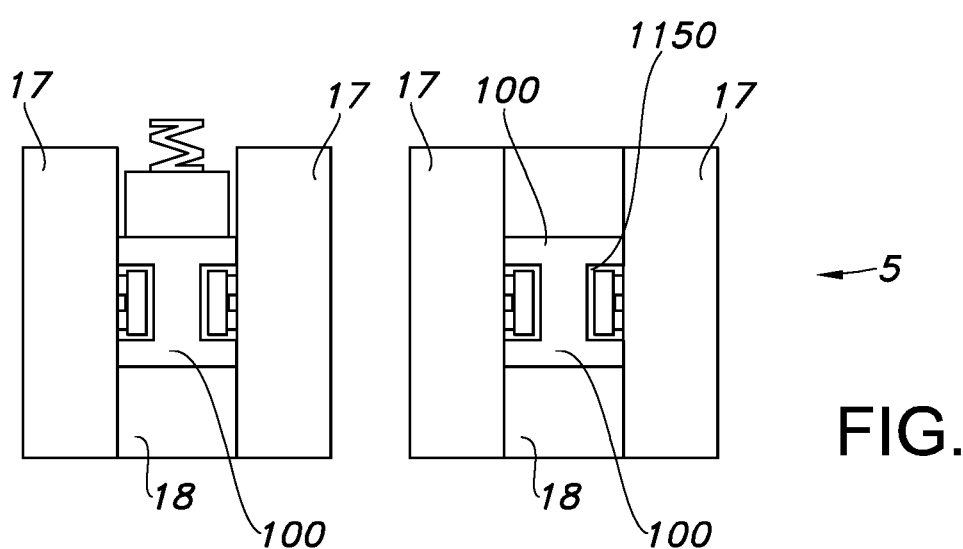

FIG. 6b schematically depicts a cross sectional view of light source with I-shaped conversion rod where the gap between the top face of the pump LEDs and the rod is determined by the groove in the rod. Here, the rod has substantially the same width as the rod holders, where both rod holders are mounted fixed to the boards/heat spreaders.

In embodiments (III) the light conversion is realized by a longitudinally tiled rod, enabling spectral broadening of the overall output by using different compositions of the two U-shaped rods. An additional feature is realized by independent addressing of the pump LEDs on the two boards, which enables dynamic tuning of the overall output spectrum.

Figure 6C:
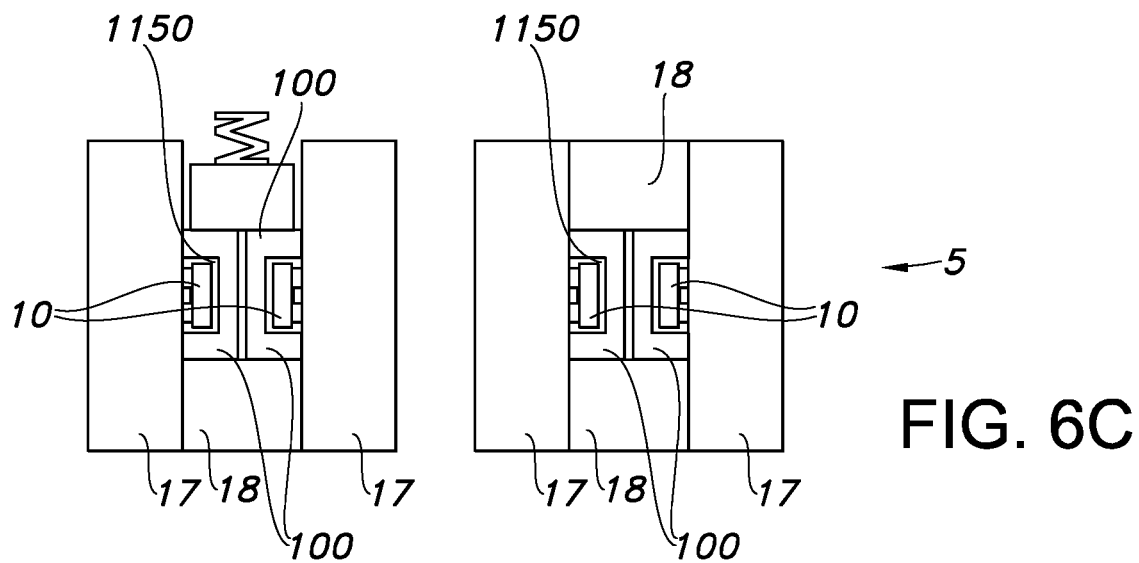

FIG. 6c schematically depicts a schematic cross-sectional view of two light source embodiments according to the invention comprising two U-shaped conversion rods forming together an I-shaped conversion body. The pump LEDs on the two opposite boards may be driven independently, enabling temporal variation of the overall output spectrum.

In embodiments (IV) In addition to the tiling of the conversion body, in further embodiments of the light source the rod holders are longitudinally tiled for ease of assembly: in this way the two halves of the light source can be assembled independently and subsequently be mounted together, e.g. by clamping the corresponding rod holders of the two halves to each other, or by using dedicated spacers between the boards. Light extraction optics may be mounted after having assembled the rods in their holders and the two halves have been mounted together. By using split rod holders, soldering of rod holders directly to both PCB's (or to the ceramic substrate if used) is enabled.

Figure 6D:
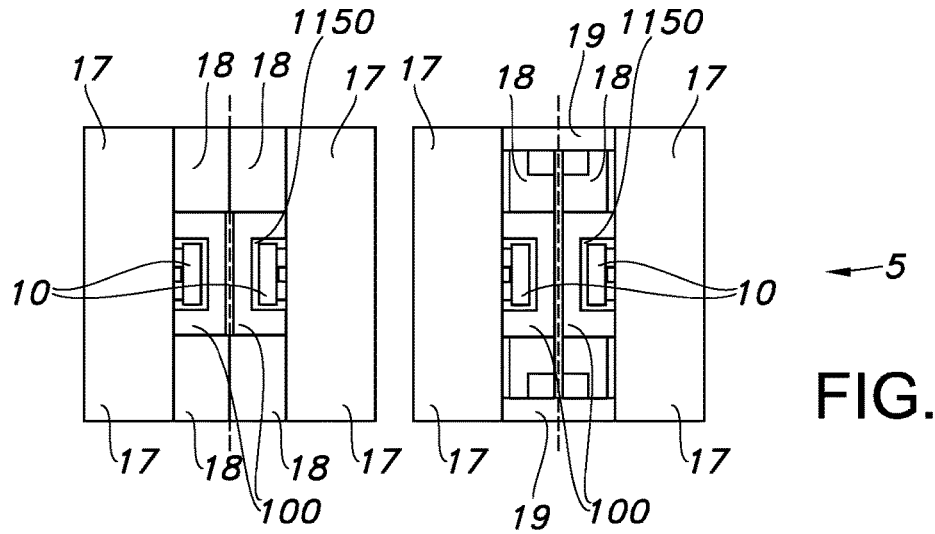

FIG. 6d shows a schematic cross-sectional view of a light source embodiment according to the invention comprising two U-shaped conversion rods forming together an I-shaped conversion body, and where also the rod holders are tiled: the module comprises two halves that are separately assembled and afterwards bolted or clamped together. Left, the corresponding rod holders of both half-modules are clamped together upon assembly of the complete module, and right, the rod holders are soldered (or glued) to the respective boards. Using distance pieces, the two half-assemblies are mounted together at the desired distance from each other.

Reference 19 refers to a distance element or distance piece. This may be a piece of metal or ceramic material or polymeric material. Especially, the distance element may be a temperature resistant material. In embodiments, the distance element 19 may be a glass or a ceramic material. In further embodiments, the distance element 19 may be a liquid crystal polymer.

In embodiments (V) the distance from pump LEDs to the rod is controlled by an alignment feature in the circumference of the rod that coincides with a feature in the mechanics around the rod. This alignment feature can either be one or more (longitudinal) grooves in the rod, or it can be (longitudinal) protrusions from the rod.

Figure 6E:
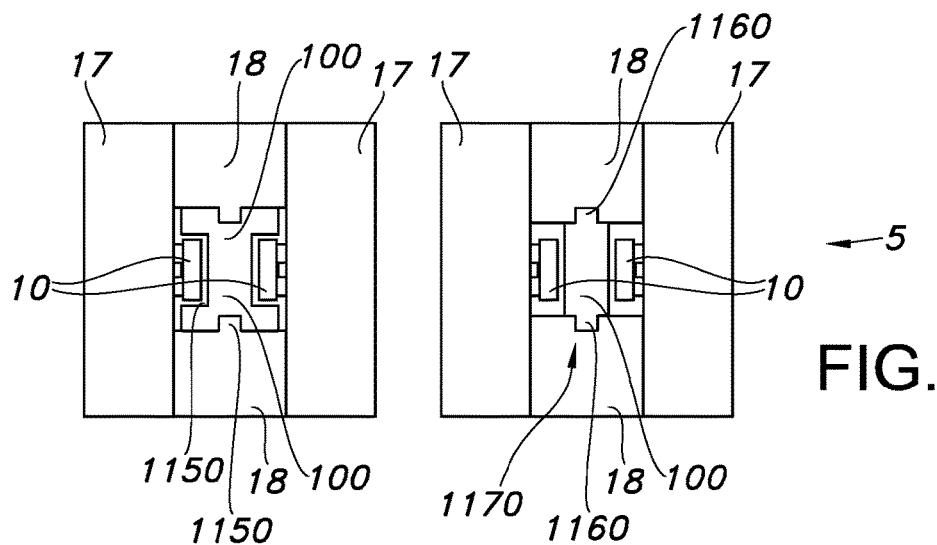

FIG. 6e schematically depicts a schematic cross-sectional view of light source with conversion rod comprising longitudinal features for alignment of the lateral rod position, and optionally grooves for embedding the pump LEDs. On the left, a rod with LED-embedding grooves and rod-alignment grooves is depicted, and on the right, a rod with alignment protrusions is schematically depicted.

Reference 1160 indicates a protrusion.

Figure 6F:
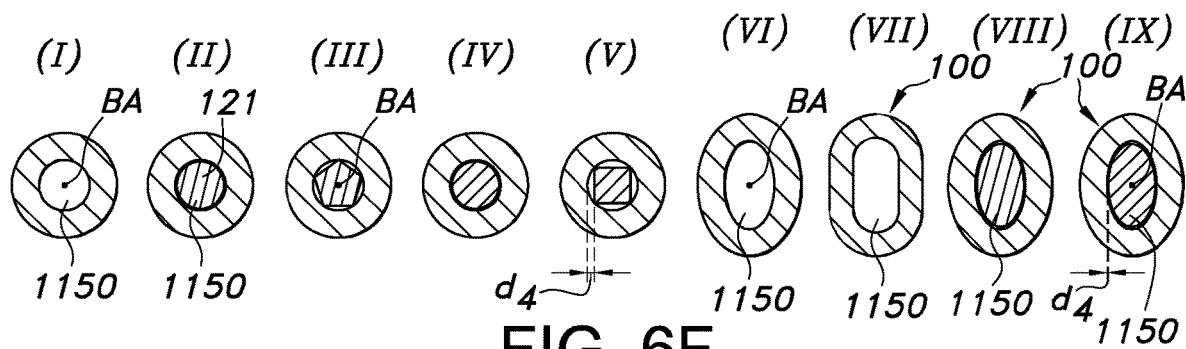
FIG. 6f schematically depict some variants of cross-sections of possible light transmissive bodies.

In embodiments (VI), a tube-shaped luminescent converter is applied. The hollow center part of this converter may be substantially filled by a second luminescent converter rod that may have a different composition than that of the tube-shaped converter. FIG. 6f schematically depict a non-limiting number of embodiments. It schematically shows cross sectional view of the core of the light source comprising a hollow conversion tube. Pump LEDs as mounted parallel to the tube and potential irradiating laser diodes irradiating one of the facets of the center body, as well as the cooling blocks for cooling the luminescent converters have been omitted for simplicity.

In an embodiment a tubular converter is applied with a wall thickness significantly smaller than half the outer diameter of the tube. The cross-sectional shape may be circular or oval, and/or may have flat sides for maximum coupling of pump light from the LEDs into the converter. The thinner the wall, the smaller the extinction losses as the 4 escape cones of converted light that are associated with the 4 sides of a square or rectangular rod are reduced to only 2 escape cones (this is the limit for an infinitely thin wall; note however that the thickness in combination with activator concentration should be large enough to enable substantial conversion for practically achievable activator concentrations in the converter material).

In a further embodiment, a substantially transparent and highly translucent rod is positioned inside the luminescent conversion tube, providing independent light guidance in the longitudinal direction of both bodies. The outer rod is pumped by blue LEDs mounted parallel to the rod, while the inner rod acts as a light guide and homogenizer for blue and/or red laser diode light that is coupled into the rod at one end, where the tube is provided with a mirror to reflect part of the converted light (emitted towards this end facet). The center rod may be shaped to optimally fill the center cavity, or preferably has a polygonal cross-sectional shape for improved spatial homogenization. Some, preferably forward, scattering may be present in the center rod and/or on the outer surface of the rod to improve the homogeneity of the light at the exit facet.

In an alternative embodiment, a luminescent conversion rod is mounted within the hollow luminescent conversion tube, the rod and the tube having different luminescent emission spectra. For maximum converted light guidance performance, the center rod preferably has an absorption length much smaller than its diameter, or has a substantial square or rectangular shape to prevent the occurrence of more than 4 escape cones in the cross sectional plane.

Figure 6G:
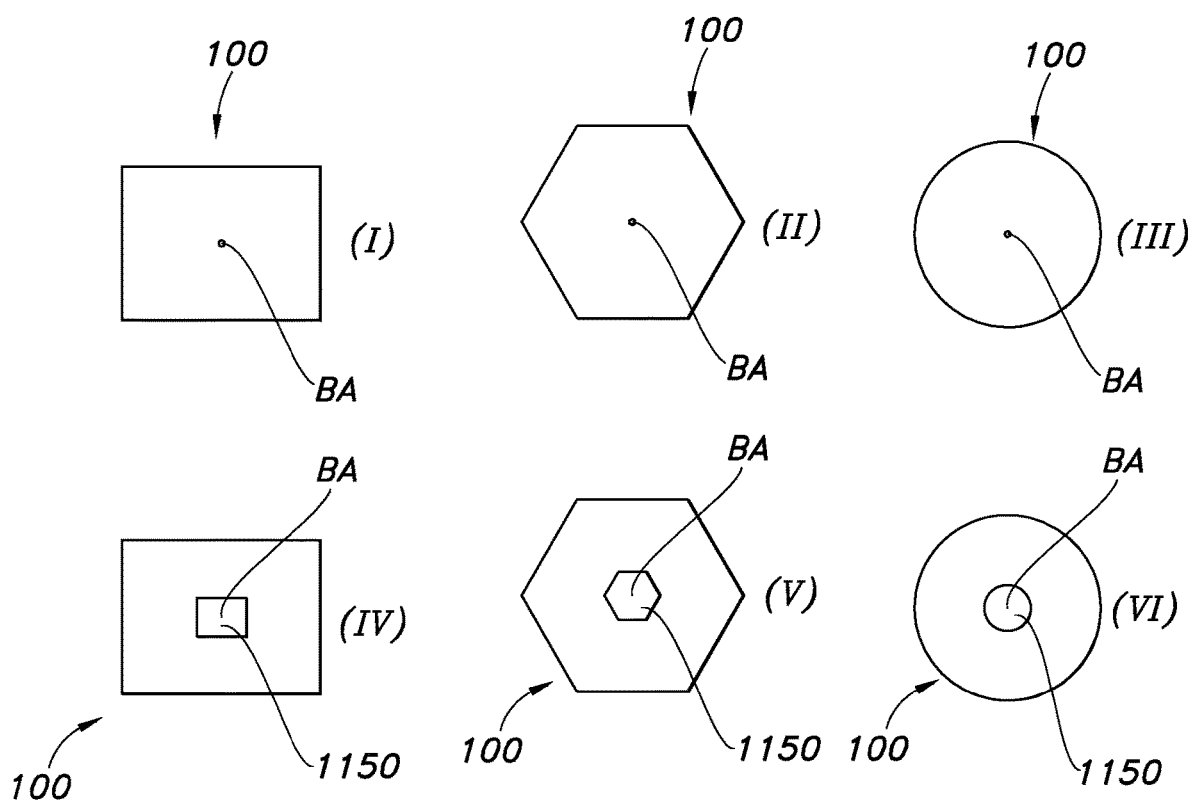
FIG. 6g schematically depict some possible basic shapes of light transmissive bodies (in cross-sectional view)

FIG. 6g schematically depicts some non-limiting examples of bodies in cross-sectional views, with massive bodies 100 and with hollow bodies 100 having cavities 1150. Would variants I or III be tapering along the length of the body 100 (i.e. perpendicular to the plane of drawing, a (truncated) pyramid may be obtained. Would variants II or IV be tapering along the length of the body axis BA, then a (truncated) hexagonal pyramid may be obtained. Would variants III or VI be tapering along the length of the body axis BA, then a (truncated) cone may be obtained (see e.g. FIG. 5b).

FIG. 6g amongst others depicts a body 100 with a hexagonal cross-section. Also octagonal cross-sections may be applied. The number of side faces (in cross-section) may be defined a n, with n being 4 for square or rectangular, and being 6 for hexagonal, and in effect being unlimited for a round cross-section. In embodiments, n is selected from the range of 4-50, such as 6-50, like 6-40. In other embodiments, the body is round (right part of the drawing).

Figure 7A:
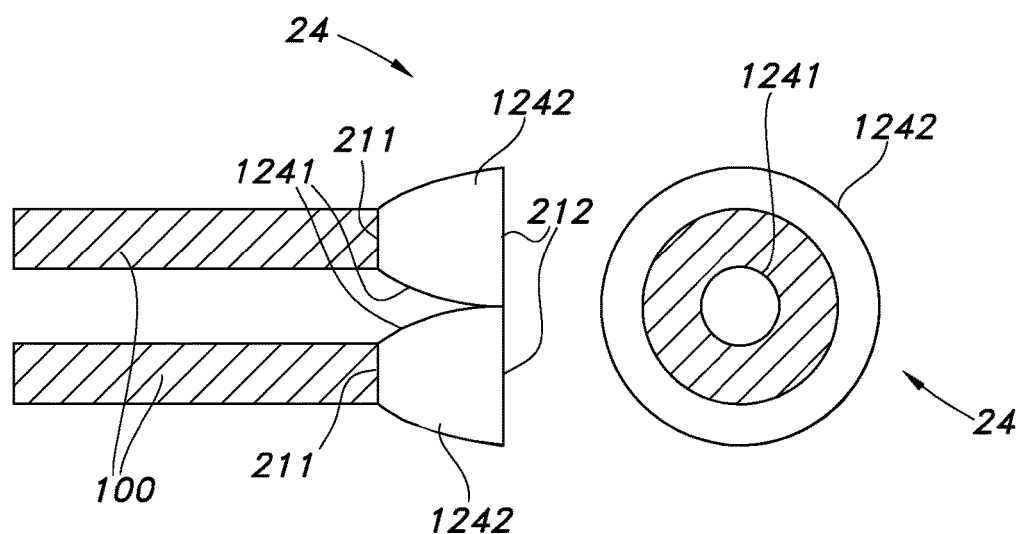
FIGS. 7a-7d are directed to some embodiments of optical elements.

In embodiments, wherein a cylindrical light converter is applied, an efficient light extracting collimator can be applied that results in a homogeneous light emitting surface without a center hole and without significant étendue increase, by applying a circular version of a 2-dimensional CPC (or an optimized shape close to that). FIG. 7a schematically shows a cross sectional view and a front view, with a schematic longitudinal cross-sectional view (left) and front view (right) of the core of the light source comprising a hollow conversion tube with a light extracting collimator that fills the center gap of the tube. Pump LEDs as well as cooling provisions, which are mounted parallel to the tube, have been omitted for simplicity.

FIG. 7a schematically depicts an embodiment wherein the optical element 24 comprises a first wall 1241 and a second wall 1242 surrounding the first wall 1241 thereby defining an optical element 24 having a ring-like cross-section, wherein the optical element 24 comprises a radiation entrance window 211 and a radiation exit window 212, wherein the radiation entrance window 211 is optically coupled with a plurality of elongated light transmissive bodies 100. Note that the same cross-sectional views may apply to a hollow elongated light transmissive body 100 (including a cavity) optically coupled to such optical element 24. The optical element may be hollow or may be a massive body comprising light transparent material.

In case of a combination of multiple light converter bodies, a light extracting optical component such as a solid CPC, a solid truncated pyramid or a solid truncated cone, is preferably mounted to the bodies after the latter ones have been mounted and fixed in position. In those cases where they are not completely fixed, i.e., can move somewhat, relative to each other, the light extractor may be mounted rigidly to only one of the converter bodies, e.g. the outer tube, while the inner rod is preferably brought in optical contact with the light extracting optics via a flexible gel.

In case of a combination of a light converting tube with a non-converting center rod, the light extracting optical component needs to be mounted only to the luminescent converter body (as transmission through the center rod is high even without optical contact).

Figure 7B:
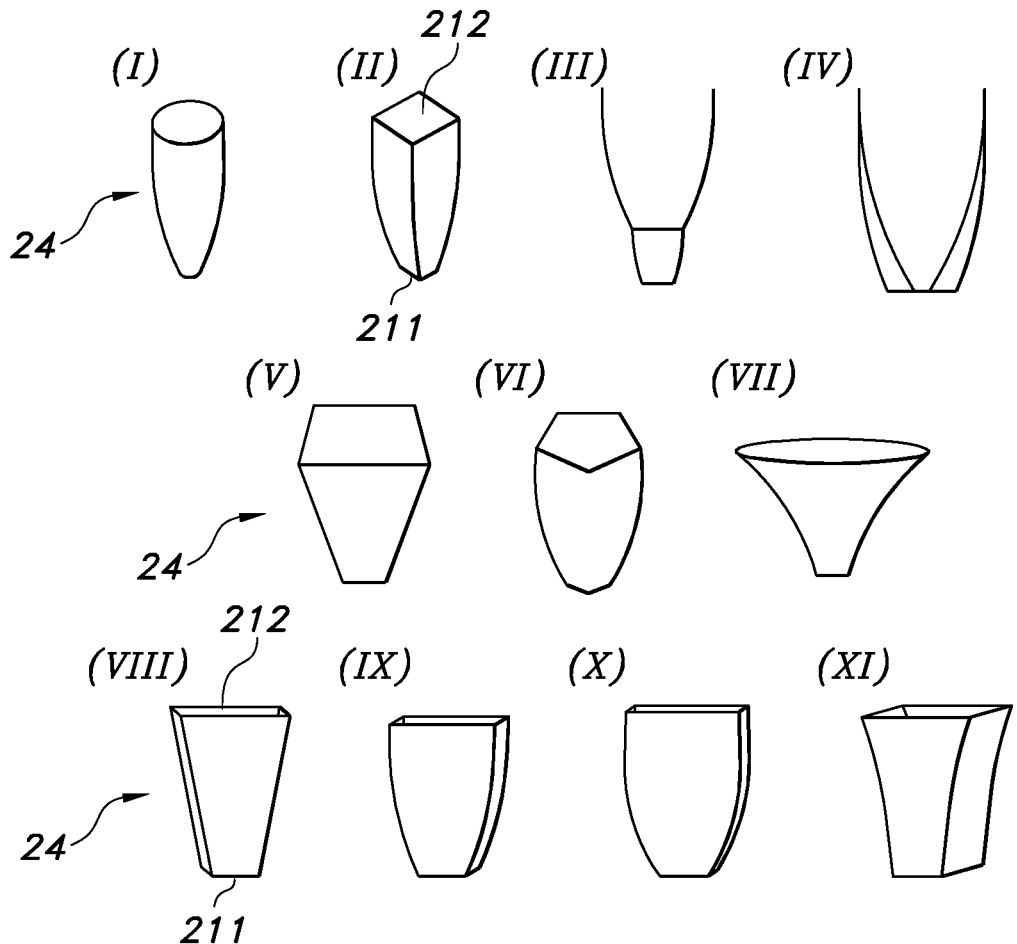

FIG. 7b schematically depict a non-limiting number of optical elements. Here, especially concentrators are depicted. FIG. 7b schematically depicts a revolved CPC (I), a crossed CPC (II), a compound CPC (III), a lens-walled CPC (IV), a crossed V-trough concentrator (V), a polygonal CPC (VI), a square elliptical hyperboloid (SEH)(VII), a V-trough (VIII), a compound parabolic concentrator (IX), a compound elliptical concentrator (X), and a compound hyperbolic concentrator. Further options or hybrids between two or more of these may also be possible.

Figure 7C:
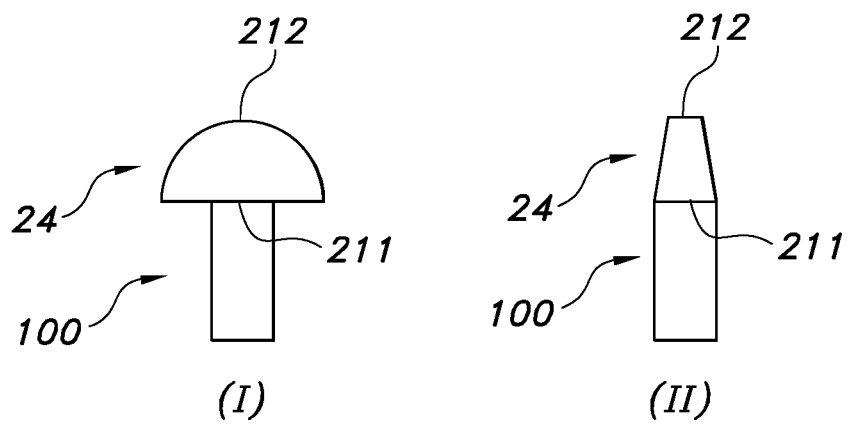

However, also a dome shaped optical element may be applied, see FIGS. 7c (and 4b), embodiment I.

Optical elements may e.g. increase in diameter with increasing distance from the transmissive body, such as shown in most of the drawings, expect for the half sphere or dome in FIG. 7c, embodiment I. However, also e.g. conical structures or 1-dimensionally tapered elements, where especially a characteristic width (or diameter) decreases with increasing distance from the transmissive body could be relevant. In such embodiments, light extraction is to the side(s) of the element (at grazing angles).

Alternatively, an optical element 24 with decreasing outer dimensions for increasing distance from the entrance plane can be applied (II). This may create a collimated extracted beam, in contrast to the non-collimated beam that is emitted from a dome-shaped optical element (I). Alternatively, a wedge-shaped structure may be applied (not depicted).

Figure 7D:
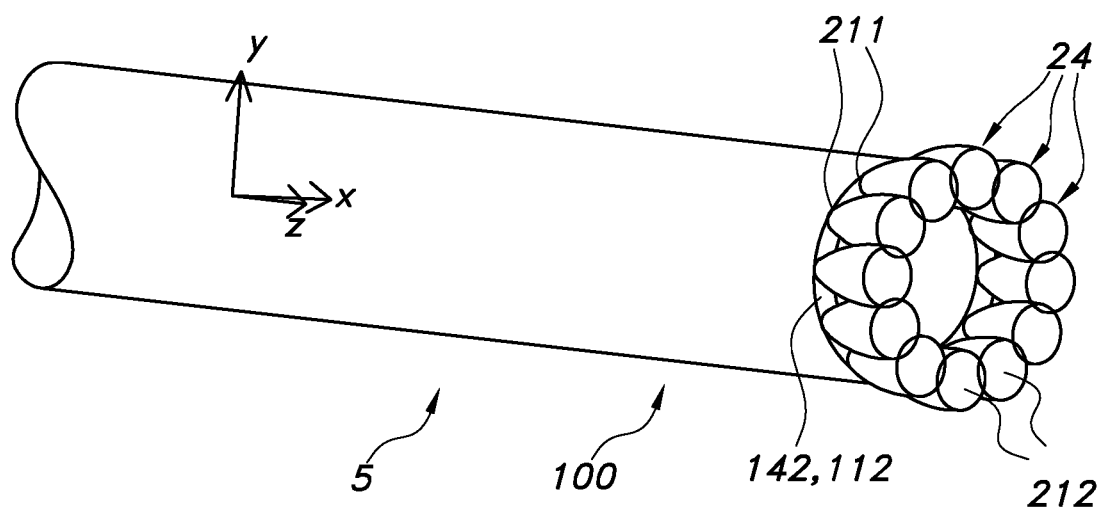

FIG. 7a schematically depicts a revolved optical element, such as a revolved CPC. Alternatively, a number of small optical elements may be chosen or a plurality of fibers may be chosen (not shown), which are optically coupled to the (hollow) light transmissive body 100. FIG. 7d schematically depicts an embodiment wherein a plurality of optical elements 24 are applied, downstream of the radiation exit window 112.

In embodiments, in case of a shaped converter body that is different from the desired light emitting surface shape, or a combination of multiple light converter bodies, a further light mixing portion of the converter structure may be used that spatially homogenizes the light before being further extracted (and possibly pre-collimated) by the extraction optics. In other words, a mixing portion is provided between the converter body and the beam shaping and light extracting optics.

With the new multi-component manufacturing approaches, concentrator shapes and compositions as presented in this document, most or all of these disadvantages may be overcome or may be significantly reduced, resulting in high brightness light sources with significantly reduced cost and with highly improved performance characteristics.

A monolithic luminescent concentrating body is proposed that has a refractive index that is constant throughout that body, while the optical absorption and/or the emission spectrum is a function of location in that body. In particular, a luminescent converter is proposed that has a high optical absorption for pump light in an outer layer of the body while the inner part of the body has a lower absorption for the pump light, preferably is transparent for the pump light. This can be realized by 2-k extrusion, by co-injection molding (first mold the core of the body, and use that as an insert for the molding of the outer shell of the body), by subsequent gel casting (same principle), or by subsequent pressing (same principle). Upon sintering of these bodies, a luminescent converter results with the requested properties. In a second application, the light extractor body is co-created with the luminescent converter body in the "green phase" by 2-k injection molding, pressing, 2-k pressing, or 2-k gel casting, based on two materials that have different spectral absorption characteristics while having the same refractive index. In all cases, the crystal structures of the 2 (or more) materials are chosen to be very similar to enable successful sintering, to preserve a cubic lattice throughout the whole body, and prevent second phase formation. This is realized by using host materials that are very similar, e.g. substantially the same garnet composition, but with a different doping level of the Ce activator, or with little deviations in the lattice. Some (small) differences in the garnet host material may also be tolerated, but preferably these are substantially equal.

The term "2k" refers to "two components". It may also refer to multi-component, as the principle of two components may in general also be applied for more than two components.

Pressing, such as especially uni-axial pressing, may be applied as well. Pressing may include dry powder pressing or wet suspension pressing. Further, a mold may be used when pressing.

Figure 8A:
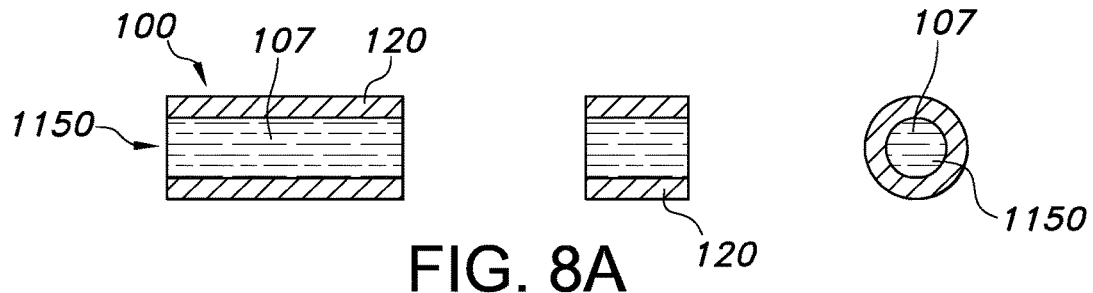
FIGS. 8a-8f schematically depict some aspects of light transmissive bodies, optionally with optical elements and/or a mixing portion.

In embodiments, a monolithic converter comprising an outer layer with high absorption of pump light and inner part with low absorption of pump light is proposed. In embodiments a rod or bar is realized with absorption of pump light in an outer layer and lower absorption of pump light in the inner part. The rod or bar has a refractive index that is constant and a crystal structure that is substantially homogeneous throughout the converter as well. This is realized by 2-component extrusion, by injection molding of a shell layer around a (molded or extruded) core, or by casting of a shell layer around a casted (or maybe even molded/extruded) core, after which the composed body is sintered, see FIG. 8a, which shows a monolithic poly-crystalline ceramic bar or rod with luminescent outer layer, indicated with reference 120 (luminescent material), and non-luminescent inner part 107; both parts have the same refractive index and coefficient of thermal expansion, but different spectral absorption characteristics. Both a rectangular and a circular variant are depicted.

Many other shapes can be realized as well, including polygonal transverse cross-sectional shapes, oval shapes, and (partial) combinations of such. It may have flat sides for maximum coupling of pump light from the LEDs into the converter.

In embodiments within this class of configurations, a cylindrical, oval, or polygonal (transverse cross-sectional shape) converter (or some combination thereof) is applied with a pump-light absorbing wall thickness significantly smaller than half the outer diameter of the rod. The thinner the wall, the smaller the extinction losses as the 4 escape cones of converted light that are associated with the 4 sides of a square or rectangular rod are reduced down to only 2 escape cones for a very thin pump-light absorbing circular shell.

Figure 8B:
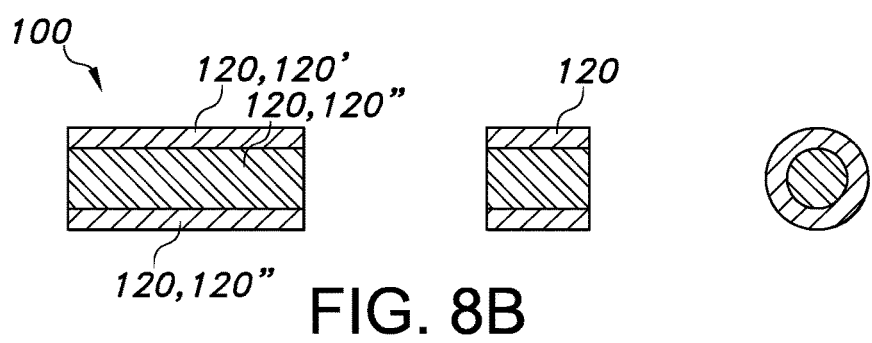

In alternative embodiments, the center body of the luminescent conversion bar/rod has a different luminescent emission spectrum than the shell of the body. For maximum converted light guidance performance, the center rod preferably has an absorption length much smaller than a characteristic diameter, while also the thickness of the outer layer is small compared to a characteristic diameter of the bar/rod. See FIG. 8b, which shows a monolithic poly-crystal ceramic bar or rod comprising a luminescent outer layer and a luminescent inner part; both parts have substantially the same refractive index and coefficient of thermal expansion, but different emission spectra by differences in host composition and/or activator concentration. Both a rectangular and a circular variant are depicted. The different luminescent materials 120 are indicated with references 120' (shell) and 120" (core).

Figure 8C:
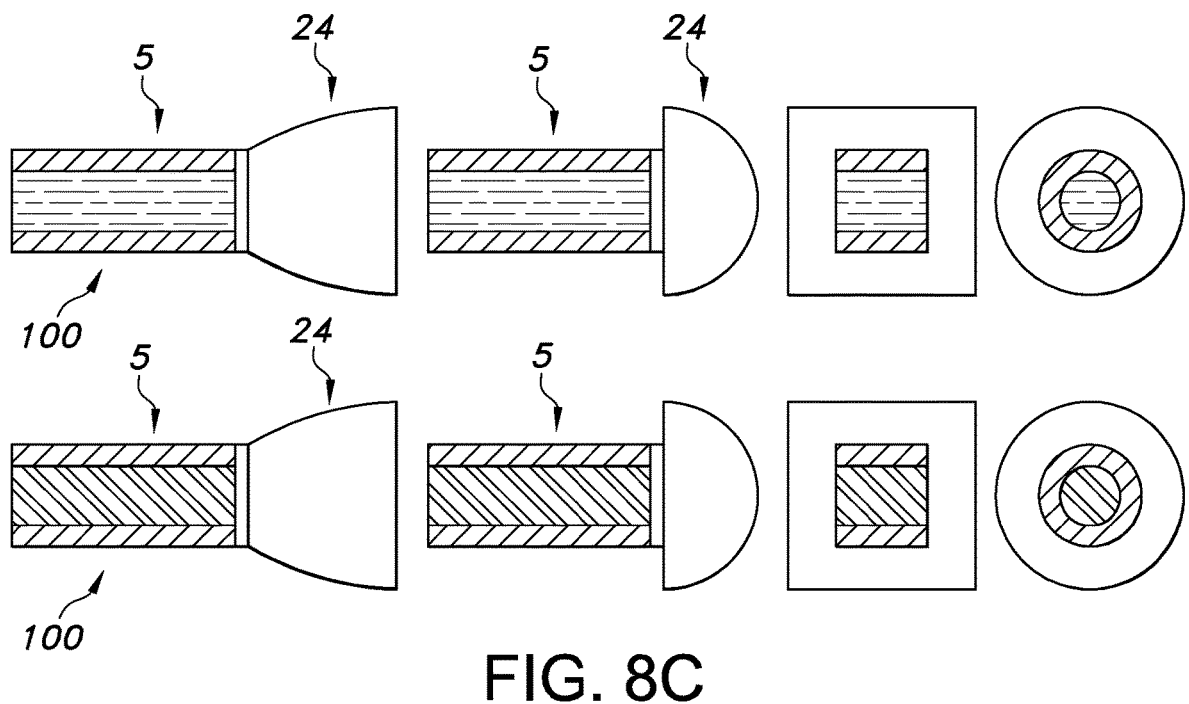

In embodiments, a monolithic poly-ceramic luminescent converter body with light extractor is proposed. For increasing light extraction a light extractor is applied to the luminescent converter bar/rod; this may be a collimating type of extractor, e.g. with an outer shape as that of a compound parabolic concentrator (CPC), or a dome type of extractor. Typically the light extractor and the luminescent converter body are connected by an intermediate (optically transparent) medium with a refractive index somewhere in between the refractive indices of the components. Some variants are displayed in FIG. 8c, which shows a monolithic polycrystalline ceramic body with luminescent outer shell and a non-luminescent core (i.e., with a core that does not absorb the pump light), to which a light extractor is glued (top) (see also FIGS. 8a-8b). Alternatively, the center part of the poly-crystal body is also luminescent, but emitting a different spectrum as the outer shell (bottom) (see also FIGS. 8a-8b). Cross sectional shapes of the bar/rod and of the light extractor may vary; depicted are rectangular (left of the two right figures) and round shapes (right of the two right figures). The optical element, here e.g. a massive light extractor, is indicated with reference 24.

Figure 8D:
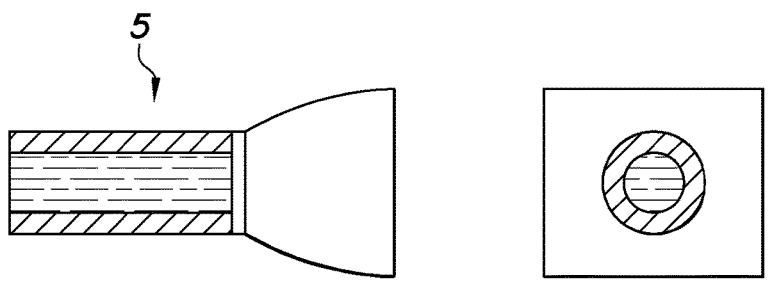

In specific configurations, a rectangular light extractor is combined with a round luminescent converter, combining the preferred light exit window for a projection system with the preferred round luminescent converter shape for maximum (light extraction) efficiency; see FIG. 8d, which shows a combination of a circular luminescent converter body with a rectangular light extractor to match a preferred spatial extent of the light source for specific projection applications.

Figure 8E:
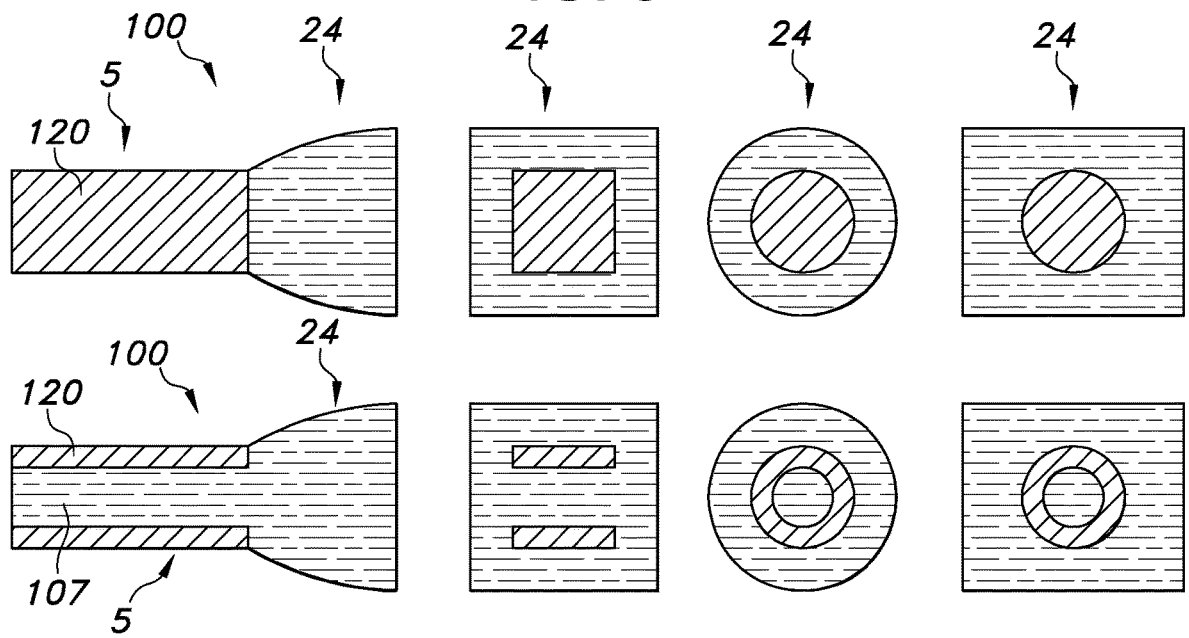

In embodiments, a monolithic poly-crystalline luminescent concentrator comprising a poly-crystalline converter body sintered together with a poly-crystalline light extractor is proposed. For maximum light extraction as well a maximum robustness the light extractor is made of a poly-crystal ceramic as well as the luminescent converter bar/rod, and these are co-sintered into a single monolithic light concentrator. The match in refractive index of the light extractor with the luminescent converter bar/rod without any other material in between enables maximum light extraction, while the co-sintering also results in an extremely strong component. Tuning of the composition(s) of the converter bar/rod and the light extractor is important to achieve a scatter-free sintered interconnect. See FIG. 8e for some graphical representations, wherein some configurations options for a monolithic poly-crystalline luminescent concentrator, comprising a luminescent converter rod/bar co-sintered with a poly-crystalline ceramic light extractor. The whole body has substantially the same refractive index, but localized differences in activator concentration or in host composition of the garnet material are included by design. The optical element 24 may e.g. have a rectangular cross-section (left of the three right figures), circular (middle of the three right figures), and rectangular (right of the three right figures); the body 100 may e.g. have a rectangular cross-section (left of the three right figures), circular (middle of the three right figures), and circular (right of the three right figures).

For ease of manufacturing, in particular polishing, a conical or double wedge shaped light extractor may be applied rather than a CPC-shaped extractor. Although there will be some increase of étendueendue, and therefor reduction of radiance at the exit window, the advantages of a simpler and cheaper surface finish process may be dominating.

Figure 8F:
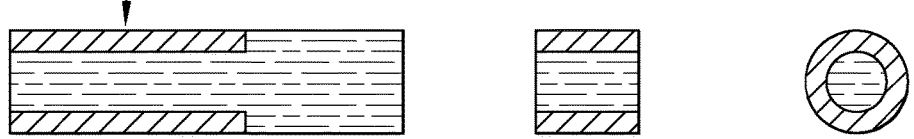
Figure 8F:
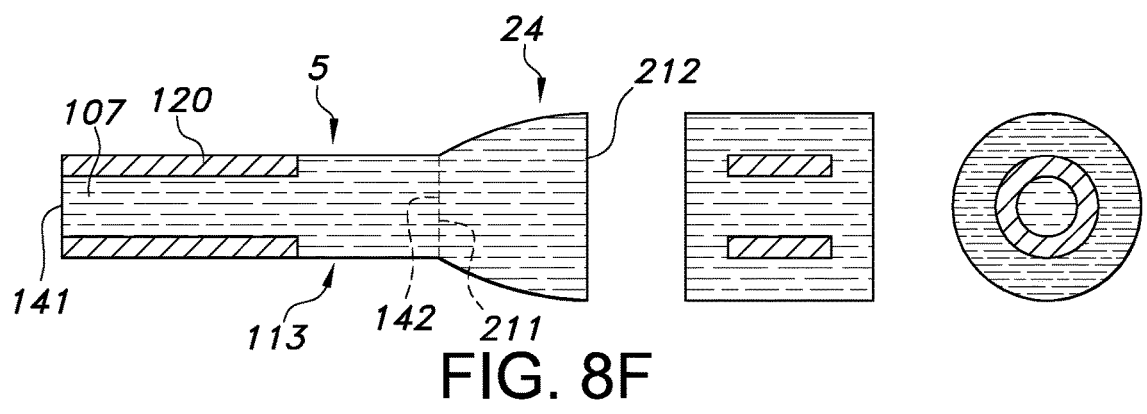

In embodiments, a monolithic poly-crystalline luminescent concentrator comprising a poly-crystalline converter body sintered together with a poly-crystalline light mixing extension is proposed. For homogenization of the spatial light distribution it can be advantageous to use an extension of the luminescent conversion body as a homogenizing light pipe before extracting and projecting the light. In a preferred configuration this extension is realized by co-sintering of a poly-crystalline ceramic extension of the converter with the luminescent converter. In a preferred class of embodiments this is further extended with a co-sintered light extractor. See FIG. 8f for some graphical representations of these embodiments, wherein monolithic poly-crystalline luminescent converter with co-sintered poly-crystalline homogenization section as extension of the luminescent converter rod/bar (top) and with additionally a co-sintered poly-crystalline light extractor (bottom) are displayed. Reference 113 indicates a homogenization or mixing element, configured to mix the luminescent light. Here, the second face or radiation exit window of the light transmissive body can be seen as the part where the light transmissive body changes into the optical element. Likewise, this may apply to the radiation entrance window 211. The radiation exit window 212 has in fact become effectively the second face or radiation exit window of the assembly of light transmissive body and optical element 24.

The light extractor part may be co-molded, co-casted, or 2-k extruded, or may be molded as a separate individual part that subsequently is co-sintered with the luminescent converter body to form a single monolithic poly-ceramic body. Other combinations of shapes, light absorption distributions, and spatial distributions of emission spectra are possible using the various options for components as presented before.

In embodiments, a monolithic poly-crystalline 3-D shaped luminescent concentrator comprising a 3-D shaped poly-crystalline converter body sintered together with a poly-crystalline light extractor is proposed. For minimization of the étendueendue of the light source, or for maximizing light coupling into the light converter, or for optimizing the spatial extent of the light source for the application, it may be advantageous to let the cross-sectional dimensions of the luminescent converter/light pipe change with position (along the optical axis). Obviously this can only be realized by molding, pressing, or casting of the body. Thickness of the outer shell of highly absorbing luminescent material as well as the diameter of the luminescent rod/bar may vary with longitudinal position. Using the approach of a monolithically sintered body as described above, but with varying cross-sectional shapes, enables realization of the highest efficiencies thanks to absence of scattering at the interfaces and a continuous refractive index across the whole component.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%.

Where stated that an absorption, a reflection or a transmission should be a certain value or within a range of certain values these values are valid for the intended range of wavelengths. Such, if stated that the transmission of an elongated luminescent light transmissive body is above 99%/cm, that value of 99%/cm is valid for the converted light rays, while it would be clear to the person skilled in the art that the transmission of an elongated luminescent light transmissive body will be well below 99%/cm for the range of wavelengths emitted by the light sources 10, since the source light 11 is intended to excite the phosphor material in the elongated luminescent light transmissive bodies such that all the source light 11 preferably is absorbed by the elongated luminescent light transmissive bodies instead of highly transmitted. As indicated above, the term "transmission" especially refer to internal transmission.

The light transmissive body is thus especially substantially transmissive for at least (a spectral) part of the converted light, which (also) means substantially non-scattering for at least (a spectral) part of the converted light and showing limited absorption for at least (a spectral) part of the converted light. It may however show a high absorption for other wavelengths, such as especially for at least (a spectral) part of the pump light, or for only (a spectral) part of the converted light. It may also be scattering for other wavelengths than (a substantial (spectral) part of the converted light.

The term "plurality" refers to two or more.

The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Practical designs may be further optimized the person skilled in the art using optical ray trace programs, such particular angles and sizes of microstructures (reflective microstructures or refractive microstructures) may be optimized depending on particular dimensions, compositions and positioning of the one or more elongated light transmissive bodies.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
   a light source configured to provide light source light selected from one or more of ultraviolet (UV), visible light, and infrared (IR);
   a luminescent element comprising an elongated light transmissive body, the elongated light transmissive body comprising a side face, wherein:
   the elongated light transmissive body comprises a luminescent material,
   the elongated light transmissive body has a length (L);
   the elongated light transmissive body is hollow over at least part of the length (L) thereby defining a cavity,
   the elongated light transmissive body comprises a radiation input face and a first radiation exit window; wherein the luminescent material is configured to convert at least part of light source light received at the radiation input face into luminescent material radiation, and the luminescent element being configured to couple at least part of the luminescent material radiation out at the first radiation exit window as converter radiation,
   the elongated light transmissive body has a first face and a second face defining the length (L) of the elongated light transmissive body; wherein the side face comprises the radiation input face, and wherein:
   the second face comprises the radiation exit window.

2. The lighting device according to claim 1, wherein the elongated light transmissive body has a polygonal cross-section, and wherein the elongated light transmissive body comprises a cavity surrounded by the elongated light transmissive body.

3. The lighting device according to claim 1, wherein the elongated light transmissive body has a tubular shape having a cavity surrounded by the elongated light transmissive body.

4. The lighting device according to claim 1, wherein at least part of the cavity comprises a light transmissive material, differing in composition from the composition of the material of the elongated light transmissive body, wherein the light transmissive material in the cavity has an index of refraction equal to or lower than the light transmissive material of the light transmissive body.

5. The lighting device according to claim 1, wherein one or more of the first face and the second face comprise a plane comprising surface modulations thereby creating different modulation angles relative to the respective plane.

6. The lighting device according to claim 1, further comprising an optical element optically coupled to the elongated light transmissive body, wherein the elongated light transmissive body and the optical element are a single body.

7. The lighting device according to claim 1, further comprising an optical element optically coupled to the elongated light transmissive body, wherein the optical element is selected from the group consisting of a compound parabolic concentrator, an adapted compound parabolic concentrator, a dome, a wedge-shaped structure, and a conical structure.

8. The lighting device according to claim 1, further comprising an optical element optically coupled to the elongated light transmissive body, wherein the optical element comprises a plurality of optical fibers, optically coupled to the elongated light transmissive body.

9. The lighting device according to claim 1, comprising a plurality of elongated light transmissive bodies, each elongated light transmissive body comprising a luminescent material configured to convert at least part of a light source light selected from one or more of the UV, visible light, and IR received by the elongated light transmissive body into luminescent material radiation, wherein:
   the elongated light transmissive bodies differ in one or more of (a) length (L) of the elongated light transmissive bodies, (b) type of luminescent material, (c) concentration of luminescent material, (d) concentration distribution over the elongated light transmissive body, and (e) host matrix for the luminescent material;
   each elongated light transmissive body has an axis of elongation (BA);
   one or more of the elongated light transmissive bodies comprise cavities;
   wherein the elongated light transmissive bodies are configured in a core-shell configuration wherein a smaller elongated light transmissive body is at least partly configured in the cavity of a larger elongated light transmissive body and wherein the axes of elongations (BA) are configured parallel.

10. The lighting device according to claim 9, wherein the elongated light transmissive bodies have side faces, and wherein side faces of adjacent elongated light transmissive bodies have no physical contact or only over at maximum 10% of their respective surface areas.

11. The lighting device according to claim 9, further comprising an optical element, wherein the optical element comprises a first wall and a second wall surrounding the first wall thereby defining an optical element having a ring-like cross-section, wherein the optical element comprises a radiation entrance window and a radiation exit window, wherein the radiation entrance window is optically coupled with the plurality of elongated light transmissive bodies.

12. The lighting device according to claim 1, wherein the first face is facetted or has one or more oblique sides with respect to the side face.

13. The lighting device according to claim 12, further comprising a reflective surface facing the first face and not being in direct contact with the first face of the elongated light transmissive body.

14. The lighting device according to claim 1, further comprising a plurality of light sources, wherein (i) one or more light sources are configured to provide light source light to the side face of an outer elongated light transmissive body and/or wherein one or more light sources are configured to provide light source light to one or more first faces, wherein the one or more first faces are end faces, and/or (ii) wherein one or more light sources are configured in a cavity of an inner elongated light transmissive body and configured to provide light source light to the side face of the inner elongated light transmissive body, wherein at least two elongated light transmissive bodies provide luminescent material light with different spectral distributions, and wherein optionally the lighting device comprises a control system, configured to control the spectral distribution of the lighting device light.

15. A lighting system, comprising:
   one or more lighting devices according to claim 1 and,
   a controller for controlling the one or more lighting devices.

* * * * *